US009929401B2

(12) United States Patent
Ogasawara et al.

(10) Patent No.: US 9,929,401 B2
(45) Date of Patent: Mar. 27, 2018

(54) POSITIVE ELECTRODE ACTIVE MATERIAL FOR NON-AQUEOUS ELECTROLYTE SECONDARY BATTERY HAVING RARE EARTH HYDROXIDE AND/OR OXYHYDROXIDE

(71) Applicant: SANYO Electric Co., Ltd., Moriguchi-shi, Osaka (JP)

(72) Inventors: Takeshi Ogasawara, Moriguchi (JP); Naoki Imachi, Moriguchi (JP)

(73) Assignee: SANYO Electric Co., Ltd., Daito-shi (JP)

( * ) Notice: Subject to any disclaimer, the term of this patent is extended or adjusted under 35 U.S.C. 154(b) by 670 days.

(21) Appl. No.: 14/263,468

(22) Filed: Apr. 28, 2014

(65) Prior Publication Data

US 2014/0272582 A1  Sep. 18, 2014

Related U.S. Application Data

(62) Division of application No. 13/002,254, filed as application No. PCT/JP2009/062332 on Jul. 7, 2009, now Pat. No. 8,741,483.

(30) Foreign Application Priority Data

Jul. 9, 2008  (JP) ................................ 2008-178527
Sep. 5, 2008  (JP) ................................ 2008-227700
(Continued)

(51) Int. Cl.
*H01M 4/13*  (2010.01)
*H01M 4/36*  (2006.01)
(Continued)

(52) U.S. Cl.
CPC ............. *H01M 4/366* (2013.01); *H01M 4/13* (2013.01); *H01M 4/131* (2013.01); *H01M 4/139* (2013.01);
(Continued)

(58) Field of Classification Search
CPC ........ H01M 4/13; H01M 4/131; H01M 4/139; H01M 4/1391
(Continued)

(56) References Cited

U.S. PATENT DOCUMENTS 6,291,103 B1  9/2001 Park et al.
6,489,060 B1  12/2002 Zhang et al.
(Continued)

FOREIGN PATENT DOCUMENTS

EP  1505672 A1  2/2005
JP  3-067463 A  3/1991
(Continued)

OTHER PUBLICATIONS

International Search Report of PCT/JP2009/062332, dated Aug. 25, 2009.
(Continued)

*Primary Examiner* — Jonathan G Leong
(74) *Attorney, Agent, or Firm* — Westerman, Hattori, Daniels & Adrian, LLP

(57) ABSTRACT

In a non-aqueous electrolyte secondary battery including a positive electrode 1, a negative electrode 2 and a non-aqueous electrolyte, a positive electrode active material wherein a particle of at least one compound selected from Er hydroxide, Er oxyhydroxide, Yb hydroxide, Yb oxyhydroxide, Tb hydroxide, Tb oxyhydroxide, Dy hydroxide, Dy oxyhydroxide, Ho hydroxide, Ho oxyhydroxide, Tm hydroxide, Tm oxyhydroxide, Lu hydroxide, and Lu oxy-
(Continued)

(A)

(B)

hydroxide is dispersed and adhered on a surface of a positive electrode active material particle containing Li is used.

16 Claims, 3 Drawing Sheets

(30) Foreign Application Priority Data

| Sep. 30, 2008 | (JP) | ................. | 2008-253756 |
|---|---|---|---|
| Dec. 3, 2008 | (JP) | ................. | 2008-308435 |
| Dec. 17, 2008 | (JP) | ................. | 2008-320790 |
| Mar. 16, 2009 | (JP) | ................. | 2009-062244 |
| Mar. 18, 2009 | (JP) | ................. | 2009-065505 |
| Jun. 2, 2009 | (JP) | ................. | 2009-133365 |
| Jun. 9, 2009 | (JP) | ................. | 2009-137785 |

(51) Int. Cl.
*H01M 4/139* (2010.01)
*H01M 4/131* (2010.01)
*H01M 4/1391* (2010.01)
*H01M 4/485* (2010.01)
*H01M 4/505* (2010.01)
*H01M 4/525* (2010.01)
*H01M 10/0525* (2010.01)

(52) U.S. Cl.
CPC .......... *H01M 4/1391* (2013.01); *H01M 4/36* (2013.01); *H01M 4/485* (2013.01); *H01M 4/505* (2013.01); *H01M 4/525* (2013.01); *H01M 10/0525* (2013.01)

(58) Field of Classification Search
USPC ................ 429/218.1, 223, 224, 231.1–231.3
See application file for complete search history.

(56) References Cited

U.S. PATENT DOCUMENTS

| 7,422,824 B2 | 9/2008 | Arimoto et al. |
|---|---|---|
| 2002/0110736 A1 | 8/2002 | Kweon et al. |
| 2004/0191633 A1 | 9/2004 | Johnson et al. |
| 2005/0221183 A1 | 10/2005 | Arimoto et al. |
| 2006/0177739 A1 | 8/2006 | Endo et al. |
| 2008/0166635 A1 | 7/2008 | Miyamoto et al. |

FOREIGN PATENT DOCUMENTS

| JP | 4-319259 A | 11/1992 |
|---|---|---|
| JP | 5-006780 A | 1/1993 |
| JP | 2000-340229 A | 12/2000 |
| JP | 2001-006678 A | 1/2001 |
| JP | 2001-283845 | 10/2001 |
| JP | 2002-158011 A | 5/2002 |
| JP | 2004-071232 A | 3/2004 |
| JP | 2004-207098 A | 7/2004 |
| JP | 2004-227869 A | 8/2004 |
| JP | 2005-032693 | 2/2005 |
| JP | 2005-174616 A | 6/2005 |
| JP | 2005-196992 A | 7/2005 |
| JP | 2005-216651 A | 8/2005 |
| WO | 2006/064979 A1 | 6/2006 |

OTHER PUBLICATIONS

Notificational of Transmittal of Translation of the Internationl Preliminary Report on Patentability (Form PCT/IB/338) of International Application No. PCT/JP2009/062332 dated Feb. 11, 2011 with form PCT/IB/373, PCT/IB/326 and PCT/ISA/237.
European Search Report dated Sep. 30, 2011, issued in corresponding European Patent Application No. 09794417.7.
Kim, Seon Hye et al., "Improving the rate performance of LiCoO2 by Zr doping", J Electroceram, 2009, vol. 23, pp. 254-257.

(A)

(B)

POSITIVE ELECTRODE ACTIVE MATERIAL FOR NON-AQUEOUS ELECTROLYTE SECONDARY BATTERY HAVING RARE EARTH HYDROXIDE AND/OR OXYHYDROXIDE

CROSS-REFERENCE TO RELATED APPLICATIONS

This application is a Divisional application of U.S. application Ser. No. 13/002,254, filed Dec. 30, 2010, wherein U.S. application Ser. No. 13/002,254 is a national stage application filed under 35 USC § 371 of International Application No. PCT/JP2009/062332, filed Jul. 7, 2009, and which is based upon and claims the benefit of priority from prior Japanese Patent Application Nos. 2008-178527, 2008-227700, 2008-253756, 2008-308435, 2008-320790, 2009-062244, 2009-065505, 2009-133365 and 2009-137785, filed on Jul. 9, 2008, Sep. 5, 2008, Sep. 30, 2008, Dec. 3, 2008, Dec. 17, 2008, Mar. 16, 2009, Mar. 18, 2009, Jun. 2, 2009 and Jun. 9, 2009, respectively, the entire contents of which are incorporated herein by reference.

TECHNICAL FIELD

The present invention relates to a positive electrode active material for non-aqueous electrolyte secondary battery used for a positive electrode of a non-aqueous electrolyte secondary battery, a method of fabricating the same, a positive electrode for non-aqueous electrolyte secondary battery using the positive electrode active material for non-aqueous electrolyte secondary battery, and a non-aqueous electrolyte secondary battery. More particularly, a feature of the invention is to improve the above-described positive electrode active material used for the positive electrode of the non-aqueous electrolyte secondary battery.

BACKGROUND ART

In recent years, miniaturization and weight saving of mobile information terminals, such as cellular phone, notebook-size PC, and PDA have been remarkably advanced. In accordance with such an advance, demands for higher capacity of a battery as a driving power source have been increasing. In order to meet such demands, as one type of new secondary batteries with high output and high energy density, non-aqueous electrolyte secondary batteries which employ a non-aqueous electrolyte and are adapted for charging and discharging byway of transfer of lithium ions between a positive electrode and a negative electrode, have widely been used.

Generally, the positive electrode active material used for the positive electrode of such a non-aqueous electrolyte secondary battery is lithium cobalt oxide $LiCoO_2$, lithium manganese oxide $LiMn_2O_4$ having a spinel structure, lithium composite oxide of cobalt-nickel-manganese, lithium composite oxide of aluminum-nickel-manganese, lithium composite oxide of aluminum-nickel-cobalt, and the like. The negative electrode active material of the negative electrode used includes carbon materials such as graphite, materials to be alloyed with lithium, such as Si and Sn, and the like.

In recent years, because of advancement of amusement function such as moving image reproduction and game function by mobile information terminal, electric power consumption tends to rise more steadily. As a result, demands for further higher capacity and higher function in a battery have been increasing. In order to further increase capacity of non-aqueous electrolyte secondary battery, it is thought to charge the non-aqueous electrolyte secondary battery to a high voltage and to increase the filling density of the positive electrode active material and the negative electrode active material to be filled into the non-aqueous electrolyte secondary battery.

In a case where the non-aqueous electrolyte secondary battery is charged to the high voltage as described above, oxidizing force of the positive electrode active material becomes strong. Further, in a case where the positive electrode active material contains a transition metal having a catalytic property, for example, Co, Fe, Ni, Mn and the like, the non-aqueous electrolyte reacts with the transition metal having catalytic property and decomposes on the surface of positive electrode active material. As a result, charge-discharge cycle characteristics, preservation characteristics and characteristics after sequential charging of the non-aqueous electrolyte secondary battery are greatly deteriorated, gas is generated inside of the battery, and an expansion of the battery is caused. Particularly, the non-aqueous electrolyte secondary battery is further deteriorated under high temperature environment.

In addition, in a case where the filling density of the positive electrode active material and the negative electrode active material to be filled into the non-aqueous electrolyte secondary battery is increased, penetration of the non-aqueous electrolyte into the positive electrode and the negative electrode is not sufficient and an adequate charge-discharge reaction is not attained, so that charge-discharge characteristics are deteriorated. Further, disproportion of the charge-discharge reaction occurs, so that one part of the non-aqueous electrolyte secondary battery is charged to high voltage. As a result, there exists the same problem as in the case of charging the non-aqueous electrolyte secondary battery to the high voltage.

It has been proposed to use a positive electrode active material wherein rare-earth oxides such as $La_2O_3$ are contained in complex oxides including Li and Ni or a positive electrode active material wherein rare-earth oxide particle such as $La_2O_3$ is adhered on the surface of complex oxide particle including Li and Ni, for the purpose of restricting a reaction between the positive electrode active material and a non-aqueous electrolyte in the case of excessive charging (See, for example, Patent Document 1, JP 2005-196992(A)).

However, even if the positive electrode active material of patent document 1 is used, when the non-aqueous electrolyte secondary battery is charged to the high voltage, the reaction between the positive electrode active material and the non-aqueous electrolyte still occurs. Particularly, under high temperature environment, the charge-discharge cycle characteristics, the preservation characteristics and the characteristics after sequential charging of the non-aqueous electrolyte secondary battery are greatly deteriorated, and gas is generated inside of the battery, so that the expansion of the battery is caused.

It has been proposed to use a positive electrode active material containing $Li_xCoO_2$ and $Li_yNi_sCo_xM_uO_2$ and having 10-45 wt. % of $Li_3Ni_sCo_tM_uO_2$ against a total amount of $Li_xCoO_2$ and $Li_yNi_sCo_xM_uO_2$. Further, M in $Li_yNi_sCo_{x-}M_uO_2$ are at least one element selected from a group of B, Mg, Al and the like and lanthanoid element, and the elements M form solid solution in the positive electrode active material (See, for example, Patent Document 2, JP 3712251 (B)).

However, in such a case, when the non-aqueous electrolyte secondary battery is charged to the high voltage, oxidization decomposition of the non-aqueous electrolyte is not fully suppressed. As a result, as to the non-aqueous secondary battery of Patent Document 2, when the non-aqueous electrolyte secondary battery is charged to the high voltage, the charge-discharge cycle characteristics, the preservation characteristics and the characteristics after sequential charging are greatly deteriorated, and gas is generated inside of the battery, so that the expansion of the battery is caused.

Further, there has been proposed a lithium secondary cell positive activator comprising a core containing lithium compound having the certain particle diameter and being coated with a surface-treated layer containing oxide containing coating element such as Ma, Al, Co and the like, and hydroxide, oxyhydroxide, oxycarbonate, and hydroxycarbonate (See, for example, Patent Document 3, JP 2002-158011 (A)).

However, even in Patent document 3, when the non-aqueous electrolyte secondary battery is charged to the high voltage, the positive electrode still reacts with the non-aqueous electrolyte. Particularly, under high temperature environment, the charge-discharge cycle characteristics, the preservation characteristics and the characteristics after sequential charging are greatly deteriorated, and gas is generated in the inside of the battery, so that the expansion of the battery is caused.

It has been proposed to use a positive electrode which contains lithium-cobalt composite oxide and a rare earth compound selected from a group of lanthanum, cerium and neodymium for the purpose of obtaining a non-aqueous electrolyte secondary battery with high charge-discharge capacity and excellent heat stability (See, for example, Patent Document 4, JP 2004-207098 (A)). In patent document 4, the positive electrode is fabricated by mixing lithium-cobalt composite oxide with rare earth compound such as lanthanum oxide, a conductive material and a binder.

However, if the positive electrode is fabricated the same as patent document 4, rare earth compound such as lanthanum oxide is not adequately dispersed nor adhered on the surface of lithium-cobalt composite oxide. Accordingly, a contact property between lithium-cobalt composite oxide and rare earth compound such as lanthanum oxide is deteriorated, so that sufficient effects can not be obtained. As a result, the amount of rare earth compound such as lanthanum oxide to be mixed with lithium-cobalt composite oxide necessitates being large, and therefore, there exists a problem that the proportion of the positive electrode active material in the positive electrode is decreased.

Further, if the positive electrode fabricated in patent document 4 is used, when the charging voltage is increased, a reaction between the positive electrode active material and the non-aqueous electrolyte occurs. As a result, when the non-aqueous electrolyte secondary battery is sequentially charged under high temperature environments, preservation characteristics and charge-discharge cycle characteristics are not sufficiently improved.

It has been proposed to use a positive electrode active material wherein the surface of a lithium transition metal complex oxide having a spinel structure contains at least one element selected from zinc, yttrium, niobium, samarium and neodymium (See, for example, Patent Document 5, JP2005-216651(A)). This positive electrode active material restricts elution of manganese from the lithium transition metal complex oxide, so that a non-aqueous electrolyte secondary battery having superior characteristics under high temperature environment can be obtained.

However, in patent document 5, a compound to be used as the compound of elements, such as zinc, is not specified. Accordingly, when the charging voltage is increased, a reaction between the positive electrode active material and the non-aqueous electrolyte is not fully restricted. As a result, even in patent document 5, when the non-aqueous electrolyte secondary battery is sequentially charged under high temperature environment, the preservation characteristics and the charge-discharge cycle characteristics are not sufficiently improved.

It has been proposed to use a positive electrode active material wherein a lanthanoid element-containing compound is adhered on at least one part of surfaces of a particle containing lithium-manganese composite oxide. (See, for example, Patent Document 6, JP 2005-174616(A)). Patent document 6 describes that lithium-manganese composite oxide is mixed with an oxide of lanthanoid element such as $La_2O_3$, $Nd_2O_3$, and $Sm_2O_3$ and burned at 550° C. or more. By such a way, the lanthanoid element forms solid solution in lithium-manganese composite oxide and the oxide of lanthanoid element is adhered on one part of the surface thereof.

However, in patent document 6, when the charging voltage is increased as mentioned above, a reaction between the positive electrode active material and the non-aqueous electrolyte occurs. As a result, when the non-aqueous electrolyte secondary battery is sequentially charged under high temperature environment sufficient preservation characteristics and charge-discharge cycle characteristics can not be obtained.

It has been proposed to use a positive electrode wherein lanthanum is added to lithium-cobalt compound oxide for the purpose of obtaining a non-aqueous electrolyte secondary battery with high charge-discharge cycle characteristics and excellent preservation characteristics under high temperature (See, for example, Patent Document 7, JP H04-319259(A)). In patent document 7, in the fabrication of lithium-cobalt composite oxide, lanthanum hydroxide is added and the mixture is burned at high temperature, 900° C. Thus, a positive electrode active material wherein the surface of lithium-cobalt compound oxide is covered with compound oxide of lanthanum oxide, lithium and lanthanum and compound oxide of lanthanum and cobalt is fabricated. Here, the additional ratio of lanthanum against cobalt is 1 to 10 mol %.

However, if the positive electrode is fabricated the same as patent document 7, the additional ratio of lanthanum against cobalt is required to be large and lanthanum forms solid solution in the inside of lithium-cobalt compound oxide. Accordingly, characteristics of the positive electrode active material are deteriorated and charge-discharge efficiency is lowered.

Further, even if the surface of lithium-cobalt compound oxide is covered with compound oxide of lanthanum oxide, lithium and lanthanum and compound oxide of lanthanum and cobalt, when the charging voltage is increased as mentioned above, a reaction between the positive electrode active material and the non-aqueous electrolyte is not fully restricted. As a result, when the non-aqueous electrolyte secondary battery is sequentially charged under high temperature environment, the preservation characteristics and the charge-discharge cycle characteristics are not sufficiently improved.

It has been proposed to use a positive electrode active material wherein yttrium oxide or compound oxide of lithium and yttrium is added to $LiCoO_2$ and the additional amount of yttrium against $LiCoO_2$ is within the range of 1 to 10% in mol ration, for the purpose of restricting destruction of crystal structure of the positive electrode active material (See, for example, Patent Document 8, JP H05-6780(A)).

There has been proposed a non-aqueous electrolyte secondary battery wherein lanthanum, yttrium and zinc are adhered on the surface of positive electrode active material of lithium manganese spinel compound and wherein the metal concentration is not less than from 0.01 mol % to less than 5 mol % for the purpose of enhancing charge-discharge cycle characteristics thereof (See, for example, Patent Document 9, JP 2001-6678(A)).

However, even in patent documents 8 and 9, when the charging voltage is increased as mentioned above, the reaction between the positive electrode active material and the non-aqueous electrolyte is not fully restricted. As a result, when the non-aqueous electrolyte secondary battery is sequentially charged under high temperature environment, the preservation characteristics and the charge-discharge cycle characteristics and the like are not sufficiently improved.

DISCLOSURE OF THE INVENTION

Problems to be Solved

An object of the invention is to improve a positive electrode active material used in a positive electrode of a non-aqueous electrolyte secondary battery and to restrict a reaction between the positive electrode active material and a non-aqueous electrolyte in a case where charging voltage is increased. Also, it is an object of the invention to improve charge-discharge cycle characteristics at high voltage, preservation characteristics and charge-discharge characteristics after preservation in charging condition under high temperature environment and preservation characteristics and charge-discharge characteristics after sequential charging. Furthermore, it is another object of the invention to restrict an expansion of the non-aqueous electrolyte secondary battery resulting from generation of gas inside of the battery.

Means for Solving Problems

According to a first aspect of the invention, in a positive electrode active material for non-aqueous electrolyte secondary battery, a particle of at least one compound selected from erbium hydroxide, erbium oxyhydroxide, ytterbium hydroxide, ytterbium oxyhydroxide, terbium hydroxide, terbium oxyhydroxide, dysprosium hydroxide, dysprosium oxyhydroxide, holmium hydroxide, holmium oxyhydroxide, thulium hydroxide, thulium oxyhydroxide, lutetium oxyhydroxide, and lutetium oxyhydroxide is dispersed and adhered on the surface of positive electrode active material particle containing lithium.

In the present invention, a non-aqueous electrolyte secondary battery uses the foregoing positive electrode active material for non-aqueous electrolyte secondary battery. As a result, in a case where charging voltage is increased, a reaction between the positive electrode active material and a non-aqueous electrolyte is restricted by the adhered materials on the surface of positive electrode active material particle.

In a case where a particle of erbium compound is dispersed and adhered on the surface of the positive electrode active material particle containing lithium, erbium oxyhydroxide is preferably used. It is because the reaction between the positive electrode active material and the non-aqueous electrolyte is more restricted.

In the case where a particle of ytterbium compound is dispersed and adhered on the surface of the positive electrode active material particle containing lithium, ytterbium oxyhydroxide is preferably used. It is because the reaction between the positive electrode active material and the non-aqueous electrolyte is more restricted.

The preparation of the positive electrode active material for non-aqueous electrolyte secondary battery of the first aspect hereof comprises: a process of adding a solution of salt selected from erbium salt, ytterbium salt, terbium salt, dysprosium salt, holmium salt, thulium salt and lutetium salt to a solution dispersing the positive electrode active material particle containing lithium and deposition of a hydroxide selected from erbium hydroxide, ytterbium hydroxide, terbium hydroxide, dysprosium hydroxide, holmium hydroxide, thulium hydroxide and lutetium hydroxide on the surface of the positive electrode active material particle; and a process of heat-treating the positive electrode active material particle deposited the above mentioned hydroxide. In the process of deposition of the hydroxide on the surface of the positive electrode active material particle, it is preferable that pH of the solution dispersing the positive electrode active material particle should be 6 or more.

The reason why the pH of the solution dispersing the positive electrode active material particle should be 6 or more in the process of deposition of the hydroxide on the surface of the positive electrode active material particle is because if pH of the solution dispersing the positive electrode active material particle is less than 6, the salt selected from erbium salt, ytterbium salt, terbium salt, dysprosium salt, holmium salt, thulium salt and lutetium salt is not changed to the hydroxide. Particularly, in order to adequately disperse and deposit fine hydroxide on the surface of the positive electrode active material particle, it is preferable that the pH of the solution dispersing the positive electrode active material particle be within the range of 7 to 10.

Next, heat-treatment temperature in the case of heat-treating the positive electrode active material particle wherein hydroxide is deposited as mentioned above will be explained.

For example, erbium hydroxide is decomposed and changed to erbium oxyhydroxide at the temperature of around 230° C. The erbium oxyhydroxide is further decomposed and changed to erbium oxide at the temperature of around 440° C. When the temperature of heat-treating of the positive electrode active material particle wherein erbium hydroxide is deposited is 440° C. or more, erbium hydroxide is changed to erbium oxide and erbium is diffused inside of the positive electrode active material particle. In such a case, it becomes difficult to fully restrict the reaction between the positive electrode active material and the non-aqueous electrolyte and charge-discharge characteristics of the positive electrode active material are greatly deteriorated.

Therefore, it is preferable that the heat-treatment temperature of heat-treating the positive electrode active material particle wherein erbium hydroxide is deposited is less than 440° C. Further, in order to further restrict the reaction between the positive electrode active material and the non-aqueous electrolyte by changing erbium hydroxide deposited on the surface of the positive electrode active material particle to erbium oxyhydroxide, it is more preferable that the heat-treatment temperature is 230° C. or more.

For example, when ytterbium hydroxide is analyzed by thermogravimetric analysis wherein the heat-treatment temperature is raised 5° C. per one minute, an inflection point of changes in weight is detected at around 230° C. and at around 400° C., and the changes in weight become smaller and stable at 500° C. The reason is thought to be as follows. Ytterbium hydroxide is decomposed and begins to change to ytterbium oxyhydroxide at around 230° C., ytterbium oxyhydroxide is further decomposed and begins to change to ytterbium oxide at around 400° C., and ytterbium oxyhydroxide is changed to ytterbium oxide at around 500° C.

Accordingly, when the temperature of heat-treating of the positive electrode active material particle wherein ytterbium hydroxide is deposited is 400° C. or more, ytterbium hydroxide begins to change to ytterbium oxide. Further, when the temperature of heat-treating is 500° C. or more, ytterbium hydroxide is changed to ytterbium oxide and ytterbium is diffused inside of the positive electrode active material particle. In such a case, it becomes difficult to fully restrict the reaction between the positive electrode active material and the non-aqueous electrolyte and the charge-discharge characteristics of the positive electrode active material are greatly deteriorated.

Therefore, it is preferable that the heat-treatment temperature of heat-treating the positive electrode active material particle wherein ytterbium hydroxide is deposited be less than 550° C., more preferably, less than 400° C. Further, in order to further restrict the reaction between the positive electrode active material and the non-aqueous electrolyte by changing ytterbium hydroxide deposited on the surface of the positive electrode active material particle to ytterbium oxyhydroxide, it is more preferable that the heat-treatment temperature is 230° C. or more.

For example, terbium hydroxide is decomposed and changed to terbium oxyhydroxide at around 295° C., and terbium oxyhydroxide is further decomposed and changed to terbium oxide at around 395° C. When the temperature of heat-treating of the positive electrode active material particle wherein terbium hydroxide is deposited is 395° C. or more, terbium hydroxide is changed to terbium oxide and terbium is diffused inside of the positive electrode active material particle. In such a case, it becomes difficult to fully restrict the reaction between the positive electrode active material and the non-aqueous electrolyte and the charge-discharge characteristics of the positive electrode active material are greatly deteriorated.

Therefore, it is preferable that the heat-treatment temperature of heat-treating the positive electrode active material particle wherein terbium hydroxide is deposited is set to be less than 395° C.

For example, dysprosium hydroxide is decomposed and changed to dysprosium oxyhydroxide at around 275° C., and dysprosium oxyhydroxide is further decomposed and changed to dysprosium oxide at around 450° C. When the temperature of heat-treating of the positive electrode active material particle wherein dysprosium hydroxide is deposited is 450° C. or more, dysprosium hydroxide is changed to dysprosium oxide and dysprosium is diffused inside of the positive electrode active material particle. In such a case, it becomes difficult to fully restrict the reaction between the positive electrode active material and the non-aqueous electrolyte and the charge-discharge characteristics of the positive electrode active material are greatly deteriorated. Therefore, it is preferable that the heat-treatment temperature of heat-treating the positive electrode active material particle wherein dysprosium hydroxide is deposited is set to be less than 450° C.

For example, holmium hydroxide is decomposed and changed to holmium oxyhydroxide at around 265° C., and holmium oxyhydroxide is further decomposed and changed to holmium oxide at around 445° C. When the temperature of heat-treating of the positive electrode active material particle wherein holmium hydroxide is deposited is 445° C. or more, holmium hydroxide is changed to holmium oxide and holmium is diffused inside of the positive electrode active material particle. In such a case, it becomes difficult to fully restrict the reaction between the positive electrode active material and the non-aqueous electrolyte and the charge-discharge characteristics of the positive electrode active material are greatly deteriorated. Therefore, it is preferable that the heat-treatment temperature of heat-treating the positive electrode active material particle wherein holmium hydroxide is deposited is set to be less than 445° C.

For example, thulium hydroxide is decomposed and changed to thulium oxyhydroxide at around 250° C., and thulium oxyhydroxide is further decomposed and changed to thulium oxide at around 405° C. When the temperature of heat-treating of the positive electrode active material particle wherein thulium hydroxide is deposited is 405° C. or more, thulium hydroxide is changed to thulium oxide and thulium is diffused inside of the positive electrode active material particle. In such a case, it becomes difficult to fully restrict the reaction between the positive electrode active material and the non-aqueous electrolyte and the charge-discharge characteristics of the positive electrode active material are greatly deteriorated. Therefore, it is preferable that the heat-treatment temperature of heat-treating the positive electrode active material particle wherein thulium hydroxide is deposited is set to be less than 405° C.

According to the result of thermogravimetric analysis, for example, lutetium hydroxide is decomposed and changed to lutetium oxyhydroxide at around 280° C., and lutetium oxyhydroxide is further decomposed and changed to lutetium oxide at around 405° C. When the temperature of heat-treating of the positive electrode active material particle wherein lutetium hydroxide is deposited is 405° C. or more, lutetium hydroxide is changed to lutetium oxide and lutetium is diffused inside of the positive electrode active material particle. In such a case, it becomes difficult to fully restrict the reaction between the positive electrode active material and the non-aqueous electrolyte and the charge-discharge characteristics of the positive electrode active material are greatly deteriorated. Therefore, it is preferable that the heat-treatment temperature of heat-treating the positive electrode active material particle wherein lutetium hydroxide is deposited is set to be less than 405° C.

According to the first aspect of the invention, in the positive electrode for non-aqueous electrolyte secondary battery of the first aspect, the above-described positive electrode active material for non-aqueous electrolyte secondary battery of the first aspect is used.

According to the first aspect of the invention, in the non-aqueous electrolyte secondary battery of the first aspect, the above-described positive electrode for non-aqueous electrolyte secondary battery of the first aspect is used as the positive electrode.

The non-aqueous electrolyte secondary battery according to the first aspect of the invention is not particularly limited in the kind of the positive electrode containing lithium, the kind of the negative electrode active material of the negative electrode, and the kind of the non-aqueous electrolyte and hence, may employ any of the known positive electrode containing lithium, the negative electrode active material of the negative electrode and the non-aqueous electrolyte commonly used in the art.

As the positive electrode active material, any kind of lithium oxide which is generally used may be employed.

Examples of usable positive electrode active material include lithium cobaltate $LiCoO_2$, lithium manganate having a spinel structure $LiMn_2O_4$, lithium composite oxide of cobalt-nickel-manganese, and lithium composite oxide of aluminum-nickel-cobalt.

Examples of usable negative electrode active material for negative electrode include carbon materials such as graphite, and materials alloying with lithium such as Si and Sn. Particularly, the materials alloying with lithium such as Si which have high capacity may be preferably used for the purpose of increasing battery capacity.

In this invention, a non-aqueous electrolyte dissolving a solute in a non-aqueous solvent may be used as the non-aqueous electrolyte. Examples of usable non-aqueous solvent include cyclic carbonate, such as ethylene carbonate, propylene carbonate, butylene carbonate and vinylene carbonate, and chained carbonate, such as dimethyl carbonate, methyl ethyl carbonate and diethyl carbonate. Particularly, a mixed solvent of cyclic carbonate and chained carbonate is preferably used.

Examples of usable solute include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, which may be used either alone or in combination. In addition to these lithium salt, a lithium salt which has oxalate complex as an anion may preferably be contained. Examples of usable lithium salt which has oxalate complex as the anion include lithium-bis(oxalato)borate.

According to a second aspect of the invention, a positive electrode active material for non-aqueous electrolyte secondary battery in which a particle of at least one compound selected from neodymium hydroxide, neodymium oxyhydroxide, samarium hydroxide, samarium oxyhydroxide, praseodymium hydroxide, europium hydroxide, europium oxyhydroxide, gadolinium hydroxide, gadolinium oxyhydroxide, lanthanum hydroxide, lanthanum oxyhydroxide, yttrium hydroxide, and yttrium oxyhydroxide is dispersed and adhered on the surface of positive electrode active material particle containing at least one element selected from nickel and cobalt.

In the second positive electrode active material for non-aqueous electrolyte secondary battery, the particle of the above-mentioned compound is dispersed and adhered on the surface of the positive electrode active material particle containing at least one element selected from nickel and cobalt, and therefore, a decomposition reaction of the non-aqueous electrolyte on the surface of the positive electrode active material is restricted by the particle of the above-mentioned compound on the surface of positive electrode active material particle even in a case where charging voltage is increased. The reason is thought to be as follows. The contact between the non-aqueous electrolyte and the positive electrode active material is decreased by the particle of the above-mentioned compound. In addition, activation energy for generating a decomposition reaction of the non-aqueous electrolyte by the transition metal of nickel and cobalt having catalytic property contained in the positive electrode active material is increased.

Here, if the amount of neodymium compound comprising neodymium hydroxide and neodymium oxyhydroxide, samarium compound comprising samarium hydroxide and samarium oxyhydroxide, praseodymium compound comprising praseodymium hydroxide, europium compound comprising europium hydroxide and europium oxyhydroxide, gadolinium compound comprising gadolinium hydroxide and gadolinium oxyhydroxide, lanthanum compound comprising lanthanum hydroxide and lanthanum oxyhydroxide, and yttrium compound comprising yttrium hydroxide and yttrium oxyhydroxide, which are adhered on the surface of positive electrode active material particle, is too excessive, the surface of the positive electrode active material particle is excessively covered. In such a case, there is a risk that the capacity is decreased by rise of reaction resistance on the surface of the positive electrode active material.

Therefore, it is preferable that the amount of neodymium element in neodymium compound adhering on the surface of positive electrode active material particle is 0.35 mass % or less against the positive electrode active material particle. In a case where lithium cobaltate, $LiCoO_2$, is used as the positive electrode active material particle, when the amount of neodymium element against the positive electrode active material particle is set to be 0.35 mass %, a mol ratio of neodymium against cobalt is 0.22 mol %.

Further, it is preferable that the amount of samarium element in samarium compound adhering on the surface of positive electrode active material particle is 0.35 mass % or less against the positive electrode active material particle. In the case where lithium cobaltate, $LiCoO_2$, is used as the positive electrode active material particle, when the amount of samarium element against the positive electrode active material particle is set to be 0.35 mass %, a mol ratio of samarium against cobalt is 0.24 mol %.

Further, it is preferable that the amount of praseodymium element in praseodymium hydroxide adhered on the surface of positive electrode active material particle is 0.35 mass % or less against the positive electrode active material particle. In the case where lithium cobaltate, $LiCoO_2$, is used as the positive electrode active material particle, when the amount of praseodymium element against the positive electrode active material particle is set to be 0.35 mass %, a mol ratio of praseodymium against cobalt is 0.24 mol %.

Further, it is preferable that the amount of europium element in europium compound adhering on the surface of positive electrode active material particle is 0.35 mass % or less against the positive electrode active material particle. In the case where lithium cobaltate, $LiCoO_2$, is used as the positive electrode active material particle, when the amount of europium element against the positive electrode active material particle is set to be 0.35 mass %, a mol ratio of europium against cobalt is 0.23 mol %.

Further, it is preferable that the amount of gadolinium element in gadolinium compound adhering on the surface of positive electrode active material particle is 0.35 mass % or less against the positive electrode active material particle. In the case where lithium cobaltate, $LiCoO_2$, is used as the positive electrode active material particle, when the amount of gadolinium element against the positive electrode active material particle is set to be 0.35 mass %, a mol ratio of gadolinium against cobalt is 0.22 mol %.

Further, it is preferable that the amount of lanthanum element in lanthanum compound adhering on the surface of positive electrode active material particle is 0.35 mass % or less against the positive electrode active material particle. In the case where lithium cobaltate, $LiCoO_2$, is used as the positive electrode active material particle, when the amount of lanthanum element against the positive electrode active material particle is set to be 0.35 mass %, a mol ratio of lanthanum against cobalt is 0.25 mol %.

Further, it is preferable that the amount of yttrium element in yttrium compound adhering on the surface of positive electrode active material particle is 0.35 mass % or less against the positive electrode active material particle. In the case where lithium cobaltate, $LiCoO_2$, is used as the positive electrode active material particle, when the amount of yttrium element against the positive electrode active material particle is set to be 0.35 mass %, a mol ratio of yttrium against cobalt is 0.25 mol %.

The preparation of the second positive electrode active material for non-aqueous electrolyte secondary battery comprises a process of adding a solution of salt selected from neodymium salt, samarium salt, praseodymium salt, europium salt, gadolinium salt, lanthanum salt and yttrium salt to a solution dispersing the positive electrode active material particle containing at least one element selected from nickel and cobalt and deposition of hydroxide selected from neodymium hydroxide, samarium hydroxide, praseodymium hydroxide, europium hydroxide, gadolinium hydroxide, lanthanum hydroxide and yttrium hydroxide on the surface of the positive electrode active material particle.

In the process of deposition of the hydroxide on the surface of the positive electrode active material particle, it is preferable that pH of the solution dispersing the positive electrode active material particle is 6 or more. The reason why the pH of the solution dispersing the positive electrode active material particle should be 6 or more in the process of deposition of the hydroxide on the surface of the positive electrode active material particle is because, in a case where pH of the solution dispersing the positive electrode active material particle is less than 6, the salt selected from neodymium salt, samarium salt, praseodymium salt, europium salt, gadolinium salt, lanthanum salt and yttrium salt is not adequately changed to hydroxide.

In addition, in a case where pH of the solution dispersing the positive electrode active material particle is 6 or more, each of the above mentioned hydroxide becomes a fine particle having a particle diameter of 100 nm or less and is adequately dispersed and deposited on the surface of the positive electrode active material particle. As a result, even if the amount of each hydroxide adhered on the surface of the positive electrode active material particle is small, the reaction between the positive electrode active material particle and the non-aqueous electrolyte is properly restricted.

After the process of deposition of hydroxide selected from neodymium hydroxide, samarium hydroxide, praseodymium hydroxide, europium hydroxide, gadolinium hydroxide, lanthanum hydroxide and yttrium hydroxide on the surface of the positive electrode active material particle as mentioned above, the positive electrode active material particle wherein each hydroxide is deposited may be heat-treated. Heat-treatment temperature in the case of heat-treating the positive electrode active material particle wherein hydroxide is deposited as mentioned above will be explained.

For example, neodymium hydroxide is changed to neodymium oxyhydroxide at the temperature of 335° C. to 350° C. and neodymium oxyhydroxide is changed to neodymium oxide at the temperature of 440° C. to 485° C. When the temperature of heat-treating of the positive electrode active material particle wherein neodymium hydroxide is deposited is 440° C. or more, neodymium hydroxide is changed to neodymium oxide and neodymium is diffused inside of the positive electrode active material particle. In such a case, the use of neodymium oxide can not attain the same effect of neodymium hydroxide or neodymium oxyhydroxide, and the characteristics of the positive electrode active material are degraded and the characteristics such as charge-discharge efficiency are deteriorated. Therefore, it is preferable that the heat-treatment temperature in the case of heat-treating the positive electrode active material particle having neodymium hydroxide deposited on the surface be less than 440° C.

For example, samarium hydroxide is changed to samarium oxyhydroxide at the temperature of 290° C. to 330° C. and samarium oxyhydroxide is changed to samarium oxide at the temperature of 430° C. to 480° C. When the temperature of heat-treating of the positive electrode active material particle wherein samarium hydroxide is deposited is 430° C. or more, samarium hydroxide is changed to samarium oxide and samarium is diffused inside of the positive electrode active material particle. In such a case, the use of samarium oxide can not attain the same effect of samarium hydroxide or samarium oxyhydroxide, and the characteristics of the positive electrode active material are degraded and the characteristics such as charge-discharge efficiency are deteriorated. Therefore, it is preferable that the heat-treatment temperature in the case of heat-treating the positive electrode active material particle having samarium hydroxide deposited on the surface be less than 430° C.

For example, praseodymium hydroxide may preferably be heat-treated for dehydrating after being deposited on the surface of the positive electrode active material particle. When the temperature of heat-treating of the positive electrode active material particle wherein praseodymium hydroxide is deposited is 310° C. or more, praseodymium hydroxide is changed to oxide and the same effect of the use of praseodymium hydroxide can not be attained. Therefore, it is preferable that the heat-treatment temperature in the case of heat-treating the positive electrode active material particle having praseodymium hydroxide deposited on the surface be less than 310° C.

For example, europium hydroxide is changed to europium oxyhydroxide at the temperature of 305° C. and europium oxyhydroxide is changed to europium oxide at the temperature of 470° C. When the temperature of heat-treating of the positive electrode active material particle wherein europium hydroxide is deposited is 470° C. or more, europium hydroxide is changed to europium oxide and europium is diffused inside of the positive electrode active material particle. In such a case, the use of europium oxide can not attain the same effect of europium hydroxide or europium oxyhydroxide, and the characteristics of the positive electrode active material are degraded and the characteristics such as charge-discharge efficiency are deteriorated. Therefore, it is preferable that the heat-treatment temperature in the case of heat-treating the positive electrode active material particle having europium hydroxide deposited on the surface be less than 470° C.

For example, gadolinium hydroxide is changed to gadolinium oxyhydroxide at the temperature of 218° C. to 270° C. and gadolinium oxyhydroxide is changed to gadolinium oxide at the temperature of 420° C. to 500° C. When the temperature of heat-treating of the positive electrode active material particle wherein gadolinium hydroxide is deposited is 420° C. or more, gadolinium hydroxide is changed to gadolinium oxide and gadolinium is diffused inside of the positive electrode active material particle. In such a case, the use of gadolinium oxide can not attain the same effect of gadolinium hydroxide or gadolinium oxyhydroxide, and the characteristics of the positive electrode active material are degraded and the characteristics such as charge-discharge efficiency are deteriorated. Therefore, it is preferable that the heat-treatment temperature in the case of heat-treating the positive electrode active material particle having gadolinium hydroxide deposited on the surface be less than 420° C.

For example, lanthanum hydroxide is changed to lanthanum oxyhydroxide at the temperature of 310° C. to 365° C. and lanthanum oxyhydroxide is changed to lanthanum oxide at the temperature of 460° C. to 510° C. When the temperature of heat-treating of the positive electrode active material particle wherein lanthanum hydroxide is deposited is 600° C. or more, lanthanum hydroxide is changed to lanthanum oxide and can not attain the same effect of the use of lanthanum hydroxide or lanthanum oxyhydroxide, and lanthanum is diffused inside of the positive electrode active material particle. As a result, the characteristics of the positive electrode active material are degraded and the characteristics such as charge-discharge efficiency are deteriorated. Therefore, it is preferable that the heat-treatment temperature in the case of heat-treating the positive electrode active material particle having lanthanum hydroxide deposited on the surface be less than 600° C.

For example, yttrium hydroxide is changed to yttrium oxyhydroxide at the temperature of 260° C. and yttrium oxyhydroxide is changed to yttrium oxide at the temperature of 450° C. When the temperature of heat-treating of the positive electrode active material particle wherein yttrium hydroxide is deposited is 450° C. or more, yttrium hydroxide is changed to yttrium oxide and can not attain the same effect of the use of yttrium hydroxide or yttrium oxyhydroxide, and yttrium is diffused inside of the positive electrode active material particle. As a result, the characteristics of the positive electrode active material are degraded and the characteristics such as charge-discharge efficiency are deteriorated. Therefore, it is preferable that the heat-treatment temperature in the case of heat-treating the positive electrode active material particle having yttrium hydroxide deposited on the surface be less than 450° C.

Examples of usable positive electrode active material particle having a particle of neodymium compound, samarium compound, praseodymium compound, europium compound, gadolinium compound, lanthanum compound and yttrium compound dispersed and adhered on the surface include a positive electrode active material which contains at least one element selected from nickel and cobalt. Examples include lithium cobaltate, cobalt-nickel-manganese-lithium complex oxide, aluminum-nickel-manganese-lithium complex oxide, and aluminum-nickel-cobalt-lithium complex oxide, which may be used either alone or in combination.

According to the second aspect of the invention, in the positive electrode for non-aqueous electrolyte secondary battery of the second aspect, the above-described positive electrode active material for non-aqueous electrolyte secondary battery of the second aspect is used.

According to the second aspect of the invention, in the non-aqueous electrolyte secondary battery of the second aspect, the above-described positive electrode for non-aqueous electrolyte secondary battery of the second aspect is used as the positive electrode.

The non-aqueous electrolyte secondary battery according to the second aspect of the invention is not particularly limited in the kind of the negative electrode active material of the negative electrode, and the kind of the non-aqueous electrolyte and hence, may employ any of the known negative electrode active material of negative electrode and non-aqueous electrolyte commonly used in the art. Also, the negative electrode active material of the negative electrode and the non-aqueous electrolyte used in the non-aqueous electrolyte secondary battery according to the first aspect may be employed.

Effect of Invention

According to the present invention, in a non-aqueous electrolyte secondary battery using a first positive electrode active material for non-aqueous electrolyte and a non-aqueous electrolyte secondary battery using a second positive electrode active material for non-aqueous electrolyte, in a case where a charging voltage is increased for the purpose of increasing capacity and a temperature is high, the positive electrode active material contributes to restrict a reaction between the positive electrode active material and a non-aqueous electrolyte. As a result, according to the non-aqueous electrolyte secondary battery of the present invention, in a case where the capacity is increased by increasing charging voltage, deterioration of charge-discharge cycle characteristics is restricted.

According to the non-aqueous electrolyte secondary battery of the present invention, charge-discharge cycle characteristics and preservation characteristics after preservation in a charging condition under high temperature environment and after sequential charging are improved. Further, an expansion of the non-aqueous electrolyte secondary battery caused by gas which is generated inside of the battery is restricted.

Particularly, in the positive electrode active material for non-aqueous electrolyte secondary battery of the first aspect hereof, in a case where erbium composite that is adhered on the surface of the positive electrode active material particle is changed to erbium oxyhydroxide, and in a case where ytterbium composite that is adhered on the surface of the positive electrode active material particle is changed to ytterbium oxyhydroxide, decomposition of the non-aqueous electrolyte caused by reaction between the positive electrode active material and itself is more restricted, so that the above-mentioned effects are enhanced.

EXAMPLES

Figure 1:
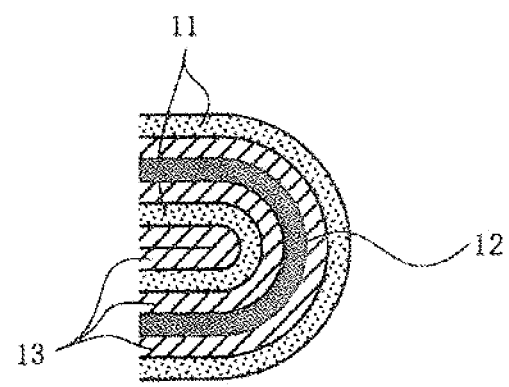
FIG. 1 are a partial cross-sectional explanatory view and a schematic perspective view illustrating a flat electrode fabricated in Examples and Comparative Examples of the present invention.
Figure 1:
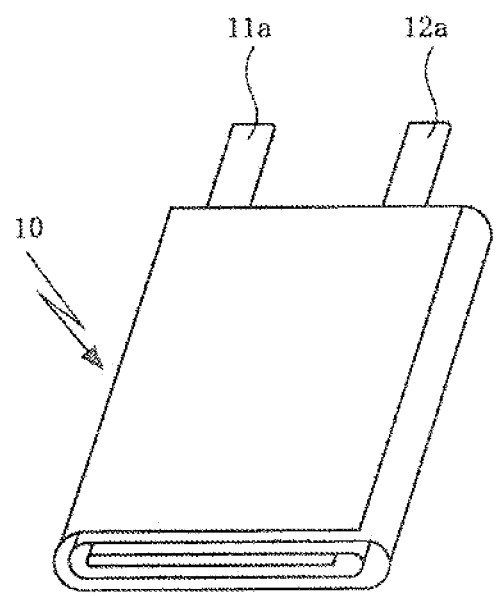

A positive electrode active material for non-aqueous electrolyte secondary battery, a fabrication method of the positive electrode active material for non-aqueous electrolyte secondary battery, a positive electrode for non-aqueous electrolyte secondary battery and a non-aqueous electrolyte secondary battery according to the invention will hereinbelow be described in detail byway of examples thereof. In addition, it will be demonstrated by the comparison with comparative examples that characteristics in a case of increasing charging voltage for increasing capacity of the non-aqueous electrolyte secondary battery are improved, especially, charge-discharge characteristics and preservation characteristics after preservation in a charging condition under high temperature environment and after sequential charging are improved in the non-aqueous electrolyte secondary battery of examples of the invention. It is to be noted that the positive electrode active material for non-aqueous electrolyte secondary battery, the fabrication method of the positive electrode active material for non-aqueous electrolyte secondary battery, the positive electrode for non-aqueous electrolyte secondary battery and the non-aqueous electrolyte secondary battery according to the invention are not limited to the following examples and may be practiced with suitable modifications made thereto so long as such modifications do not deviate from the scope of the invention.

Example A1

Fabrication of Positive Electrode

A positive electrode was prepared in the following manner. Lithium cobaltate wherein each of Mg and Al formed solid solution in a concentration of 0.5 mol % was used as positive electrode active material particle. Then, 1000 g of the positive electrode active material particle was poured into 3 liter of pure water and stirred, and an aqueous solution of erbium nitrate dissolving 5.79 g of erbium nitrate 5-hydrate in 200 ml of pure water was added thereto. After that, 10 mass % of an aqueous solution of sodium hydroxide was appropriately added so that the pH of the resultant solution was 9, and erbium hydroxide was adhered on the surface of the positive electrode active material particle. Then, filtering suction was conducted to collect the treated object by filtration and the treated object was dried at 120° C. Thus was prepared the positive electrode active material particle having erbium hydroxide adhered on the surface.

Next, the positive electrode active material particle having erbium hydroxide adhered on the surface was heat-treated at 300° C. in air atmosphere for 5 hours. Thus was prepared the positive electrode active material having a particle of erbium compound comprising erbium hydroxide and erbium oxyhydroxide adhered on the surface of the positive electrode active material particle.

Here, in the above-mentioned positive electrode active material, a ratio of erbium element (Er) in erbium compound adhering on the surface of the positive electrode active material particle containing lithium cobaltate against the positive electrode active material particle was 0.22 mass %. Further, most of erbium hydroxide adhered on the surface of the positive electrode active material particle were changed to erbium oxyhydroxide.

Then, the positive electrode active material of Example A1 was observed by SEM. The results of the observation showed that a particle diameter of the particle of erbium compound which were adhered on the surface of the positive electrode active material particle was 100 nm or less. In addition, the particle of erbium compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using a mixing and stirring device (a tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm$^3$.

Fabrication of Negative Electrode

A negative electrode was fabricated as follows. Artificial graphite as a negative electrode active material, CMC, carboxymethyl cellulose sodium, and SBR, styrene-butadiene rubber as a binding agent were mixed together in an aqueous solution in a mass ratio of 98:1:1. Thus, negative electrode mixture slurry was prepared. Then, the negative electrode mixture slurry was applied uniformly on both sides of a negative electrode current collector made of copper foil, dried and rolled by a roller to prepare a negative electrode wherein a negative electrode mixture layer was formed on both sides of the negative electrode current collector. The filling density of the negative electrode active material in the negative electrode was 1.75 g/cm$^3$.

Preparation of Non-Aqueous Electrolyte

A non-aqueous electrolyte was prepared as follows. A non-aqueous solvent mixture was prepared by mixing ethylene carbonate and diethyl carbonate which are non-aqueous solvent in a volume ratio of 3:7. A solute of $LiPF_6$ was dissolved in the resultant solvent mixture in a concentration of 1.0 mol/l thereby to give the non-aqueous electrolyte.

Fabrication of Battery

A battery was fabricated in the following method. As shown in FIG. 1(A) and FIG. 1(B), a positive electrode 11 and a negative electrode 12 fabricated as above were coiled with a separator 13 of a fine porous membrane made of polyethylene having lithium ion mobility interposed therebetween. Then, these were pressed to prepare a flat electrode 10.

Next, the flat electrode 10 was accommodated in a battery case 20 formed using aluminum laminate film, and the non-aqueous electrolyte prepared was poured into the battery case 20. Then, the open area of the battery case 20 was sealed so that a positive electrode current collector tub 11a installed on the positive electrode 11 and a negative electrode current collector tub 12a installed on the negative electrode 12 were thrust out. Thus, a flat type-non-aqueous electrolyte secondary battery having a design capacity of 780 mAh in a case of charging to 4.40 V was fabricated.

Example A2

In Example A2, in preparation of the positive electrode of Example A1, the positive electrode active material particle having erbium hydroxide adhered on the surface was heat-treated at 200° C. in air atmosphere for 5 hours. Except for the above, the same procedure as in Example A1 was used to fabricate a non-aqueous electrolyte secondary battery of Example A2.

Here, in the positive electrode active material of Example A2, most of erbium hydroxide adhered on the surface of the positive electrode active material particle were not changed to erbium oxyhydroxide and remained as erbium hydroxide.

Example A3

In Example A3, in preparation of the positive electrode of Example A1, the positive electrode active material particle having erbium hydroxide adhered on the surface was heat-treated at 400° C. in air atmosphere for 5 hours. Except for the above, the same procedure as in Example A1 was used to fabricate a non-aqueous electrolyte secondary battery of Example A3.

Here, in the positive electrode active material of Example A3, most of erbium hydroxide adhered on the surface of the positive electrode active material particle were changed to erbium oxyhydroxide.

Example A4

In Example A4, in preparation of the positive electrode of Example A1, as the heat-treatment, the positive electrode active material particle having erbium hydroxide adhered on the surface was only dried at 120° C. Except for the above, the same procedure as in Example A1 was used to fabricate a non-aqueous electrolyte secondary battery of Example A4.

Here, in the positive electrode active material of Example A4, erbium hydroxide adhered on the surface of the positive electrode active material particle was not changed to erbium oxyhydroxide.

Example A5

In Example A5, in preparation of the positive electrode of Example A1, the amount of erbium nitrate 5-hydrate dissolved in 200 ml of pure water was changed to 2.76 g in adhering erbium hydroxide on the surface of positive electrode active material particle. Except for the above, the same procedure as in Example A1 was used to fabricate a non-aqueous electrolyte secondary battery of Example A5.

Here, in Example A5, a ratio of erbium element (Er) in erbium compound adhering on the surface of the positive electrode active material particle containing lithium cobaltate against the positive electrode active material particle was 0.11 mass %.

Example A6

In Example A6, in preparation of the positive electrode of Example A1, the amount of erbium nitrate 5-hydrate dissolved in 200 ml of pure water was changed to 1.78 g in adhering erbium hydroxide on the surface of positive electrode active material particle. Except for the above, the same procedure as in Example A1 was used to fabricate a non-aqueous electrolyte secondary battery of Example A6.

Here, in Example A6, a ratio of erbium element (Er) in erbium compound adhering on the surface of the positive electrode active material particle containing lithium cobaltate against the positive electrode active material particle was 0.067 mass %.

Example A7

In Example A7, in preparation of the positive electrode of Example A1, the amount of erbium nitrate 5-hydrate dissolved in 200 ml of pure water was changed to 0.93 g in adhering erbium hydroxide on the surface of positive electrode active material particle. Except for the above, the same procedure as in Example A1 was used to fabricate a non-aqueous electrolyte secondary battery of Example A7.

Here, in Example A7, a ratio of erbium element (Er) in erbium compound adhering on the surface of the positive electrode active material particle containing lithium cobaltate against the positive electrode active material particle was 0.035 mass %.

Comparative Example a1

In Comparative Example a1, in preparation of the positive electrode of Example A1, erbium compound was not adhered on the surface of the positive electrode active material particle containing lithium cobaltate. Except for the above, the same procedure as in Example A1 was used to fabricate a non-aqueous electrolyte secondary battery of Comparative Example a1.

Comparative Example a2

In Comparative Example a2, in preparation of the positive electrode of Example A1, erbium oxide was mechanically adhered on the surface of the positive electrode active material particle containing lithium cobaltate as follows: An erbium oxide reagent was pulverized until a particle diameter of a primary particle became 300 nm to prepare erbium oxide. Then, 1.25 g of the foregoing erbium oxide was mixed with 500 g of positive electrode active material particle containing lithium cobaltate by using a mixing machine (a tradename NOBILTA made by HOSOKAWA MICRON CORPORATION). Thus, the positive electrode active material having erbium oxide mechanically adhered on the surface of the positive electrode active material particle containing lithium cobaltate was prepared. Except for the use of such a positive electrode active material prepared as above, the same procedure as in Example A1 was used to fabricate a non-aqueous electrolyte secondary battery of Comparative Example a2.

Here, in Comparative Example a2, a ratio of erbium element (Er) in erbium oxide adhered on the surface of the positive electrode active material particle containing lithium cobaltate against the positive electrode active material particle was 0.22 mass %.

Then, the positive electrode active material of Comparative Example a2 was observed by SEM. The results of the observation showed that erbium oxide was flocculated and adhered on concave parts of the positive electrode active material particle and was not dispersed on the surface of the positive electrode active material particle.

Comparative Example a3

In Comparative Example a3, in preparation of the positive electrode active material of Comparative Example a2, the amount of erbium compound having the primary particle diameter of 300 nm was changed to 5 g. Except for the use of such a positive electrode active material prepared as above, the same procedure as in Example A1 was used to fabricate a non-aqueous electrolyte secondary battery of Comparative Example a3.

Here, in Comparative Example a3, a ratio of erbium element (Er) in erbium compound adhering on the surface of the positive electrode active material particle containing lithium cobaltate against the positive electrode active material particle was 0.87 mass %.

Then, the positive electrode active material of Comparative Example a3 was observed by SEM. The results of the observation showed that erbium oxide was flocculated and adhered on the concave parts of the positive electrode active material particle and was not dispersed on the surface of the positive electrode active material particle the same as Comparative Example a2.

Comparative Example a4

In Comparative Example a4, in preparation of the positive electrode of Example A1, the positive electrode active material particle having erbium hydroxide adhered on the surface was heat-treated at 500° C. in air atmosphere for 5 hours. Except for the above, the same procedure as in Example A1 was used to fabricate a non-aqueous electrolyte secondary battery of Comparative Example a4.

Here, in the positive electrode active material of Comparative Example a4 obtained by the heat-treatment, erbium hydroxide adhered on the surface of the positive electrode active material particle was changed to erbium oxide, and one part of erbium was diffused inside of the positive electrode active material particle.

Comparative Example x1

In Comparative Example x1, in preparation of the positive electrode active material of Example A1, 1000 g of the positive electrode active material particle was poured into 3 liter of pure water and stirred, and an aqueous solution of aluminum nitrate dissolving 30.9 g of aluminum nitrate 9-hydrate in pure water was added thereto. After that, 10 mass % of the aqueous solution of sodium hydroxide was appropriately added so that the pH of the resultant solution was 9, and aluminum hydroxide was adhered on the surface of the positive electrode active material particle. Then, filtering suction was conducted to collect the treated object by filtration and the treated object was dried at 120° C. Thus was prepared the positive electrode active material particle having aluminum compound adhering on the surface. Except for the use of such a positive electrode active material, the same procedure as in Example A1 was used to fabricate a non-aqueous electrolyte secondary battery of Comparative Example x1.

Here, in the positive electrode active material of Comparative Example x1, a ratio of aluminum element (Al) in aluminum compound adhering on the surface of the positive electrode active material particle against the positive electrode active material particle was 0.22 mass %. Further, aluminum compound adhering on the surface of the positive electrode active material particle was aluminum hydroxide.

Comparative Example x2

In Comparative Example x2, the positive electrode active material obtained in Comparative Example x2 was heat-treated at 500° C. in air atmosphere for 5 hours. Thus, the positive electrode active material of Comparative Example x2 was obtained. Except for the use of such a positive electrode active material, the same procedure as in Example A1 was used to fabricate a non-aqueous electrolyte secondary battery of Comparative Example x2.

Here, in the positive electrode active material of Comparative Example x2, a ratio of aluminum element (Al) in aluminum compound adhering on the surface of the positive electrode active material particle against the positive electrode active material particle was 0.22 mass %. Further, aluminum compound adhering on the surface of the positive electrode active material particle was changed to aluminum oxide.

Comparative Example x3

In Comparative Example x3, in preparation of the positive electrode active material of Comparative Example x1, an aqueous solution of aluminum nitrate dissolving 9.27 g of aluminum nitrate 9-hydrate in pure water was added and the heat-treatment was conducted at 120° C. only for drying. Except for the above, the same procedure as in Comparative Example x1 was used to prepare the positive electrode active material of Comparative Example x3. Further, except for the use of such a positive electrode active material, the same procedure as in Example A1 was used to fabricate a non-aqueous electrolyte secondary battery of Comparative Example x3.

Here, in the positive electrode active material of Comparative Example x3, a ratio of aluminum element (Al) in aluminum compound adhering on the surface of the positive electrode active material particle against the positive electrode active material particle was 0.067 mass %. Further, aluminum compound adhering on the surface of the positive electrode active material particle was aluminum hydroxide the same as Comparative Example x1.

Comparative Example y1

In Comparative Example y1, in preparation of the positive electrode active material of Example A1, 1000 g of the positive electrode active material particle was poured into 3 liter of pure water and stirred, and an aqueous solution of zinc sulfate dissolving 19.4 g of zinc sulfate 7-hydrate in pure water was added thereto. After that, 10 mass % of the aqueous solution of sodium hydroxide was appropriately added so that the pH of the resultant solution was 9, and zinc hydroxide was adhered on the surface of the positive electrode active material particle. Then, filtering suction was conducted to collect the treated object by filtration and the treated object was dried at 120° C. Thus was prepared the positive electrode active material particle having zinc compound adhering on the surface. Except for the use of such a positive electrode active material, the same procedure as in Example A1 was used to fabricate a non-aqueous electrolyte secondary battery of Comparative Example y1.

Here, in the positive electrode active material of Comparative Example y1, a ratio of zinc element (Zn) in zinc compound adhering on the surface of the positive electrode active material particle against the positive electrode active material particle was 0.22 mass %. Further, zinc compound adhering on the surface of the positive electrode active material particle was zinc oxide.

Comparative Example z1

In Comparative Example z1, in preparation of the positive electrode active material of Example A1, instead of 5.79 g of erbium nitrate 5-hydrate, 6.84 g of cerium nitrate 6-hydrate was used. Except for the above, the same procedure as in Example A1 was used to prepare the positive electrode active material of Comparative Example z1. Further, except for the use of such a positive electrode active material, the same procedure as in Example A1 was used to fabricate a non-aqueous electrolyte secondary battery of Comparative Example z1.

Here, in the positive electrode active material of Comparative Example z1, a ratio of cerium element (Ce) in cerium compound adhering on the surface of the positive electrode active material particle against the positive electrode active material particle was 0.22 mass %.

Cerium hydroxide represented by a chemical formula, $CeO_2 \cdot 2H_2O$, was measured by thermogravimetric analysis at a heating rate of 5° C./min. As a result of measurement, $CeO_2 \cdot 2H_2O$ was decomposed to $CeO_2 \cdot 0.5H_2O$ at 110° C. or less and was not stable as cerium hydroxide, and decomposed to $CeO_2$ at 280° C. Therefore, it is supposed to be that cerium compound adhering on the surface of the positive electrode active material was neither cerium hydroxide nor cerium oxyhydroxide.

Next, as initial charging, each non-aqueous electrolyte secondary battery of Examples A1 to A7 and Comparative Example a1 to a4 was charged at a constant current to 4.40 V and was further charged at a constant voltage of 4.40 V. Here, in the constant current charging mentioned above, each of the non-aqueous electrolyte secondary batteries was charged at the constant current of 750 mA at room temperature to 4.40 V (4.50 V with respect to lithium metal). In the constant voltage charging mentioned above, each of the non-aqueous electrolyte secondary batteries was charged at the constant voltage of 4.40 V until the current became 37.5 mA. After 10 minutes pause, as initial discharging, each of the batteries was discharged at the constant current of 750 mA to 2.75 V. Thus, initial discharge capacity Qo of each non-aqueous electrolyte secondary battery after the initial charging/discharging was measured.

Further, percentage of initial charging/discharging efficiency of each non-aqueous electrolyte secondary battery of Examples A1 to A7 and Comparative Example a4 was determined. As a result of determination, while the percentage of initial charging/discharging efficiency of each non-aqueous electrolyte secondary battery of Examples A1 to A7 was 89%, the percentage of initial charging/discharging efficiency of non-aqueous electrolyte secondary battery of Comparative Example a4 was 86%. This is because, in the non-aqueous electrolyte secondary battery of Comparative Example a4, it is supposed that erbium hydroxide which was adhered on the surface of the positive electrode active material particle was changed to erbium oxide and that one part of erbium was diffused inside of the positive electrode active material particle.

Next, each non-aqueous electrolyte secondary battery of Examples A1 to A7 and Comparative Examples a1 to a4 after the initial charging/discharging was charged at the constant current to 4.40 V and was further charged at the constant voltage of 4.40 V under room temperature the same as the initial charging. Then, each of the non-aqueous electrolyte secondary batteries was left as it is under atmosphere of 60° C. for 5 days. After that, each of non-aqueous electrolyte secondary batteries was cooled to room temperature and was discharged at the constant current of 750 mA to 2.75 V the same as the initial discharging, to measure discharge capacity Q1 after preservation under high temperature environment. Then, percentage (%) of capacity retention after preservation under high temperature environment was obtained according to the following equation (1). The results are shown in Table 1 below.

$$\text{Percentage (\%) of capacity retention after preservation under high temperature environment}=(Q1/Qo)\times 100 \quad (1)$$

Next, each of the non-aqueous electrolyte secondary batteries of which discharge capacity Q1 after preservation under high temperature environment was measured was charged at the constant current to 4.40 V and was further charged at the constant voltage of 4.40 V under room temperature the same as the initial charging. After 10 minutes pause, each of the batteries was discharged at the constant current of 750 mA to 2.75 V, to measure charge capacity Qa and discharge capacity Q2. Then, each of percentage (%) of capacity recovery after preservation under high temperature environment and the percentage (%) of charging/discharging efficiency after preservation under high temperature environment was obtained according to the following equations (2) and (3). The results are shown in Table 1 below.

$$\text{Percentage (\%) of capacity recovery after preservation under high temperature environment}=(Q2/Qo)\times 100 \quad (2)$$

$$\text{Percentage (\%) of charging/discharging efficiency after preservation under high temperature environment}=(Q2/Qa)\times 100 \quad (3)$$

Further, as to each non-aqueous electrolyte secondary battery of Examples A1 to A7 and Comparative Examples a1 to a4, an increment in thickness of the battery before and after preservation under atmosphere of 60° C. for 5 days was measured. The results are shown in Table 1 below.

TABLE 1

| | Treatment of surface of positive electrode active material | | | Evaluation of characteristics after preservation under high temperature environment | | | |
|---|---|---|---|---|---|---|---|
| | Treatment method | Heat treatment temperature (° C.) | Element adhered and volume of adhesion (mass %) | Percentage (%) of capacity retention | Percentage (%) of capacity recovery | Percentage (%) of charging/ discharging efficiency | Increment in thickness (mm) |
| Ex. A1 | Deposition + Heat-treatment | 300 | Er 0.22 | 75.0 | 95.5 | 99.8 | 0.12 |
| Ex. A2 | Deposition + Heat-treatment | 200 | Er 0.22 | 73.8 | 94.6 | 99.0 | 0.15 |
| Ex. A3 | Deposition + Heat-treatment | 400 | Er 0.22 | 75.3 | 95.2 | 99.1 | 0.13 |
| Ex. A4 | Deposition + Heat-treatment | 120 | Er 0.22 | 72.8 | 94.2 | 99.0 | 0.16 |
| Ex. A5 | Deposition + Heat-treatment | 300 | Er 0.11 | 74.5 | 94.5 | 99.0 | 0.12 |
| Ex. A6 | Deposition + Heat-treatment | 300 | Er 0.067 | 74.8 | 94.1 | 99.5 | 0.11 |
| Ex. A7 | Deposition + Heat-treatment | 300 | Er 0.035 | 74.7 | 94.5 | 99.6 | 0.10 |
| Comp. Ex. a1 | — | — | — | 22.8 | 82.5 | 73.8 | 0.03 |
| Comp. Ex. a2 | Mechanical treatment | — | Er 0.22 | 23.5 | 82.3 | 72.8 | 0.03 |
| Comp. Ex. a3 | Mechanical treatment | — | Er 0.87 | 56.7 | 92.3 | 78.5 | 0.15 |
| Comp. Ex. a4 | Deposition + Heat-treatment | 500 | Er 0.22 | 64.8 | 94.1 | 89.5 | 0.15 |

As is apparent from Table 1 the above, each of the non-aqueous electrolyte secondary batteries of Examples A1 to A7 which utilized the positive electrode active material having the particle of erbium compound comprising erbium hydroxide and erbium oxyhydroxide dispersed and adhered on the surface of the positive electrode active material particle containing lithium cobaltate showed high percentage of capacity retention, high percentage of capacity recovery and high percentage of charging/discharging efficiency after preservation under high temperature environment in the case of charging to high voltage of 4.40 V. On the other hand, as to each of the non-aqueous electrolyte secondary batteries of Comparative Examples a1 to a4, the percentage of capacity retention, the percentage of capacity recovery and the percentage of high charging/discharging efficiency after preservation under high temperature environment in the case of charging to high voltage of 4.40 V were decreased as compared with each of the non-aqueous electrolyte secondary batteries of Examples A1 to A7.

Further, as to increment of thickness, each of the non-aqueous electrolyte secondary batteries of Comparative Examples a1 and a2 showed the lower value as compared with each of the non-aqueous electrolyte secondary batteries of Examples A1 to A7 and Comparative Examples a3 and a4. The reason is supposed to be as follows. In the non-aqueous electrolyte secondary batteries of Comparative Examples a1 and a2, electric potential is decreased by self-discharging of the positive electrode, so that the reaction between the positive electrode active material and the non-aqueous electrolyte is restricted.

Next, as to each of the non-aqueous electrolyte secondary batteries of Examples A1 to A7, Comparative Examples a1 to a4, Comparative Examples x1 to x3, Comparative Example y1 and Comparative Example z1, the initial charging/discharging was conducted and the initial discharge capacity Qo was measured. After that, a high-temperature sequence charging examination was conducted as follows: Each of the non-aqueous electrolyte secondary batteries was retained in a thermostatic container of 60° C. and charged at a constant current of 750 mA until the voltage became 4.40V. Then, each of the non-aqueous electrolyte secondary batteries was charged so as to maintain the voltage of 4.40 V for 3 days. Next, as to each of the non-aqueous electrolyte secondary batteries, the increment in thickness thereof after high-temperature sequence charging examination against before high-temperature sequence charging examination was measured. The results are shown in Table 2 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. After that, 10 minutes pause was made. Then, percentage (%) of capacity retention after high-temperature sequence charging examination was obtained according to the following equation (4). The results are shown in Table 2 below.

Percentage (%) of capacity retention after high-temperature sequence charging examination=$(Q3/Qo) \times 100$ (4)

After 10 minutes pause, each of the non-aqueous electrolyte secondary batteries was charged at the constant current to 4.40 V and was further charged at the constant voltage of 4.40 V under room temperature the same as the initial charging. After 10 minutes pause, each of the non-aqueous electrolyte secondary batteries was discharged at the constant current of 750 mA until the voltage became 2.75 V to measure charging capacity Qb and discharge capacity Q4. Then, percentage (%) of capacity recovery after high-temperature sequence charging examination and percentage (%) of charging/discharging efficiency after high-temperature sequence charging examination were obtained according to the following equations (5) and (6). The results are shown in Table 2 below.

Percentage (%) of capacity recovery after high-temperature sequence charging examination=$(Q4/Qo) \times 100$ (5)

Percentage (%) of charging/discharging efficiency after high-temperature sequence charging examination=$(Q4/Qb) \times 100$ (6)

TABLE 2

| | Treatment of surface of positive electrode active material | | | Evaluation of characteristics after high-temperature sequence charging examination | | | |
|---|---|---|---|---|---|---|---|
| | Treatment method | Heat treatment temperature (° C.) | Element adhered and volume of adhesion (mass %) | Percentage (%) of capacity retention | Percentage (%) of capacity recovery | Percentage (%) of charging/ discharging efficiency | Increment in thickness (mm) |
| Ex. A1 | Deposition + Heat-treatment | 300 | Er 0.22 | 84.5 | 79.1 | 99.9 | 1.01 |
| Ex. A2 | Deposition + Heat-treatment | 200 | Er 0.22 | 83.2 | 78.5 | 98.8 | 1.22 |
| Ex. A3 | Deposition + Heat-treatment | 400 | Er 0.22 | 84.6 | 78.8 | 99.5 | 1.05 |
| Ex. A4 | Deposition + Heat-treatment | 120 | Er 0.22 | 83.0 | 78.2 | 98.7 | 1.25 |
| Ex. A5 | Deposition + Heat-treatment | 300 | Er 0.11 | 84.2 | 79.2 | 99.9 | 0.95 |
| Ex. A6 | Deposition + Heat-treatment | 300 | Er 0.067 | 84.5 | 79.1 | 100 | 0.91 |
| Ex. A7 | Deposition + Heat-treatment | 300 | Er 0.035 | 84.4 | 79.5 | 100 | 0.85 |
| Comp. Ex. a1 | — | — | — | 52.7 | 57.5 | 85.9 | 6.88 |
| Comp. Ex. a2 | Mechanical treatment | — | Er 0.22 | 52.5 | 58.9 | 88.6 | 8.02 |
| Comp. Ex. a3 | Mechanical treatment | — | Er 0.87 | 68.3 | 67.3 | 88.8 | 6.47 |
| Comp. Ex. a4 | Deposition + Heat-treatment | 500 | Er 0.22 | 78.9 | 76.8 | 93.5 | 2.52 |
| Comp. Ex. x1 | Deposition + Heat-treatment | 120 | Al 0.22 | 61.5 | 68.3 | 94.5 | 2.89 |
| Comp. Ex. x2 | Deposition + Heat-treatment | 500 | Al 0.22 | 58.5 | 65.8 | 95.5 | 3.55 |

TABLE 2-continued

|  | Treatment of surface of positive electrode active material | | | | Evaluation of characteristics after high-temperature sequence charging examination | | | |
|---|---|---|---|---|---|---|---|---|
|  | Treatment method | Heat treatment temperature (° C.) | Element adhered and volume of adhesion | (mass %) | Percentage (%) of capacity retention | Percentage (%) of capacity recovery | Percentage (%) of charging/ discharging efficiency | Increment in thickness (mm) |
| Comp. Ex. x3 | Deposition + Heat-treatment | 120 | Al | 0.067 | 64.5 | 67.3 | 92.5 | 5.25 |
| Comp. Ex. y1 | Deposition + Heat-treatment | 120 | Zn | 0.22 | 69.1 | 61.5 | 90.0 | 6.35 |
| Comp. Ex. z1 | Deposition + Heat-treatment | 300 | Ce | 0.22 | 71.2 | 67.8 | 89.5 | 3.12 |

As is apparent from Table 2 the above, in each of the non-aqueous electrolyte secondary batteries of Examples A1 to A7 after high-temperature sequence charging examination, the value of increment of thickness was lower and the percentage of capacity retention, the percentage of capacity recovery and the percentage of charging/discharging efficiency were more improved as compared with each of the non-aqueous electrolyte secondary batteries of Comparative Examples a1 to a4.

Further, as compared with each of the non-aqueous electrolyte secondary batteries of Comparative Examples x1 to x3, y1 and z1, in each of the non-aqueous electrolyte secondary batteries of Examples A1 to A7 after high-temperature sequence charging examination, the value of increment of thickness was lower, and the percentage of capacity retention, the percentage of capacity recovery and the percentage of charging/discharging efficiency were more improved. The reason is thought to be as follows. Although the contact between the non-aqueous electrolyte and the positive electrode active material particle was restricted by adhering the particle of aluminum compound or zinc compound which does not contribute to charging/discharging on the surface of the positive electrode active material particle, the decomposition reaction of the non-aqueous electrolyte by the transition metal having catalytic property contained in the positive electrode active material on the surface of the positive electrode active material was not fully restricted.

Each of the non-aqueous electrolyte secondary batteries of Example A1 and Comparative Example a1 was charged at the constant current to 4.40 V and was further charged at the constant voltage of 4.40 V the same as the initial charging. Then, each of the non-aqueous electrolyte secondary batteries was disassembled and each of the positive electrodes was taken out. Next, each positive electrode taken out and the non-aqueous electrolyte were put in an airtight container made by SUS and was measured raising the temperature to 305° C. at a heating rate of 5° C./min by the thermal analysis using a differential scanning calorimetry (DSC) for determining calorific value and temperature. The relationship between calorific value and temperature are shown in FIG. 3.

Figure 3:
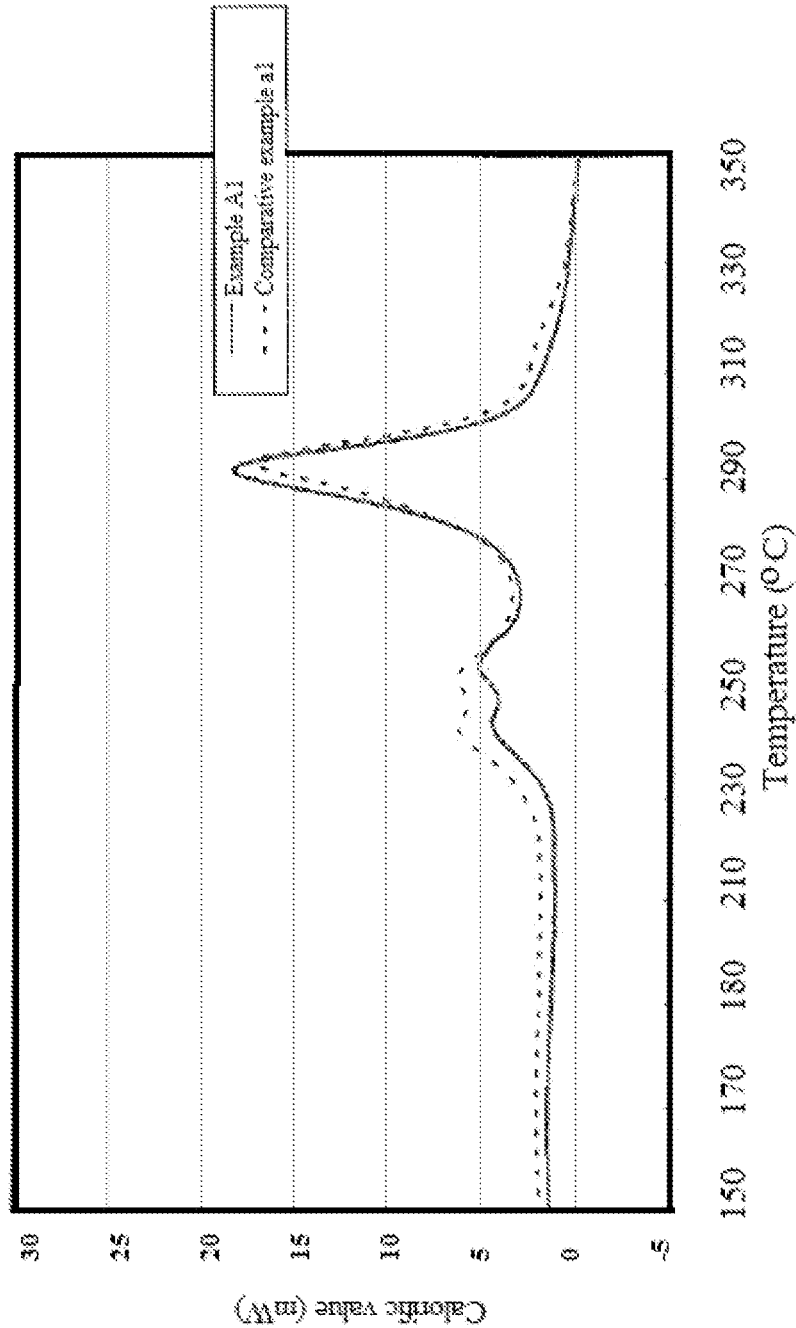
FIG. 3 is a graph showing a relationship between calorific value and temperature determined by the thermal analysis by a differential scanning calorimetry (DSC).

As is apparent from FIG. 3, in each of the positive electrode of the non-aqueous electrolyte secondary batteries of Example A1 and Comparative Example a1, the relationship between calorific value and temperature was almost the same and the change of thermal stability observed in Patent document 3 was not observed.

Example A8

In Example A8, in preparation of the positive electrode active material particle of Example A1, lithium cobaltate wherein each of Mg, Al and Zr formed a solid solution in a concentration of 0.5 mol % was used. Except for the above, the same procedure as in Example A1 was used to fabricate a positive electrode of Example A8 by adhering the particle of erbium compound on the surface of positive electrode active material particle, and such a positive electrode fabricated was used in a non-aqueous electrolyte secondary battery of Example A8.

Comparative Example a5

In Comparative Example a5, in preparation of the positive electrode of Example A1, the same positive electrode active material of Example A8 was used, but erbium compound was not adhered on the surface of the positive electrode active material. Except for the above, the same procedure as in Example A1 was used to fabricate a non-aqueous electrolyte secondary battery of Comparative Example a5.

Next, as to each of the non-aqueous electrolyte secondary batteries of Examples A8 and Comparative Example a5, percentage (%) of capacity retention after preservation under high temperature environment, percentage (%) of capacity recovery after preservation under high temperature environment, percentage (%) of charging/discharging efficiency after preservation under high temperature environment, and increment of thickness of the non-aqueous electrolyte secondary battery after preservation under high temperature environment were determined the same as the non-aqueous electrolyte secondary batteries of Examples A1 to A7 and Comparative Examples a1 to a4. The results were shown together with the results of the non-aqueous electrolyte secondary batteries of Examples A1 and Comparative Example a1 in Table 3 below.

TABLE 3

| | Positive electrode active material and Treatment of surface thereof | | | Evaluation of characteristics after preservation under high temperature environment | | | |
|---|---|---|---|---|---|---|---|
| | Solid solution (mol %) | Heat treatment temperature (° C.) | Element adhered and volume of adhesion (mass %) | Percentage (%) of capacity retention | Percentage (%) of capacity recovery | Percentage (%) of charging/ discharging efficiency | Increment in thickness (mm) |
| Ex. A1 | Al (0.5) Mg (0.5) | 300 | Er  0.22 | 75.0 | 95.5 | 99.8 | 0.12 |
| Ex. A8 | Al (0.5) Mg (0.5) Zr (0.5) | 300 | Er  0.22 | 78.2 | 95.8 | 100 | 0.10 |
| Comp. Ex. a1 | Al (0.5) Mg (0.5) | — | — — | 22.8 | 82.5 | 73.8 | 0.03 |
| Comp. Ex. a5 | Al (0.5) Mg (0.5) Zr (0.5) | — | — — | 23.5 | 81.9 | 74.2 | 0.04 |

Further, as to each of the non-aqueous electrolyte secondary batteries of Examples A8 and Comparative Example a5, percentage (%) of capacity retention after high-temperature sequence charging examination, percentage (%) of capacity recovery after high-temperature sequence charging examination, percentage (%) of charging/discharging efficiency after high-temperature sequence charging examination, and increment of thickness of the non-aqueous electrolyte secondary battery after high-temperature sequence charging examination were determined the same as the non-aqueous electrolyte secondary batteries of Examples A1 to A7 and Comparative Examples a1 to a4. The results were shown together with the results of the non-aqueous electrolyte secondary batteries of Examples A1 and Comparative Example a1 in Table 4 below.

TABLE 4

| | Positive electrode active material and Treatment of surface thereof | | | Evaluation of characteristics after high-temperature sequence charging examination | | | |
|---|---|---|---|---|---|---|---|
| | Solid solution (mol %) | Heat treatment temperature (° C.) | Element adhered and volume of adhesion (mass %) | Percentage (%) of capacity retention | Percentage (%) of capacity recovery | Percentage (%) of charging/ discharging efficiency | Increment in thickness (mm) |
| Ex. A1 | Al (0.5) Mg (0.5) | 300 | Er  0.22 | 84.5 | 79.1 | 99.9 | 1.01 |
| Ex. A8 | Al (0.5) Mg (0.5) Zr (0.5) | 300 | Er  0.22 | 86.9 | 81.2 | 99.9 | 0.58 |
| Comp. Ex. a1 | Al (0.5) Mg (0.5) | — | — — | 52.7 | 57.5 | 85.9 | 6.88 |
| Comp. Ex. a5 | Al (0.5) Mg (0.5) Zr (0.5) | — | — — | 52.9 | 58.2 | 85.9 | 6.65 |

As a result, the same as the non-aqueous electrolyte secondary batteries of Examples A1 to A7, in the non-aqueous electrolyte secondary battery of Example A8, the percentage of capacity retention, the percentage of capacity recovery and the percentage of charging/discharging efficiency after preservation under high temperature environment were more improved as compared with the non-aqueous electrolyte secondary batteries of Comparative Examples a1 and a5. Further, as to the non-aqueous electrolyte secondary battery of Example A8, the value of increment of thickness after high-temperature sequence charging examination was much lower as compared with the non-aqueous electrolyte secondary batteries of Comparative Examples a1 and a5. Still further, in the non-aqueous electrolyte secondary battery of Example A8, the percentage of capacity retention, the percentage of capacity recovery, and the percentage of charging/discharging efficiency after high-temperature sequence charging examination were more improved as compared with the non-aqueous electrolyte secondary batteries of Comparative Examples a1 and a5.

Further, in the non-aqueous electrolyte secondary battery of Example A8, even as compared with the non-aqueous electrolyte secondary battery of Example A1, the value of increment of thickness of the non-aqueous electrolyte secondary battery after preservation under high temperature environment was lower, and the percentage of capacity retention, the percentage of capacity recovery and the percentage of charging/discharging efficiency after preservation under high temperature environment were improved. Still further, in the non-aqueous electrolyte secondary battery of Example A8, even as compared with the non-aqueous electrolyte secondary battery of Example A1, the percentage of capacity retention and the percentage of capacity recovery after high-temperature sequence charging examination were more improved and particularly, the value of increment of thickness of the non-aqueous electrolyte secondary battery after high-temperature sequence charging examination was much lower.

The reason is thought to be as follows. As shown in Example A8, in the case where the positive electrode active material having erbium compound dispersed and adhered on the surface of the positive electrode active material particle of lithium cobaltate wherein each of Mg, Al and Zr formed the solid solution, due to Zr as solid solution in lithium cobaltate, crystal structure of positive electrode active material was stabilized. In addition, due to erbium compound dispersed and adhered on the surface, the reaction between the positive electrode active material and the non-aqueous electrolyte was restricted. As a result of synergistic effect of the above, it is supposed that the value of increment of thickness of the non-aqueous electrolyte secondary battery after high-temperature sequence charging examination was much lower.

On the other hand, in the non-aqueous electrolyte secondary battery of Comparative Example a5, as compared with the non-aqueous electrolyte secondary battery of Comparative Example a1, the value of increment in thickness of the non-aqueous electrolyte secondary battery after high-temperature sequence charging examination was not so low. The reason is thought to be as follows. As shown in Comparative Example a5, even if the positive electrode active material particle of lithium cobaltate wherein each of Mg, Al and Zr formed solid solution was used, because erbium compound was not dispersed nor adhered on the surface of positive electrode active material particle, the reaction between the positive electrode active material and the non-aqueous electrolyte was caused and the effect of the stabilization of crystal structure of the positive electrode active material obtained by Zr as solid solution could not be obtained.

Example B1

A positive electrode of Example B1 was prepared in the following manner. Lithium cobaltate wherein each of Mg and Al formed solid solution in a concentration of 0.5 mol % was used as positive electrode active material particle. Then, 1000 g of the positive electrode active material particle was poured into 3 liter of pure water and stirred, and an aqueous solution of ytterbium nitrate dissolving 5.24 g of ytterbium nitrate 3-hydrate in 200 ml of pure water was added thereto. After that, 10 mass % of an aqueous solution of sodium hydroxide was appropriately added so that the pH of the resultant solution was 9, and ytterbium hydroxide was adhered on the surface of the positive electrode active material particle. Then, filtering suction was conducted to collect the treated object by filtration and the treated object was dried at 120° C. Thus was prepared the positive electrode active material particle having ytterbium hydroxide adhered on the surface.

Next, the positive electrode active material particle having ytterbium hydroxide adhered on the surface was heat-treated at 300° C. in air atmosphere for 5 hours. Thus was prepared the positive electrode active material having a particle of ytterbium compound comprising ytterbium hydroxide and ytterbium oxyhydroxide dispersed and adhered on the surface of the positive electrode active material particle.

Here, in the above-mentioned positive electrode active material, a ratio of ytterbium element (Yb) in ytterbium compound adhering on the surface of the positive electrode active material particle containing lithium cobaltate against the positive electrode active material particle was 0.22 mass %. Further, most of ytterbium hydroxide adhered on the surface of the positive electrode active material particle were changed to ytterbium oxyhydroxide.

Then, the positive electrode active material of Example B1 was observed by SEM. The results of the observation showed that a particle diameter of most of the particle of ytterbium compound which were adhered on the surface of the positive electrode active material particle was 100 nm or less. In addition, the particle of ytterbium compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using a mixing and stirring device (a tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm$^3$.

Except for the use of such a positive electrode fabricated above, a flat type-non-aqueous electrolyte secondary battery of Example B1 having a design capacity of 780 mAh in a case of charging to 4.40 V was fabricated the same as Example A1.

Example B2

In Example B2, in preparation of the positive electrode of Example B1, the positive electrode active material particle having ytterbium hydroxide adhered on the surface was heat-treated at 200° C. in air atmosphere for 5 hours. Except for the above, the same procedure as in Example B1 was used to fabricate a non-aqueous electrolyte secondary battery of Example B2.

Here, in the positive electrode active material obtained by heat treatment as Example B1, most of ytterbium hydroxide adhered on the surface of the positive electrode active material particle were not changed to ytterbium oxyhydroxide and remained as ytterbium hydroxide.

Example B3

In Example B3, in preparation of the positive electrode of Example B1, as the heat-treatment, the positive electrode active material particle having ytterbium hydroxide adhered on the surface was only dried at 120° C. Except for the above, the same procedure as in Example B1 was used to fabricate a non-aqueous electrolyte secondary battery of Example B3.

Here, in the positive electrode active material of Example B3 wherein the heat-treatment was only drying at 120° C., ytterbium hydroxide adhered on the surface of the positive electrode active material particle was not changed to ytterbium oxyhydroxide.

Example B4

In Example B4, in preparation of the positive electrode of Example B1, the amount of ytterbium nitrate 3-hydrate dissolved in 200 ml of pure water was changed to 1.59 g in adhering ytterbium hydroxide on the surface of positive electrode active material particle. Except for the above, the same procedure as in Example B1 was used to fabricate a non-aqueous electrolyte secondary battery of Example B4.

Here, in Example B4, a ratio of ytterbium element (Yb) in ytterbium compound adhering on the surface of the positive electrode active material particle containing lithium cobaltate against the positive electrode active material particle was 0.067 mass %. Further, most of ytterbium hydroxide adhered on the surface of the positive electrode active material particle were changed to ytterbium oxyhydroxide.

Comparative Example b1

In Comparative Example b1, in preparation of the positive electrode of Example B1, ytterbium compound was not adhered on the surface of the positive electrode active material particle containing lithium cobaltate. Except for the above, the same procedure as in Example B1 was used to fabricate a non-aqueous electrolyte secondary battery of Comparative Example b1.

Comparative Example b2

In Comparative Example b2, in preparation of the positive electrode of Example B1, ytterbium oxide was mechanically adhered on the surface of the positive electrode active material particle containing lithium cobaltate as follows: An ytterbium oxide reagent was pulverized until a particle diameter of a primary particle became 300 nm to prepare ytterbium oxide. Then, 1.25 g of the foregoing ytterbium oxide was mixed with 500 g of positive electrode active material particle containing lithium cobaltate by using the mixing machine (the tradename NOBILTA made by HOSOKAWA MICRON CORPORATION). Thus, the positive electrode active material having ytterbium oxide mechanically adhered on the surface of the positive electrode active material particle containing lithium cobaltate was prepared. Except for the use of such a positive electrode active material prepared as above, the same procedure as in Example B1 was used to fabricate a non-aqueous electrolyte secondary battery of Comparative Example b2.

Here, in Comparative Example b2, a ratio of ytterbium element (Yb) in ytterbium oxide adhered on the surface of the positive electrode active material particle containing lithium cobaltate against the positive electrode active material particle was 0.22 mass %.

Then, the positive electrode active material of Comparative Example b2 was observed by SEM. The results of the observation show that ytterbium oxide was flocculated and adhered on the concave parts of the positive electrode active material particle and was not dispersed on the surface of the positive electrode active material particle.

Comparative Example b3

In Comparative Example b3, in preparation of the positive electrode active material of Comparative Example b2, the amount of ytterbium oxide having the primary particle diameter of 300 nm was changed to 5 g. Except for the use of such a positive electrode active material prepared as above, the same procedure as in Example B1 was used to fabricate a non-aqueous electrolyte secondary battery of Comparative Example b3.

Here, in Comparative Example b3, a ratio of ytterbium element (Yb) in ytterbium oxide adhered on the surface of the positive electrode active material particle containing lithium cobaltate against the positive electrode active material particle was 0.87 mass %.

Then, the positive electrode active material of Comparative Example b3 was observed by SEM. The results of the observation showed that ytterbium oxide was flocculated and adhered on the concave parts of the positive electrode active material particle and was not dispersed on the surface of the positive electrode active material particle the same as Comparative Example b2.

Comparative Example b4

In Comparative Example b4, in preparation of the positive electrode of Example B1, the positive electrode active material particle having ytterbium hydroxide adhered on the surface was heat-treated at 500° C. in air atmosphere for 5 hours. Except for the above, the same procedure as in Example B1 was used to fabricate a non-aqueous electrolyte secondary battery of Comparative Example b4.

Here, in the positive electrode active material of Comparative Example b4 obtained by the heat-treatment, ytterbium hydroxide adhered on the surface of the positive electrode active material particle was changed to ytterbium oxide, and one part of ytterbium was diffused inside of the positive electrode active material particle.

Next, as the initial charging, each of the non-aqueous electrolyte secondary batteries of Examples B1 to B4 and Comparative Examples b1 to b4 was charged at the constant current to 4.40 V and was further charged at the constant voltage of 4.40 V the same as the non-aqueous electrolyte secondary battery of Example A1. After 10 minutes pause, as the initial discharging, each of the batteries was discharged at the constant current of 750 mA to 2.75 V. Thus, initial discharge capacity Qo of each non-aqueous electrolyte secondary battery after the initial charging/discharging was measured.

Further, percentage of initial charging/discharging efficiency of each non-aqueous electrolyte secondary battery of Examples B1 to B4 and Comparative Example b4 was determined. As a result of determination, while the percentage of initial charging/discharging efficiency of each non-aqueous electrolyte secondary battery of Examples B1 to B4 was 89%, the percentage of initial charging/discharging efficiency of non-aqueous electrolyte secondary battery of Comparative Example b4 was 87%. This is because, in the non-aqueous electrolyte secondary battery of Comparative Example b4, it is supposed that ytterbium hydroxide which was adhered on the surface of the positive electrode active material particle was changed to ytterbium oxide and that one part of ytterbium was diffused inside of the positive electrode active material particle.

Next, the same as the non-aqueous electrolyte secondary battery of Example A1, each non-aqueous electrolyte secondary battery of Examples B1 to B4 and Comparative Examples b1 to b4 after the initial charging/discharging was charged at the constant current to 4.40 V and was further charged at the constant voltage of 4.40 V. Then, each of the non-aqueous electrolyte secondary batteries was left as it is under atmosphere of 60° C. for 5 days. After that, the same as the non-aqueous electrolyte secondary battery of Examples A1, each of non-aqueous electrolyte secondary batteries was cooled to room temperature and was discharged at the constant current of 750 mA to 2.75 V, to measure discharge capacity Q1 after preservation under high temperature environment. Then, percentage (%) of capacity retention after preservation under high temperature environment was obtained according to the equation (1). The results are shown in Table 5 below.

Next, the same as the non-aqueous electrolyte secondary battery of Examples A1, each of the non-aqueous electrolyte secondary batteries of which discharge capacity Q1 after preservation under high temperature environment was measured was charged at the constant current to 4.40 V and was further charged at the constant voltage of 4.40 V. After 10 minutes pause, each of the batteries was discharged at the constant current of 750 mA to 2.75 V, to measure charge capacity Qa and discharge capacity Q2. Then, each of percentage (%) of capacity recovery after preservation under high temperature environment and the percentage (%) of charging/discharging efficiency after preservation under high temperature environment was obtained according to the equations (2) and (3). The results are shown in Table 5 below.

Further, as to each non-aqueous electrolyte secondary battery of Examples B1 and B2 and Comparative Examples b1 to b4, the increment in thickness of the battery before and after preservation under atmosphere of 60° C. for 5 days was measured. The results are shown in Table 5 below.

TABLE 5

|  | Treatment of surface of positive electrode active material | | | Evaluation of characteristics after preservation under high temperature environment | | | |
| --- | --- | --- | --- | --- | --- | --- | --- |
|  | Treatment method | Heat treatment temperature (° C.) | Element adhered and volume of adhesion (mass %) | | Percentage (%) of capacity retention | Percentage (%) of capacity recovery | Percentage (%) of charging/ discharging efficiency | Increment in thickness (mm) |
| Ex. B1 | Deposition + Heat-treatment | 300 | Yb | 0.22 | 74.8 | 94.8 | 99.7 | 0.11 |
| Ex. B2 | Deposition + Heat-treatment | 200 | Yb | 0.22 | 72.8 | 94.4 | 99.3 | 0.15 |
| Comp. Ex. b1 | — | — | — | — | 24.5 | 83.3 | 72.8 | 0.03 |
| Comp. Ex. b2 | Mechanical treatment | — | Yb | 0.22 | 24.6 | 83.8 | 72.9 | 0.02 |
| Comp. Ex. b3 | Mechanical treatment | — | Yb | 0.87 | 48.3 | 88.8 | 76.5 | 0.08 |
| Comp. Ex. b4 | Deposition + Heat-treatment | 500 | Yb | 0.22 | 62.8 | 93.8 | 89.6 | 0.14 |

As is apparent from Table 5 the above, each of the non-aqueous electrolyte secondary batteries of Examples B1 and B2 which utilized the positive electrode active material having the particle of ytterbium compound comprising ytterbium hydroxide and ytterbium oxyhydroxide dispersed and adhered on the surface of the positive electrode active material particle showed high percentage of capacity retention, high percentage of capacity recovery and high percentage of charging/discharging efficiency after preservation under high temperature environment in the case of charging to high voltage of 4.40 V. On the other hand, as to each of the non-aqueous electrolyte secondary batteries of Comparative Examples b1 to b4, the percentage of capacity retention, the percentage of capacity recovery and the percentage of high charging/discharging efficiency after preservation under high temperature environment in the case of charging to high voltage of 4.40 V were decreased as compared with each of the non-aqueous electrolyte secondary batteries of Examples B1 and B2.

Further, as to increment of thickness, each of the non-aqueous electrolyte secondary batteries of Comparative Examples b1 and b2 showed smaller value as compared with each of the non-aqueous electrolyte secondary batteries of Examples B1 and B2 and Comparative Examples b3 and b4. The reason is supposed as follows. In the non-aqueous electrolyte secondary batteries of Comparative Examples b1 and b2, an electric potential of the positive electrode was decreased by self-discharging thereof, so that the reaction between the positive electrode active material and the non-aqueous electrolyte was restricted.

Next, as to each of the non-aqueous electrolyte secondary batteries of Examples B1 to B4 and Comparative Examples b1 to b4, the initial charging/discharging was conducted and the initial discharge capacity Qo was measured. After that, the same as the non-aqueous electrolyte secondary battery of Examples A1, each of the non-aqueous electrolyte secondary batteries was subjected to the high-temperature sequence charging examination. Next, as to each of the non-aqueous electrolyte secondary batteries, the increment in thickness thereof after high-temperature sequence charging examination against before high-temperature sequence charging examination was measured. The results are shown together with the results of non-aqueous electrolyte secondary batteries of Comparative Examples x1 to x3, y1 and z1 in Table 6 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. After that, percentage (%) of capacity retention after high-temperature sequence charging examination was obtained according to the equation (4). The results are shown together with the results of non-aqueous electrolyte secondary batteries of Comparative Examples x1 to x3, y1 and z1 in Table 6 below.

After 10 minutes pause, each of the non-aqueous electrolyte secondary batteries was charged at the constant current of 750 mA to 4.40 V and was further charged at the constant voltage of 4.40 V until the current became 37.5 mA under room temperature to measure charging capacity Qb. Then, 10 minutes pause was made. Then, each of the non-aqueous electrolyte secondary batteries after high-temperature sequence charging examination was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown together with the results of non-aqueous electrolyte secondary batteries of Comparative Examples x1 to x3, y1 and z1 in Table 6 below.

TABLE 6

| | Treatment of surface of positive electrode active material | | | Evaluation of characteristics after high-temperature sequence charging examination | | | |
|---|---|---|---|---|---|---|---|
| | Treatment method | Heat treatment temperature (° C.) | Element adhered and volume of adhesion (mass %) | Percentage (%) of capacity retention | Percentage (%) of capacity recovery | Percentage (%) of charging/ discharging efficiency | Increment in thickness (mm) |
| Ex. B1 | Deposition + Heat-treatment | 300 | Yb 0.22 | 83.7 | 78.9 | 99.9 | 1.03 |
| Ex. B2 | Deposition + Heat-treatment | 200 | Yb 0.22 | 82.8 | 78.3 | 98.9 | 1.25 |
| Ex. B3 | Deposition + Heat-treatment | 120 | Yb 0.22 | 82.5 | 78.5 | 99.0 | 1.35 |
| Ex. B4 | Deposition + Heat-treatment | 300 | Yb 0.067 | 81.5 | 77.5 | 99.5 | 1.31 |
| Comp. Ex. b1 | — | — | — | 53.8 | 58.1 | 87.2 | 6.99 |
| Comp. Ex. b2 | Mechanical treatment | — | Yb 0.22 | 54.2 | 57.6 | 88.8 | 7.58 |
| Comp. Ex. b3 | Mechanical treatment | — | Yb 0.87 | 58.8 | 61.8 | 88.5 | 6.59 |
| Comp. Ex. b4 | Deposition + Heat-treatment | 500 | Yb 0.22 | 77.5 | 74.5 | 92.8 | 2.82 |
| Comp. Ex. x1 | Deposition + Heat-treatment | 120 | Al 0.22 | 61.5 | 68.3 | 94.5 | 2.89 |
| Comp. Ex. x2 | Deposition + Heat-treatment | 500 | Al 0.22 | 58.5 | 65.8 | 95.5 | 3.55 |
| Comp. Ex. x3 | Deposition + Heat-treatment | 120 | Al 0.067 | 64.5 | 67.3 | 92.5 | 5.25 |
| Comp. Ex. y1 | Deposition + Heat-treatment | 120 | Zn 0.22 | 69.1 | 61.5 | 90.0 | 6.35 |
| Comp. Ex. z1 | Deposition + Heat-treatment | 300 | Ce 0.22 | 71.2 | 67.8 | 89.5 | 3.12 |

As is apparent from Table 6 the above, in each of the non-aqueous electrolyte secondary batteries of Examples B1 to B4, the value of increment of thickness after high-temperature sequence charging examination was lower and the percentage of capacity retention, the percentage of capacity recovery and the percentage of charging/discharging efficiency after high-temperature sequence charging examination were more improved as compared with each of the non-aqueous electrolyte secondary batteries of Comparative Examples b1 to b4.

Further, as compared with each of the non-aqueous electrolyte secondary batteries of Comparative Examples x1 to x3 and y1, in each of the non-aqueous electrolyte secondary batteries of Examples B1 to B4, the same as the non-aqueous electrolyte secondary batteries of Examples A1 to A7, the value of increment of thickness after high-temperature sequence charging examination was lower and the percentage of capacity retention, the percentage of capacity recovery and the percentage of charging/discharging efficiency after high-temperature sequence charging examination were more improved.

Example C1

A positive electrode of Example C1 was prepared in the following manner. Lithium cobaltate wherein each of Mg and Al formed solid solution in a concentration of 0.5 mol % was used as positive electrode active material particle. Then, 1000 g of the positive electrode active material particle was poured into 3 liter of pure water and stirred, and an aqueous solution of terbium nitrate dissolving 6.19 g of terbium nitrate 6-hydrate in 200 ml of pure water was added thereto. After that, 10 mass % of an aqueous solution of sodium hydroxide was appropriately added so that the pH of the resultant solution was 9, and terbium hydroxide was adhered on the surface of the positive electrode active material particle. Then, filtering suction was conducted to collect the treated object by filtration and the treated object was dried at 120° C. Thus was prepared the positive electrode active material particle having terbium hydroxide adhered on the surface.

Next, the positive electrode active material particle having terbium hydroxide adhered on the surface was heat-treated at 300° C. in air atmosphere for 5 hours. Thus was prepared the positive electrode active material having a particle of terbium compound dispersed and adhered on the surface of the positive electrode active material particle.

Here, in the above-mentioned positive electrode active material, a ratio of terbium element (Tb) in terbium compound adhering on the surface of the positive electrode active material particle containing lithium cobaltate against the positive electrode active material particle was 0.22 mass %. Further, most of terbium hydroxide adhered on the surface of the positive electrode active material particle were changed to terbium oxyhydroxide.

Then, the positive electrode active material of Example C1 was observed by SEM. The results of the observation showed that a particle diameter of most of the particle of terbium compound which were adhered on the surface of the positive electrode active material particle was 100 nm or less. In addition, the particle of terbium compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm$^3$.

Except for the use of such a positive electrode fabricated above, a flat type-non-aqueous electrolyte secondary battery of Example C1 having a design capacity of 780 mAh in a case of charging to 4.40 V was fabricated the same as Example A1.

Example C2

In Example C2, in preparation of the positive electrode of Example C1, the positive electrode active material particle having terbium hydroxide adhered on the surface was heat-treated at 200° C. in air atmosphere for 5 hours. Except for the above, the same procedure as in Example C1 was used to fabricate a non-aqueous electrolyte secondary battery of Example C2.

Here, in the positive electrode active material obtained by heat treatment as Example C2, most of terbium hydroxide adhered on the surface of the positive electrode active material particle were not changed to terbium oxyhydroxide and remained as terbium hydroxide.

Example C3

In Example C3, in preparation of the positive electrode of Example C1, as the heat-treatment, the positive electrode active material particle having terbium hydroxide adhered on the surface was only dried at 120° C. Except for the above, the same procedure as in Example C1 was used to fabricate a non-aqueous electrolyte secondary battery of Example C3.

Here, in the positive electrode active material of Example C3 wherein the heat-treatment was drying at 120° C. only, terbium hydroxide adhered on the surface of the positive electrode active material particle was not changed to ytterbium oxyhydroxide.

Example C4

In Example C4, in preparation of the positive electrode of Example C1, the amount of terbium nitrate 6-hydrate dissolved in 200 ml of pure water was changed to 1.91 g in adhering terbium hydroxide on the surface of positive electrode active material particle. Except for the above, the same procedure as in Example C1 was used to fabricate a non-aqueous electrolyte secondary battery of Example C4.

Here, in Example C4, a ratio of terbium element (Tb) in terbium compound adhering on the surface of the positive electrode active material particle containing lithium cobaltate against the positive electrode active material particle was 0.067 mass %. Further, most of terbium hydroxide adhered on the surface of the positive electrode active material particle were changed to terbium oxyhydroxide.

Comparative Example c1

In Comparative Example c1, in preparation of the positive electrode of Example C1, terbium compound was not adhered on the surface of the positive electrode active material particle containing lithium cobaltate. Except for the above, the same procedure as in Example C1 was used to fabricate a non-aqueous electrolyte secondary battery of Comparative Example c1.

Comparative Example c2

In Comparative Example c2, in preparation of the positive electrode of Example C1, terbium oxide was mechanically adhered on the surface of the positive electrode active material particle containing lithium cobaltate as follows: A terbium oxide reagent was pulverized until a particle diameter of a primary particle became 300 nm to prepare terbium oxide. Then, 1.25 g of the foregoing terbium oxide was mixed with 500 g of positive electrode active material particle containing lithium cobaltate by using the mixing machine (the tradename NOBILTA made by HOSOKAWA MICRON CORPORATION). Thus, the positive electrode active material having terbium oxide mechanically adhered on the surface of the positive electrode active material particle containing lithium cobaltate was prepared. Except for the use of such a positive electrode active material prepared as above, the same procedure as in Example C1 was used to fabricate a non-aqueous electrolyte secondary battery of Comparative Example c2.

Here, in Comparative Example c2, a ratio of terbium element (Tb) in terbium oxide adhered on the surface of the positive electrode active material particle containing lithium cobaltate against the positive electrode active material particle was 0.22 mass %.

Then, the positive electrode active material of Comparative Example c2 was observed by SEM. The results of the observation showed that terbium oxide was flocculated and adhered on the concave parts of the positive electrode active material particle and was not dispersed on the surface of the positive electrode active material particle.

Comparative Example c3

In Comparative Example c3, in preparation of the positive electrode active material of Comparative Example c2, the amount of terbium oxide having the primary particle diameter of 300 nm was changed to 5 g. Except for the use of such a positive electrode active material prepared as above, the same procedure as in Example C1 was used to fabricate a non-aqueous electrolyte secondary battery of Comparative Example c3.

Here, in Comparative Example c3, a ratio of terbium element (Tb) in terbium oxide adhered on the surface of the positive electrode active material particle containing lithium cobaltate against the positive electrode active material particle was 0.87 mass %.

Then, the positive electrode active material of Comparative Example c3 was observed by SEM. The results of the observation showed that terbium oxide was flocculated and adhered on the concave parts of the positive electrode active material particle and was not dispersed on the surface of the positive electrode active material particle the same as the positive electrode active material of Comparative Example c2.

Comparative Example c4

In Comparative Example c4, in preparation of the positive electrode of Example C1, the positive electrode active material particle having terbium hydroxide adhered on the surface was heat-treated at 500° C. in air atmosphere for 5 hours. Except for the above, the same procedure as in Example C1 was used to fabricate a non-aqueous electrolyte secondary battery of Comparative Example c4.

Here, in the positive electrode active material of Comparative Example c4 obtained by the heat-treatment, terbium hydroxide adhered on the surface of the positive electrode active material particle was changed to terbium oxide, and one part of terbium was diffused inside of the positive electrode active material particle.

Next, as the initial charging, each of the non-aqueous electrolyte secondary batteries of Examples C1 to C4 and Comparative Examples c1 to c4 was charged at the constant current to 4.40 V and was further charged at the constant voltage of 4.40 V the same as the non-aqueous electrolyte secondary battery of Example A1. After 10 minutes pause, as the initial discharging, each of the batteries was discharged at the constant current of 750 mA to 2.75 V. Thus, initial discharge capacity Qo of each non-aqueous electrolyte secondary battery after the initial charging/discharging was measured.

Further, percentage of initial charging/discharging efficiency of each non-aqueous electrolyte secondary battery of Examples C1 to C4 and Comparative Example c4 was determined. As a result of determination, while the percentage of initial charging/discharging efficiency of each non-aqueous electrolyte secondary battery of Examples C1 to C4 was 89%, the percentage of initial charging/discharging efficiency of non-aqueous electrolyte secondary battery of Comparative Example c4 was 86%. The reason is thought to be as follows. In the non-aqueous electrolyte secondary battery of Comparative Example c4, terbium hydroxide which was adhered on the surface of the positive electrode active material particle was changed to terbium oxide and that one part of terbium was diffused inside of the positive electrode active material particle.

After the initial charging/discharging, the same as the non-aqueous electrolyte secondary battery of Examples A1, each of the non-aqueous electrolyte secondary batteries of Examples C1 to C4 and Comparative Examples c1 to c4 was subjected to the high-temperature sequence charging examination. Next, as to each of the non-aqueous electrolyte secondary batteries, the increment in thickness thereof after high-temperature sequence charging examination against before high-temperature sequence charging examination was measured. The results are shown together with the results of non-aqueous electrolyte secondary batteries of Comparative Examples x1 to x3, y1 and z1 in Table 7 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. After that, percentage (%) of capacity retention after high-temperature sequence charging examination was obtained according to the equation (4). The results are shown together with the results of non-aqueous electrolyte secondary batteries of Comparative Examples x1 to x3, y1 and z1 in Table 7 below.

After 10 minutes pause, each of the non-aqueous electrolyte secondary batteries was charged at the constant current of 750 mA to 4.40 V and was further charged at the constant voltage of 4.40 V until the current became 37.5 mA under room temperature to measure charging capacity Qb. Then, 10 minutes pause was made. Then, each of the non-aqueous electrolyte secondary batteries after high-temperature sequence charging examination was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown together with the results of non-aqueous electrolyte secondary batteries of Comparative Examples x1 to x3, y1 and z1 in Table 7 below.

TABLE 7

| | Treatment of surface of positive electrode active material | | | Evaluation of characteristics after high-temperature sequence charging examination | | | |
|---|---|---|---|---|---|---|---|
| | Treatment method | Heat treatment temperature (° C.) | Element adhered and volume of adhesion (mass %) | | Percentage (%) of capacity retention | Percentage (%) of capacity recovery | Percentage (%) of charging/ discharging efficiency | Increment in thickness (mm) |
| Ex. C1 | Deposition + Heat-treatment | 300 | Tb | 0.22 | 81.7 | 77.9 | 99.9 | 1.05 |
| Ex. C2 | Deposition + Heat-treatment | 200 | Tb | 0.22 | 82.0 | 78.1 | 98.6 | 1.19 |
| Ex. C3 | Deposition + Heat-treatment | 120 | Tb | 0.22 | 82.4 | 78.8 | 99.4 | 1.10 |
| Ex. C4 | Deposition + Heat-treatment | 300 | Tb | 0.067 | 82.5 | 78.9 | 99.8 | 1.05 |
| Comp. Ex. c1 | — | — | — | — | 52.7 | 57.5 | 85.9 | 6.88 |
| Comp. Ex. c2 | Mechanical treatment | — | Tb | 0.22 | 54.2 | 57.6 | 88.8 | 8.02 |
| Comp. Ex. c3 | Mechanical treatment | — | Tb | 0.87 | 58.8 | 61.8 | 88.5 | 6.47 |
| Comp. Ex. c4 | Deposition + Heat-treatment | 500 | Tb | 0.22 | 78.5 | 75.5 | 93.5 | 2.85 |
| Comp. Ex. x1 | Deposition + Heat-treatment | 120 | Al | 0.22 | 61.5 | 68.3 | 94.5 | 2.89 |
| Comp. Ex. x2 | Deposition + Heat-treatment | 500 | Al | 0.22 | 58.5 | 65.8 | 95.5 | 3.55 |
| Comp. Ex. x3 | Deposition + Heat-treatment | 120 | Al | 0.067 | 64.5 | 67.3 | 92.5 | 5.25 |
| Comp. Ex. y1 | Deposition + Heat-treatment | 120 | Zn | 0.22 | 69.1 | 61.5 | 90.0 | 6.35 |

TABLE 7-continued

|  | Treatment of surface of positive electrode active material | | | Evaluation of characteristics after high-temperature sequence charging examination | | | |
| --- | --- | --- | --- | --- | --- | --- | --- |
|  | Treatment method | Heat treatment temperature (° C.) | Element adhered and volume of adhesion (mass %) | Percentage (%) of capacity retention | Percentage (%) of capacity recovery | Percentage (%) of charging/ discharging efficiency | Increment in thickness (mm) |
| Comp. Ex. z1 | Deposition + Heat-treatment | 300 | Ce  0.22 | 71.2 | 67.8 | 89.5 | 3.12 |

As is apparent from Table 7 the above, in each of the non-aqueous electrolyte secondary batteries of Examples C1 to C4 which utilized the positive electrode active material having the particle of terbium compound comprising terbium hydroxide and terbium oxyhydroxide dispersed and adhered on the surface of the positive electrode active material particle, after high-temperature sequence charging examination, the value of increment of thickness was low, and the percentage of capacity retention, the percentage of capacity recovery and the percentage of charging/discharging efficiency were improved. On the other hand, as to each of the non-aqueous electrolyte secondary batteries of Comparative Examples c1 to c4, after high-temperature sequence charging examination, the value of increment of thickness was higher, and the percentage of capacity retention, the percentage of capacity recovery and the percentage of high charging/discharging efficiency were more decreased as compared with each of the non-aqueous electrolyte secondary batteries of Examples C1 to C4.

Further, as compared with each of the non-aqueous electrolyte secondary batteries of Comparative Examples x1 to x3, y1 and z1, in each of the non-aqueous electrolyte secondary batteries of Examples C1 to C4, the same as the non-aqueous electrolyte secondary batteries of Examples A1 to A7, after high-temperature sequence charging examination, the value of increment of thickness was lower and the percentage of capacity retention, the percentage of capacity recovery and the percentage of charging/discharging efficiency were more improved.

Example D1

A positive electrode of Example D1 was prepared in the following manner. Lithium cobaltate wherein each of Mg and Al formed solid solution in a concentration of 0.5 mol % was used as positive electrode active material particle. Then, 1000 g of the positive electrode active material particle was poured into 3 liter of pure water and stirred, and an aqueous solution of dysprosium nitrate dissolving 5.89 g of dysprosium nitrate 5-hydrate in 200 ml of pure water was added thereto. After that, 10 mass % of an aqueous solution of sodium hydroxide was appropriately added so that the pH of the resultant solution was 9, and dysprosium hydroxide was adhered on the surface of the positive electrode active material particle. Then, filtering suction was conducted to collect the treated object by filtration and the treated object was dried at 120° C. Thus was prepared the positive electrode active material particle having dysprosium hydroxide adhered on the surface.

Next, the positive electrode active material particle having dysprosium hydroxide adhered on the surface was heat-treated at 300° C. in air atmosphere for 5 hours. Thus was prepared the positive electrode active material having a particle of dysprosium compound dispersed and adhered on the surface of the positive electrode active material particle.

Here, in the above-mentioned positive electrode active material, a ratio of dysprosium element (Dy) in dysprosium compound adhering on the surface of the positive electrode active material particle containing lithium cobaltate against the positive electrode active material particle was 0.22 mass %. Further, most of dysprosium compound adhering on the surface of the positive electrode active material particle were dysprosium oxyhydroxide which was changed from dysprosium hydroxide.

Then, the positive electrode active material of Example D1 was observed by SEM. The results of the observation showed that a particle diameter of most of the particle of dysprosium compound which were adhered on the surface of the positive electrode active material particle was 100 nm or less. In addition, the particle of dysprosium compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm$^3$.

Except for the use of such a positive electrode fabricated above, a flat type-non-aqueous electrolyte secondary battery of Example D1 having a design capacity of 780 mAh in a case of charging to 4.40 V was fabricated the same as Example A1.

Example D2

In Example D2, in preparation of the positive electrode of Example D1, the positive electrode active material particle having dysprosium hydroxide adhered on the surface was heat-treated at 200° C. in air atmosphere for 5 hours. Except for the above, the same procedure as in Example D1 was used to fabricate a non-aqueous electrolyte secondary battery of Example D2.

Here, in the positive electrode active material obtained by heat treatment as Example D2, most of dysprosium hydroxide adhered on the surface of the positive electrode active material particle were not changed to dysprosium oxyhydroxide and remained as dysprosium hydroxide.

Example D3

In Example D3, in preparation of the positive electrode of Example D1, as the heat-treatment, the positive electrode active material particle having dysprosium hydroxide adhered on the surface was only dried at 120° C.

Except for the above, the same procedure as in Example D1 was used to fabricate a non-aqueous electrolyte secondary battery of Example D3.

Here, in the positive electrode active material of Example D3 wherein heat-treatment was only drying at 120° C., dysprosium hydroxide adhered on the surface of the positive electrode active material particle was not changed to dysprosium oxyhydroxide.

Example D4

In Example D4, in preparation of the positive electrode of Example D1, the amount of dysprosium nitrate 5-hydrate dissolved in 200 ml of pure water was changed to 1.81 g in adhering dysprosium hydroxide on the surface of positive electrode active material particle. Except for the above, the same procedure as in Example D1 was used to fabricate a non-aqueous electrolyte secondary battery of Example D4.

Here, in Example D4, a ratio of dysprosium element (Dy) in dysprosium compound adhering on the surface of the positive electrode active material particle containing lithium cobaltate against the positive electrode active material particle was 0.067 mass %. Further, most of dysprosium hydroxide adhered on the surface of the positive electrode active material particle were changed to dysprosium oxyhydroxide.

Comparative Example d1

In Comparative Example d1, in preparation of the positive electrode of Example D1, dysprosium compound was not adhered on the surface of the positive electrode active material particle containing lithium cobaltate. Except for the above, the same procedure as in Example D1 was used to fabricate a non-aqueous electrolyte secondary battery of Comparative Example d1.

Comparative Example d2

In Comparative Example d2, in preparation of the positive electrode of Example D1, dysprosium oxide was mechanically adhered on the surface of the positive electrode active material particle containing lithium cobaltate as follows: A dysprosium oxide reagent was pulverized until a particle diameter of a primary particle became 300 nm to prepare dysprosium oxide. Then, 1.25 g of the foregoing dysprosium oxide was mixed with 500 g of positive electrode active material particle containing lithium cobaltate by using the mixing machine (the tradename NOBILTA made by HOSOKAWA MICRON CORPORATION). Thus, the positive electrode active material having dysprosium oxide mechanically adhered on the surface of the positive electrode active material particle containing lithium cobaltate was prepared. Except for the use of such a positive electrode active material prepared as above, the same procedure as in Example D1 was used to fabricate a non-aqueous electrolyte secondary battery of Comparative Example d2.

Here, in Comparative Example d2, a ratio of dysprosium element (Dy) in dysprosium oxide adhered on the surface of the positive electrode active material particle containing lithium cobaltate against the positive electrode active material particle was 0.22 mass %.

Then, the positive electrode active material of Comparative Example d2 was observed by SEM. The results of the observation showed that dysprosium oxide was flocculated and adhered on the concave parts of the positive electrode active material particle and was not dispersed on the surface of the positive electrode active material particle.

Comparative Example d3

In Comparative Example d3, in preparation of the positive electrode active material of Comparative Example d2, the amount of dysprosium oxide having the primary particle diameter of 300 nm was changed to 5 g. Except for the use of such a positive electrode active material prepared as above, the same procedure as in Example D1 was used to fabricate a non-aqueous electrolyte secondary battery of Comparative Example d3.

Here, in Comparative Example d3, a ratio of dysprosium element (Dy) in dysprosium oxide adhered on the surface of the positive electrode active material particle containing lithium cobaltate against the positive electrode active material particle was 0.87 mass %.

Then, the positive electrode active material of Comparative Example d3 was observed by SEM. The results of the observation showed that dysprosium oxide was flocculated and adhered on the concave parts of the positive electrode active material particle and was not dispersed on the surface of the positive electrode active material particle the same as the positive electrode active material of Comparative Example d2.

Comparative Example d4

In Comparative Example d4, in preparation of the positive electrode of Example D1, the positive electrode active material particle having dysprosium hydroxide adhered on the surface was heat-treated at 500° C. in air atmosphere for 5 hours. Except for the above, the same procedure as in Example D1 was used to fabricate a non-aqueous electrolyte secondary battery of Comparative Example d4.

Here, in the positive electrode active material of Comparative Example d4 obtained by the heat-treatment, dysprosium hydroxide adhered on the surface of the positive electrode active material particle was changed to dysprosium oxide, and one part of dysprosium was diffused inside of the positive electrode active material particle.

Next, as the initial charging, each of the non-aqueous electrolyte secondary batteries of Examples D1 to D4 and Comparative Examples d1 to d4 was charged at the constant current to 4.40 V and was further charged at the constant voltage of 4.40 V the same as the non-aqueous electrolyte secondary battery of Example A1. After 10 minutes pause, as the initial discharging, each of the batteries was discharged at the constant current of 750 mA to 2.75 V. Thus, initial discharge capacity Qo of each non-aqueous electrolyte secondary battery was measured.

Further, percentage of initial charging/discharging efficiency of each non-aqueous electrolyte secondary battery of Examples D1 to D4 and Comparative Example d4 was determined. As a result of determination, while the percentage of initial charging/discharging efficiency of each non-aqueous electrolyte secondary battery of Examples D1 to D4 was 89%, the percentage of initial charging/discharging efficiency of non-aqueous electrolyte secondary battery of Comparative Example d4 was 86%. The reason is thought to be as follows. In the non-aqueous electrolyte secondary battery of Comparative Example d4, dysprosium hydroxide which was adhered on the surface of the positive electrode active material particle was changed to dysprosium oxide and that one part of dysprosium was diffused inside of the positive electrode active material particle.

After the initial charging/discharging, the same as the non-aqueous electrolyte secondary battery of Examples A1, each of the non-aqueous electrolyte secondary batteries of Examples D1 to D4 and Comparative Examples d1 to d4 was subjected to the high-temperature sequence charging examination. Next, as to each of the non-aqueous electrolyte secondary batteries, the increment in thickness thereof after high-temperature sequence charging examination against before high-temperature sequence charging examination was measured. The results are shown together with the results of non-aqueous electrolyte secondary batteries of Comparative Examples x1 to x3, y1 and z1 in Table 8 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. After that, percentage (%) of capacity retention after high-temperature sequence charging examination was obtained according to the equation (4). The results are shown together with the results of non-aqueous electrolyte secondary batteries of Comparative Examples x1 to x3, y1 and z1 in Table 8 below.

After 10 minutes pause, each of the non-aqueous electrolyte secondary batteries was charged at the constant current of 750 mA to 4.40 V and was further charged at the constant voltage of 4.40 V until the current became 37.5 mA under room temperature to measure charging capacity Qb. Then, 10 minutes pause was made. Then, each of the non-aqueous electrolyte secondary batteries after high-temperature sequence charging examination was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown together with the results of non-aqueous electrolyte secondary batteries of Comparative Examples x1 to x3, y1 and z1 in Table 8 below.

TABLE 8

| | Treatment of surface of positive electrode active material | | | | Evaluation of characteristics after high-temperature sequence charging examination | | | |
|---|---|---|---|---|---|---|---|---|
| | Treatment method | Heat treatment temperature (° C.) | Element adhered and volume of adhesion | (mass %) | Percentage (%) of capacity retention | Percentage (%) of capacity recovery | Percentage (%) of charging/ discharging efficiency | Increment in thickness (mm) |
| Ex. D1 | Deposition + Heat-treatment | 300 | Dy | 0.22 | 84.5 | 77.9 | 99.9 | 1.04 |
| Ex. D2 | Deposition + Heat-treatment | 200 | Dy | 0.22 | 83.0 | 78.2 | 99.2 | 1.20 |
| Ex. D3 | Deposition + Heat-treatment | 120 | Dy | 0.22 | 83.4 | 78.4 | 99.6 | 1.21 |
| Ex. D4 | Deposition + Heat-treatment | 300 | Dy | 0.067 | 82.8 | 78.0 | 99.6 | 1.00 |
| Comp. Ex. d1 | — | — | — | — | 52.7 | 57.5 | 85.9 | 6.88 |
| Comp. Ex. d2 | Mechanical treatment | — | Dy | 0.22 | 54.2 | 57.6 | 88.8 | 8.02 |
| Comp. Ex. d3 | Mechanical treatment | — | Dy | 0.87 | 58.8 | 61.8 | 88.5 | 6.47 |
| Comp. Ex. d4 | Deposition + Heat-treatment | 500 | Dy | 0.22 | 76.3 | 74.8 | 92.5 | 2.65 |
| Comp. Ex. x1 | Deposition + Heat-treatment | 120 | Al | 0.22 | 61.5 | 68.3 | 94.5 | 2.89 |
| Comp. Ex. x2 | Deposition + Heat-treatment | 500 | Al | 0.22 | 58.5 | 65.8 | 95.5 | 3.55 |
| Comp. Ex. x3 | Deposition + Heat-treatment | 120 | Al | 0.067 | 64.5 | 67.3 | 92.5 | 5.25 |
| Comp. Ex. y1 | Deposition + Heat-treatment | 120 | Zn | 0.22 | 69.1 | 61.5 | 90.0 | 6.35 |
| Comp. Ex. z1 | Deposition + Heat-treatment | 300 | Ce | 0.22 | 71.2 | 67.8 | 89.5 | 3.12 |

As is apparent from Table 8 the above, in each of the non-aqueous electrolyte secondary batteries of Examples D1 to D4 which utilized the positive electrode active material having the particle of dysprosium compound comprising dysprosium hydroxide and dysprosium oxyhydroxide dispersed and adhered on the surface of the positive electrode active material particle, after high-temperature sequence charging examination, the value of increment of thickness was low, and the percentage of capacity retention, the percentage of capacity recovery and the percentage of charging/discharging efficiency were improved. On the other hand, as to each of the non-aqueous electrolyte secondary batteries of Comparative Examples d1 to d4, after high-temperature sequence charging examination, the value of the increment of thickness was higher, and the percentage of capacity retention, the percentage of capacity recovery and the percentage of high charging/discharging efficiency were more decreased as compared with each of the non-aqueous electrolyte secondary batteries of Examples D1 to D4.

Further, as compared with each of the non-aqueous electrolyte secondary batteries of Comparative Examples x1 to x3, y1 and z1, in each of the non-aqueous electrolyte secondary batteries of Examples D1 to D4, the same as the non-aqueous electrolyte secondary batteries of Examples A1 to A7, after high-temperature sequence charging examination, the value of increment in thickness was lower and the percentage of capacity retention, the percentage of capacity recovery and the percentage of charging/discharging efficiency were more improved.

Example E1

A positive electrode of Example E1 was prepared in the following manner. Lithium cobaltate wherein each of Mg and Al formed solid solution in a concentration of 0.5 mol % was used as positive electrode active material particle. Then, 1000 g of the positive electrode active material particle was poured into 3 liter of pure water and stirred, and an aqueous solution of holmium nitrate dissolving 5.84 g of holmium nitrate 5-hydrate in 200 ml of pure water was added thereto. After that, 10 mass % of an aqueous solution of sodium hydroxide was appropriately added so that the pH of the resultant solution was 9, and holmium hydroxide was adhered on the surface of the positive electrode active material particle. Then, filtering suction was conducted to collect the treated object by filtration and the treated object was dried at 120° C. Thus was prepared the positive electrode active material particle having holmium hydroxide adhered on the surface.

Next, the positive electrode active material particle having holmium hydroxide adhered on the surface was heat-treated at 300° C. in air atmosphere for 5 hours. Thus was prepared the positive electrode active material having a particle of holmium compound dispersed and adhered on the surface of the positive electrode active material particle.

Here, in the above-mentioned positive electrode active material, a ratio of holmium element (Ho) in holmium compound adhering on the surface of the positive electrode active material particle containing lithium cobaltate against the positive electrode active material particle was 0.22 mass %. Further, most of holmium compound adhering on the surface of the positive electrode active material particle were holmium oxyhydroxide which was changed from holmium hydroxide.

Then, the positive electrode active material of Example E1 was observed by SEM. The results of the observation showed that a particle diameter of most of the particle of holmium compound which were adhered on the surface of the positive electrode active material particle was 100 nm or less. In addition, the particle of holmium compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm$^3$.

Except for the use of such a positive electrode fabricated above, a flat type-non-aqueous electrolyte secondary battery of Example E1 having a design capacity of 780 mAh in a case of charging to 4.40 V was fabricated the same as Example A1.

Example E2

In Example E2, in preparation of the positive electrode of Example E1, the positive electrode active material particle having holmium hydroxide adhered on the surface was heat-treated at 200° C. in air atmosphere for 5 hours. Except for the above, the same procedure as in Example E1 was used to fabricate a non-aqueous electrolyte secondary battery of Example E2.

Here, in the positive electrode active material obtained by heat treatment as Example E2, most of holmium hydroxide adhered on the surface of the positive electrode active material particle were not changed to holmium oxyhydroxide and remained as holmium hydroxide.

Example E3

In Example E3, in preparation of the positive electrode of Example E1, as the heat-treatment, the positive electrode active material particle having holmium hydroxide adhered on the surface was only dried at 120° C. Except for the above, the same procedure as in Example E1 was used to fabricate a non-aqueous electrolyte secondary battery of Example E3.

Here, in the positive electrode active material of Example E3 wherein heat-treatment was only for drying at 120° C., holmium hydroxide adhered on the surface of the positive electrode active material particle was not changed to holmium oxyhydroxide.

Example E4

In Example E4, in preparation of the positive electrode of Example E1, the amount of holmium nitrate 5-hydrate dissolved in 200 ml of pure water was changed to 1.80 g in adhering holmium hydroxide on the surface of positive electrode active material particle. Except for the above, the same procedure as in Example E1 was used to fabricate a non-aqueous electrolyte secondary battery of Example E4.

Here, in Example E4, a ratio of holmium element (Ho) in holmium compound adhering on the surface of the positive electrode active material particle containing lithium cobaltate against the positive electrode active material particle was 0.067 mass %. Further, most of holmium hydroxide adhered on the surface of the positive electrode active material particle were changed to holmium oxyhydroxide.

Comparative Example e1

In Comparative Example e1, in preparation of the positive electrode of Example E1, holmium compound was not adhered on the surface of the positive electrode active material particle containing lithium cobaltate. Except for the above, the same procedure as in Example E1 was used to fabricate a non-aqueous electrolyte secondary battery of Comparative Example e1.

Comparative Example e2

In Comparative Example e2, in preparation of the positive electrode of Example E1, holmium oxide was mechanically adhered on the surface of the positive electrode active material particle containing lithium cobaltate as follows: A holmium oxide reagent was pulverized until a particle diameter of a primary particle became 300 nm to prepare holmium oxide. Then, 1.25 g of the foregoing holmium oxide was mixed with 500 g of positive electrode active material particle containing lithium cobaltate by using the mixing machine (the tradename NOBILTA made by HOSOKAWA MICRON CORPORATION). Thus, the positive electrode active material having holmium oxide mechanically adhered on the surface of the positive electrode active material particle containing lithium cobaltate was prepared. Except for the use of such a positive electrode active material prepared as above, the same procedure as in Example E1 was used to fabricate a non-aqueous electrolyte secondary battery of Comparative Example e2.

Here, in Comparative Example e2, a ratio of holmium element (Ho) in holmium oxide adhered on the surface of the positive electrode active material particle containing lithium cobaltate against the positive electrode active material particle was 0.22 mass %.

Then, the positive electrode active material of Comparative Example e2 was observed by SEM. The results of the observation showed that holmium oxide was flocculated and adhered on the concave parts of the positive electrode active material particle and was not dispersed on the surface of the positive electrode active material particle.

Comparative Example e3

In Comparative Example e3, in preparation of the positive electrode active material of Comparative Example e2, the amount of holmium oxide having the primary particle diameter of 300 nm was changed to 5 g. Except for the use of such a positive electrode active material prepared as above, the same procedure as in Example E1 was used to fabricate a non-aqueous electrolyte secondary battery of Comparative Example e3.

Here, in Comparative Example e3, a ratio of holmium element (Ho) in holmium oxide adhered on the surface of the positive electrode active material particle containing lithium cobaltate against the positive electrode active material particle was 0.87 mass %.

Then, the positive electrode active material of Comparative Example e3 was observed by SEM. The results of the observation showed that holmium oxide was flocculated and adhered on the concave parts of the positive electrode active material particle and was not dispersed on the surface of the positive electrode active material particle the same as the positive electrode active material of Comparative Example e2.

Comparative Example e4

In Comparative Example e4, in preparation of the positive electrode of Example E1, the positive electrode active material particle having holmium hydroxide adhered on the surface was heat-treated at 500° C. in air atmosphere for 5 hours. Except for the above, the same procedure as in Example E1 was used to fabricate a non-aqueous electrolyte secondary battery of Comparative Example e4.

Here, in the positive electrode active material of Comparative Example e4 obtained by the heat-treatment, holmium hydroxide adhered on the surface of the positive electrode active material particle was changed to holmium oxide, and one part of holmium was diffused inside of the positive electrode active material particle.

Next, as the initial charging, each of the non-aqueous electrolyte secondary batteries of Examples E1 to E4 and Comparative Examples e1 to e4 was charged at the constant current to 4.40 V and was further charged at the constant voltage of 4.40 V the same as the non-aqueous electrolyte secondary battery of Example A1. After 10 minutes pause, as the initial discharging, each of the batteries was discharged at the constant current of 750 mA to 2.75 V. Thus, initial discharge capacity Qo of each non-aqueous electrolyte secondary battery was measured.

Further, percentage of initial charging/discharging efficiency of each non-aqueous electrolyte secondary battery of Examples E1 to E4 and Comparative Example e4 was determined. As a result of determination, while the percentage of initial charging/discharging efficiency of each non-aqueous electrolyte secondary battery of Examples E1 to E4 was 89%, the percentage of initial charging/discharging efficiency of non-aqueous electrolyte secondary battery of Comparative Example e4 was 86%. The reason is thought to be as follows. In the non-aqueous electrolyte secondary battery of Comparative Example e4, holmium hydroxide which was adhered on the surface of the positive electrode active material particle was changed to holmium oxide and one part of holmium was diffused inside of the positive electrode active material particle.

After the initial charging/discharging, the same as the non-aqueous electrolyte secondary battery of Examples A1, each of the non-aqueous electrolyte secondary batteries of Examples E1 to E4 and Comparative Examples e1 to e4 was subjected to the high-temperature sequence charging examination. Next, as to each of the non-aqueous electrolyte secondary batteries, the increment in thickness thereof after high-temperature sequence charging examination against before high-temperature sequence charging examination was measured. The results are shown together with the results of non-aqueous electrolyte secondary batteries of Comparative Examples x1 to x3, y1 and z1 in Table 9 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. After that, percentage (%) of capacity retention after high-temperature sequence charging examination was obtained according to the equation (4). The results are shown together with the results of non-aqueous electrolyte secondary batteries of Comparative Examples x1 to x3, y1 and z1 in Table 9 below.

After 10 minutes pause, each of the non-aqueous electrolyte secondary batteries was charged at the constant current of 750 mA to 4.40 V and was further charged at the constant voltage of 4.40 V until the current became 37.5 mA under room temperature to measure charging capacity Qb. Then, 10 minutes pause was made. Then, each of the non-aqueous electrolyte secondary batteries after high-temperature sequence charging examination was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown together with the results of non-aqueous electrolyte secondary batteries of Comparative Examples x1 to x3, y1 and z1 in Table 9 below.

TABLE 9

| | Treatment of surface of positive electrode active material | | | Evaluation of characteristics after high-temperature sequence charging examination | | | |
|---|---|---|---|---|---|---|---|
| | Treatment method | Heat treatment temperature (° C.) | Element adhered and volume of adhesion (mass %) | Percentage (%) of capacity retention | Percentage (%) of capacity recovery | Percentage (%) of charging/ discharging efficiency | Increment in thickness (mm) |
| Ex. E1 | Deposition + Heat-treatment | 300 | Ho 0.22 | 84.4 | 78.9 | 99.9 | 1.03 |
| Ex. E2 | Deposition + Heat-treatment | 200 | Ho 0.22 | 83.0 | 78.2 | 99.1 | 1.05 |
| Ex. E3 | Deposition + Heat-treatment | 120 | Ho 0.22 | 83.0 | 78.4 | 98.9 | 1.05 |
| Ex. E4 | Deposition + Heat-treatment | 300 | Ho 0.067 | 83.1 | 78.0 | 100 | 0.98 |
| Comp. Ex. e1 | — | — | — — | 52.7 | 57.5 | 85.9 | 6.88 |
| Comp. Ex. e2 | Mechanical treatment | — | Ho 0.22 | 54.2 | 57.6 | 88.8 | 8.02 |
| Comp. Ex. e3 | Mechanical treatment | — | Ho 0.87 | 58.8 | 61.8 | 88.5 | 6.47 |
| Comp. Ex. e4 | Deposition + Heat-treatment | 500 | Ho 0.22 | 77.2 | 73.7 | 92.1 | 2.88 |
| Comp. Ex. x1 | Deposition + Heat-treatment | 120 | Al 0.22 | 61.5 | 68.3 | 94.5 | 2.89 |
| Comp. Ex. x2 | Deposition + Heat-treatment | 500 | Al 0.22 | 58.5 | 65.8 | 95.5 | 3.55 |
| Comp. Ex. x3 | Deposition + Heat-treatment | 120 | Al 0.067 | 64.5 | 67.3 | 92.5 | 5.25 |
| Comp. Ex. y1 | Deposition + Heat-treatment | 120 | Zn 0.22 | 69.1 | 61.5 | 90.0 | 6.35 |
| Comp. Ex. z1 | Deposition + Heat-treatment | 300 | Ce 0.22 | 71.2 | 67.8 | 89.5 | 3.12 |

As is apparent from Table 9 the above, in each of the non-aqueous electrolyte secondary batteries of Examples E1 to E4 which utilized the positive electrode active material having the particle of holmium compound comprising holmium hydroxide and holmium oxyhydroxide dispersed and adhered on the surface of the positive electrode active material particle containing lithium cobaltate, after high-temperature sequence charging examination, the value of increment in thickness was low, and the percentage of capacity retention, the percentage of capacity recovery and the percentage of charging/discharging efficiency were improved. On the other hand, as to each of the non-aqueous electrolyte secondary batteries of Comparative Examples e1 to e4, after high-temperature sequence charging examination, the value of the increment of thickness was higher, and the percentage of capacity retention, the percentage of capacity recovery and the percentage of high charging/discharging efficiency were more decreased as compared with each of the non-aqueous electrolyte secondary batteries of Examples E1 to E4.

Further, as compared with each of the non-aqueous electrolyte secondary batteries of Comparative Examples x1 to x3, y1 and z1, in each of the non-aqueous electrolyte secondary batteries of Examples E1 to E4, the same as the non-aqueous electrolyte secondary batteries of Examples A1 to A7, after high-temperature sequence charging examination, the value of increment in thickness was lower and the percentage of capacity retention, the percentage of capacity recovery and the percentage of charging/discharging efficiency were more improved.

Example F1

A positive electrode of Example F1 was prepared in the following manner. Lithium cobaltate wherein each of Mg and Al formed solid solution in a concentration of 0.5 mol % was used as positive electrode active material particle. Then, 1000 g of the positive electrode active material particle was poured into 3 liter of pure water and stirred, and an aqueous solution of thulium nitrate dissolving 5.53 g of thulium nitrate 4-hydrate in 200 ml of pure water was added thereto. After that, 10 mass % of an aqueous solution of sodium hydroxide was appropriately added so that the pH of the resultant solution was 9, and thulium hydroxide was adhered on the surface of the positive electrode active material particle. Then, filtering suction was conducted to collect the treated object by filtration and the treated object was dried at 120° C. Thus was prepared the positive electrode active material particle having thulium hydroxide adhered on the surface.

Next, the positive electrode active material particle having thulium hydroxide adhered on the surface was heat-treated at 300° C. in air atmosphere for 5 hours. Thus was prepared the positive electrode active material having a particle of thulium compound dispersed and adhered on the surface of the positive electrode active material particle.

Here, in the above-mentioned positive electrode active material, a ratio of thulium element (Tm) in thulium compound adhering on the surface of the positive electrode active material particle containing lithium cobaltate against the positive electrode active material particle was 0.22 mass %. Further, most of thulium compound adhering on the surface of the positive electrode active material particle were thulium oxyhydroxide which was changed from thulium hydroxide.

Then, the positive electrode active material of Example F1 was observed by SEM. The results of the observation showed that a particle diameter of most of the particle of thulium compound which were adhered on the surface of the positive electrode active material particle was 100 nm or less. In addition, the particle of thulium compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm$^3$. Except for the use of such a positive electrode fabricated above, a flat type-non-aqueous electrolyte secondary battery of Example F1 having a design capacity of 780 mAh in a case of charging to 4.40 V was fabricated the same as Example A1.

Example F2

In Example F2, in preparation of the positive electrode of Example F1, the positive electrode active material particle having thulium hydroxide adhered on the surface was heat-treated at 200° C. in air atmosphere for 5 hours. Except for the above, the same procedure as in Example F1 was used to fabricate a non-aqueous electrolyte secondary battery of Example F2.

Here, in the positive electrode active material obtained by heat treatment as Example F2, most of thulium hydroxide adhered on the surface of the positive electrode active material particle were not changed to thulium oxyhydroxide and remained as thulium hydroxide.

Example F3

In Example F3, in preparation of the positive electrode of Example F1, as the heat-treatment, the positive electrode active material particle having thulium hydroxide adhered on the surface was only dried at 120° C. Except for the above, the same procedure as in Example F1 was used to fabricate a non-aqueous electrolyte secondary battery of Example F3.

Here, in the positive electrode active material of Example F3 wherein heat-treatment was only drying at 120° C., thulium hydroxide adhered on the surface of the positive electrode active material particle was not changed to thulium oxyhydroxide.

Example F4

In Example F4, in preparation of the positive electrode of Example F1, the amount of thulium nitrate 4-hydrate dissolved in 200 ml of pure water was changed to 1.70 g in adhering thulium hydroxide on the surface of positive electrode active material particle. Except for the above, the same procedure as in Example F1 was used to fabricate a non-aqueous electrolyte secondary battery of Example F4.

Here, in Example F4, a ratio of thulium element (Tm) in thulium compound adhering on the surface of the positive electrode active material particle containing lithium cobaltate against the positive electrode active material particle was 0.067 mass %. Further, most of thulium hydroxide adhered on the surface of the positive electrode active material particle were changed to thulium oxyhydroxide.

Comparative Example f1

In Comparative Example f1, in preparation of the positive electrode of Example F1, thulium compound was not adhered on the surface of the positive electrode active material particle containing lithium cobaltate. Except for the above, the same procedure as in Example F1 was used to fabricate a non-aqueous electrolyte secondary battery of Comparative Example f1.

Comparative Example f2

In Comparative Example f2, in preparation of the positive electrode of Example F1, thulium oxide was mechanically adhered on the surface of the positive electrode active material particle containing lithium cobaltate as follows: A thulium oxide reagent was pulverized until a particle diameter of a primary particle became 300 nm to prepare thulium oxide. Then, 1.25 g of the foregoing thulium oxide was mixed with 500 g of positive electrode active material particle containing lithium cobaltate by using the mixing machine (the tradename NOBILTA made by HOSOKAWA MICRON CORPORATION). Thus, the positive electrode active material having thulium oxide mechanically adhered on the surface of the positive electrode active material particle containing lithium cobaltate was prepared. Except for the use of such a positive electrode active material prepared as above, the same procedure as in Example F1 was used to fabricate a non-aqueous electrolyte secondary battery of Comparative Example f2.

Here, in Comparative Example f2, a ratio of thulium element (Tm) in thulium oxide adhered on the surface of the positive electrode active material particle containing lithium cobaltate against the positive electrode active material particle was 0.22 mass %.

Then, the positive electrode active material of Comparative Example f2 was observed by SEM. The results of the observation showed that thulium oxide was flocculated and adhered on the concave parts of the positive electrode active material particle and was not dispersed on the surface of the positive electrode active material particle.

Comparative Example f3

In Comparative Example f3, in preparation of the positive electrode active material of Comparative Example f2, the amount of thulium oxide having the primary particle diameter of 300 nm was changed to 4.97 g. Except for the use of such a positive electrode active material prepared as above, the same procedure as in Example F1 was used to fabricate a non-aqueous electrolyte secondary battery of Comparative Example f3.

Here, in Comparative Example f3, a ratio of thulium element (Tm) in thulium oxide adhered on the surface of the positive electrode active material particle containing lithium cobaltate against the positive electrode active material particle was 0.87 mass %.

Then, the positive electrode active material of Comparative Example f3 was observed by SEM. The results of the observation showed that thulium oxide was flocculated and adhered on the concave parts of the positive electrode active material particle and was not dispersed on the surface of the positive electrode active material particle the same as the positive electrode active material of Comparative Example f2.

Comparative Example f4

In Comparative Example f4, in preparation of the positive electrode of Example F1, the positive electrode active material particle having thulium hydroxide adhered on the surface was heat-treated at 500° C. in air atmosphere for 5 hours. Except for the above, the same procedure as in Example F1 was used to fabricate a non-aqueous electrolyte secondary battery of Comparative Example f4.

Here, in the positive electrode active material of Comparative Example f4 obtained by the heat-treatment, thulium hydroxide adhered on the surface of the positive electrode active material particle was changed to thulium oxide, and one part of thulium was diffused inside of the positive electrode active material particle.

Next, as the initial charging, each of the non-aqueous electrolyte secondary batteries of Examples F1 to F4 and Comparative Examples f1 to f4 was charged at the constant current to 4.40 V and was further charged at the constant voltage of 4.40 V the same as the non-aqueous electrolyte secondary battery of Example A1. After 10 minutes pause, as the initial discharging, each of the batteries was discharged at the constant current of 750 mA to 2.75 V. Thus, initial discharge capacity Qo of each non-aqueous electrolyte secondary battery was measured.

Further, percentage of initial charging/discharging efficiency of each non-aqueous electrolyte secondary battery of Examples F1 to F4 and Comparative Example f4 was determined. As a result of determination, while the percentage of initial charging/discharging efficiency of each non-aqueous electrolyte secondary battery of Examples F1 to F4 was 89%, the percentage of initial charging/discharging efficiency of non-aqueous electrolyte secondary battery of Comparative Example f4 was 86%. The reason is thought to be as follows. In the non-aqueous electrolyte secondary battery of Comparative Example f4, thulium hydroxide which was adhered on the surface of the positive electrode active material particle was changed to thulium oxide and one part of thulium was diffused inside of the positive electrode active material particle.

After the initial charging/discharging, the same as the non-aqueous electrolyte secondary battery of Examples A1, each of the non-aqueous electrolyte secondary batteries of Examples F1 to F4 and Comparative Examples f1 to f4 was subjected to the high-temperature sequence charging examination. Next, as to each of the non-aqueous electrolyte secondary batteries, the increment in thickness thereof after high-temperature sequence charging examination against before high-temperature sequence charging examination was measured. The results are shown together with the results of non-aqueous electrolyte secondary batteries of Comparative Examples x1 to x3, y1 and z1 in Table 10 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. After that, percentage (%) of capacity retention after high-temperature sequence charging examination was obtained according to the equation (4). The results are shown together with the results of non-aqueous electrolyte secondary batteries of Comparative Examples x1 to x3, y1 and z1 in Table 10 below.

After 10 minutes pause, each of the non-aqueous electrolyte secondary batteries was charged at the constant current of 750 mA to 4.40 V and was further charged at the constant voltage of 4.40 V until the current became 37.5 mA under room temperature to measure charging capacity Qb. Then, 10 minutes pause was made. Then, each of the non-aqueous electrolyte secondary batteries after high-temperature sequence charging examination was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown together with the results of non-aqueous electrolyte secondary batteries of Comparative Examples x1 to x3, y1 and z1 in Table 10 below.

TABLE 10

| | Treatment of surface of positive electrode active material | | | Evaluation of characteristics after high-temperature sequence charging examination | | | |
|---|---|---|---|---|---|---|---|
| | Treatment method | Heat treatment temperature (° C.) | Element adhered and volume of adhesion (mass %) | Percentage (%) of capacity retention | Percentage (%) of capacity recovery | Percentage (%) of charging/ discharging efficiency | Increment in thickness (mm) |
| Ex. F1 | Deposition + Heat-treatment | 300 | Tm 0.22 | 84.0 | 78.5 | 99.7 | 1.15 |
| Ex. F2 | Deposition + Heat-treatment | 200 | Tm 0.22 | 82.7 | 78.1 | 98.5 | 1.25 |
| Ex. F3 | Deposition + Heat-treatment | 120 | Tm 0.22 | 80.8 | 77.8 | 98.6 | 1.35 |
| Ex. F4 | Deposition + Heat-treatment | 300 | Tm 0.067 | 82.6 | 77.5 | 99.5 | 1.10 |
| Comp. Ex. f1 | — | — | — | 52.7 | 57.5 | 85.9 | 6.88 |
| Comp. Ex. f2 | Mechanical treatment | — | Tm 0.22 | 54.2 | 57.6 | 88.8 | 8.02 |
| Comp. Ex. f3 | Mechanical treatment | — | Tm 0.87 | 58.8 | 61.8 | 88.5 | 6.47 |
| Comp. Ex. f4 | Deposition + Heat-treatment | 500 | Tm 0.22 | 76.2 | 72.8 | 91.1 | 2.90 |

TABLE 10-continued

| | Treatment of surface of positive electrode active material | | Element adhered and volume of adhesion (mass %) | | Evaluation of characteristics after high-temperature sequence charging examination | | | |
|---|---|---|---|---|---|---|---|---|
| | Treatment method | Heat treatment temperature (° C.) | | | Percentage (%) of capacity retention | Percentage (%) of capacity recovery | Percentage (%) of charging/ discharging efficiency | Increment in thickness (mm) |
| Comp. Ex. x1 | Deposition + Heat-treatment | 120 | Al | 0.22 | 61.5 | 68.3 | 94.5 | 2.89 |
| Comp. Ex. x2 | Deposition + Heat-treatment | 500 | Al | 0.22 | 58.5 | 65.8 | 95.5 | 3.55 |
| Comp. Ex. x3 | Deposition + Heat-treatment | 120 | Al | 0.067 | 64.5 | 67.3 | 92.5 | 5.25 |
| Comp. Ex. y1 | Deposition + Heat-treatment | 120 | Zn | 0.22 | 69.1 | 61.5 | 90.0 | 6.35 |
| Comp. Ex. z1 | Deposition + Heat-treatment | 300 | Ce | 0.22 | 71.2 | 67.8 | 89.5 | 3.12 |

As is apparent from Table 10 the above, in each of the non-aqueous electrolyte secondary batteries of Examples F1 to F4 which utilized the positive electrode active material having the particle of thulium compound comprising thulium hydroxide and thulium oxyhydroxide dispersed and adhered on the surface of the positive electrode active material particle containing lithium cobaltate, after high-temperature sequence charging examination, the value of increment in thickness was low, and the percentage of capacity retention, the percentage of capacity recovery and the percentage of charging/discharging efficiency were improved. On the other hand, as to each of the non-aqueous electrolyte secondary batteries of Comparative Examples f1 to f4, after high-temperature sequence charging examination, the value of the increment of thickness was higher, and the percentage of capacity retention, the percentage of capacity recovery and the percentage of high charging/ discharging efficiency were more decreased as compared with each of the non-aqueous electrolyte secondary batteries of Examples F1 to F4.

Further, as compared with each of the non-aqueous electrolyte secondary batteries of Comparative Examples x1 to x3, y1 and z1, in each of the non-aqueous electrolyte secondary batteries of Examples F1 to F4, the same as the non-aqueous electrolyte secondary batteries of Examples A1 to A7, after high-temperature sequence charging examination, the value of the increment in thickness was lower and the percentage of capacity retention, the percentage of capacity recovery and the percentage of charging/discharging efficiency were more improved.

Example G1

A positive electrode of Example G1 was prepared in the following manner. Lithium cobaltate wherein each of Mg and Al formed solid solution in a concentration of 0.5 mol % was used as positive electrode active material particle. Then, 1000 g of the positive electrode active material particle was poured into 3 liter of pure water and stirred, and an aqueous solution of lutetium nitrate dissolving 5.21 g of lutetium nitrate 3-hydrate in 200 ml of pure water was added thereto. After that, 10 mass % of an aqueous solution of sodium hydroxide was appropriately added so that the pH of the resultant solution was 9, and lutetium hydroxide was adhered on the surface of the positive electrode active material particle. Then, filtering suction was conducted to collect the treated object by filtration and the treated object was dried at 120° C. Thus was prepared the positive electrode active material particle having lutetium hydroxide adhered on the surface.

Next, the positive electrode active material particle having lutetium hydroxide adhered on the surface was heat-treated at 300° C. in air atmosphere for 5 hours. Thus was prepared the positive electrode active material having a particle of lutetium compound dispersed and adhered on the surface of the positive electrode active material particle.

Here, in the above-mentioned positive electrode active material, a ratio of lutetium element (Lu) in lutetium compound adhering on the surface of the positive electrode active material particle containing lithium cobaltate against the positive electrode active material particle was 0.22 mass %. Further, most of lutetium compound adhering on the surface of the positive electrode active material particle were lutetium oxyhydroxide which was changed from lutetium hydroxide.

Then, the positive electrode active material of Example G1 was observed by SEM. The results of the observation showed that a particle diameter of most of the particle of lutetium compound which were adhered on the surface of the positive electrode active material particle was 100 nm or less. In addition, the particle of lutetium compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm$^3$.

Except for the use of such a positive electrode fabricated above, a flat type-non-aqueous electrolyte secondary battery of Example G1 having a design capacity of 780 mAh in a case of charging to 4.40 V was fabricated the same as Example A1.

Example G2

In Example G2, in preparation of the positive electrode of Example G1, the positive electrode active material particle having lutetium hydroxide adhered on the surface was heat-treated at 200° C. in air atmosphere for 5 hours. Except for the above, the same procedure as in Example G1 was used to fabricate a non-aqueous electrolyte secondary battery of Example G2.

Here, in the positive electrode active material obtained by heat treatment as Example G2, most of lutetium hydroxide adhered on the surface of the positive electrode active material particle were not changed to lutetium oxyhydroxide and remained as lutetium hydroxide.

Example G3

In Example G3, in preparation of the positive electrode of Example G1, as the heat-treatment, the positive electrode active material particle having lutetium hydroxide adhered on the surface was only dried at 120° C. Except for the above, the same procedure as in Example G1 was used to fabricate a non-aqueous electrolyte secondary battery of Example G3.

Here, in the positive electrode active material of Example G3 wherein heat-treatment was only drying at 120° C., lutetium hydroxide adhered on the surface of the positive electrode active material particle was not changed to lutetium oxyhydroxide.

Example G4

In Example G4, in preparation of the positive electrode of Example G1, the amount of lutetium nitrate 3-hydrate dissolved in 200 ml of pure water was changed to 1.59 g in adhering lutetium hydroxide on the surface of positive electrode active material particle. Except for the above, the same procedure as in Example G1 was used to fabricate a non-aqueous electrolyte secondary battery of Example G4.

Here, in Example G4, a ratio of lutetium element (Lu) in lutetium compound adhering on the surface of the positive electrode active material particle containing lithium cobaltate against the positive electrode active material particle was 0.067 mass %. Further, most of lutetium hydroxide adhered on the surface of the positive electrode active material particle were changed to lutetium oxyhydroxide.

Comparative Example g1

In Comparative Example g1, in preparation of the positive electrode of Example G1, lutetium compound was not adhered on the surface of the positive electrode active material particle containing lithium cobaltate. Except for the above, the same procedure as in Example G1 was used to fabricate a non-aqueous electrolyte secondary battery of Comparative Example g1.

Comparative Example g2

In Comparative Example g2, in preparation of the positive electrode of Example G1, lutetium oxide was mechanically adhered on the surface of the positive electrode active material particle containing lithium cobaltate as follows: A lutetium oxide reagent was pulverized until a particle diameter of a primary particle became 300 nm to prepare lutetium oxide. Then, 1.25 g of the foregoing lutetium oxide was mixed with 500 g of positive electrode active material particle containing lithium cobaltate by using the mixing machine (the tradename NOBILTA made by HOSOKAWA MICRON CORPORATION). Thus, the positive electrode active material having lutetium oxide mechanically adhered on the surface of the positive electrode active material particle containing lithium cobaltate was prepared. Except for the use of such a positive electrode active material prepared as above, the same procedure as in Example G1 was used to fabricate a non-aqueous electrolyte secondary battery of Comparative Example g2.

Here, in Comparative Example g2, a ratio of lutetium element (Lu) in lutetium oxide adhered on the surface of the positive electrode active material particle containing lithium cobaltate against the positive electrode active material particle was 0.22 mass %.

Then, the positive electrode active material of Comparative Example g2 was observed by SEM. The results of the observation showed that lutetium oxide was flocculated and adhered on the concave parts of the positive electrode active material particle and was not dispersed on the surface of the positive electrode active material particle.

Comparative Example g3

In Comparative Example g3, in preparation of the positive electrode active material of Comparative Example g2, the amount of lutetium oxide having the primary particle diameter of 300 nm was changed to 4.97 g. Except for the use of such a positive electrode active material prepared as above, the same procedure as in Example G1 was used to fabricate a non-aqueous electrolyte secondary battery of Comparative Example g3.

Here, in Comparative Example g3, a ratio of lutetium element (Lu) in lutetium oxide adhered on the surface of the positive electrode active material particle containing lithium cobaltate against the positive electrode active material particle was 0.87 mass %.

Then, the positive electrode active material of Comparative Example g3 was observed by SEM. The results of the observation showed that lutetium oxide was flocculated and adhered on the concave parts of the positive electrode active material particle and was not dispersed on the surface of the positive electrode active material particle the same as the positive electrode active material of Comparative Example g2.

Comparative Example g4

In Comparative Example g4, in preparation of the positive electrode of Example G1, the positive electrode active material particle having lutetium hydroxide adhered on the surface was heat-treated at 500° C. in air atmosphere for 5 hours. Except for the above, the same procedure as in Example G1 was used to fabricate a non-aqueous electrolyte secondary battery of Comparative Example g4.

Here, in the positive electrode active material of Comparative Example g4 obtained by the heat-treatment, lutetium hydroxide adhered on the surface of the positive electrode active material particle was changed to lutetium oxide, and one part of lutetium was diffused inside of the positive electrode active material particle.

Next, as the initial charging, each of the non-aqueous electrolyte secondary batteries of Examples G1 to G4 and Comparative Examples g1 to g4 was charged at the constant current to 4.40 V and was further charged at the constant voltage of 4.40 V the same as the non-aqueous electrolyte secondary battery of Example A1. After 10 minutes pause, as the initial discharging, each of the batteries was discharged at the constant current of 750 mA to 2.75 V. Thus, initial discharge capacity Qo of each non-aqueous electrolyte secondary battery was measured.

Further, percentage of initial charging/discharging efficiency of each non-aqueous electrolyte secondary battery of Examples G1 to G4 and Comparative Example g4 was determined. As a result of determination, while the percentage of initial charging/discharging efficiency of each non-aqueous electrolyte secondary battery of Examples G1 to G4 was 89%, the percentage of initial charging/discharging efficiency of non-aqueous electrolyte secondary battery of Comparative Example g4 was 86%. The reason is thought to be as follows. In the non-aqueous electrolyte secondary battery of Comparative Example g4, lutetium hydroxide which was adhered on the surface of the positive electrode active material particle was changed to lutetium oxide and one part of lutetium was diffused inside of the positive electrode active material particle.

After the initial charging/discharging, the same as the non-aqueous electrolyte secondary battery of Examples A1, each of the non-aqueous electrolyte secondary batteries of Examples G1 to G4 and Comparative Examples g1 to g4 was subjected to the high-temperature sequence charging examination. Next, as to each of the non-aqueous electrolyte secondary batteries, the increment in thickness thereof after high-temperature sequence charging examination against before high-temperature sequence charging examination was measured. The results are shown together with the results of non-aqueous electrolyte secondary batteries of Comparative Examples x1 to x3, y1 and z1 in Table 11 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. After that, percentage (%) of capacity retention after high-temperature sequence charging examination was obtained according to the equation (4). The results are shown together with the results of non-aqueous electrolyte secondary batteries of Comparative Examples x1 to x3, y1 and z1 in Table 11 below.

After 10 minutes pause, each of the non-aqueous electrolyte secondary batteries was charged at the constant current of 750 mA to 4.40 V and was further charged at the constant voltage of 4.40 V until the current became 37.5 mA under room temperature to measure charging capacity Qb. Then, 10 minutes pause was made. After that, each of the non-aqueous electrolyte secondary batteries after high-temperature sequence charging examination was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown together with the results of non-aqueous electrolyte secondary batteries of Comparative Examples x1 to x3, y1 and z1 in Table 11 below.

TABLE 11

| | Treatment of surface of positive electrode active material | | | Evaluation of characteristics after high-temperature sequence charging examination | | | |
|---|---|---|---|---|---|---|---|
| | Treatment method | Heat treatment temperature (° C.) | Element adhered and volume of adhesion (mass %) | Percentage (%) of capacity retention | Percentage (%) of capacity recovery | Percentage (%) of charging/ discharging efficiency | Increment in thickness (mm) |
| Ex. G1 | Deposition + Heat-treatment | 300 | Lu 0.22 | 84.3 | 78.8 | 99.9 | 1.00 |
| Ex. G2 | Deposition + Heat-treatment | 200 | Lu 0.22 | 83.8 | 78.2 | 99.8 | 1.25 |
| Ex. G3 | Deposition + Heat-treatment | 120 | Lu 0.22 | 83.5 | 78.1 | 98.4 | 1.29 |
| Ex. G4 | Deposition + Heat-treatment | 300 | Lu 0.067 | 84.5 | 79.5 | 99.7 | 0.93 |
| Comp. Ex. g1 | — | — | — | 52.7 | 57.5 | 85.9 | 6.88 |
| Comp. Ex. g2 | Mechanical treatment | — | Lu 0.22 | 53.5 | 57.5 | 86.1 | 7.85 |
| Comp. Ex. g3 | Mechanical treatment | — | Lu 0.87 | 59.5 | 68.8 | 91.2 | 6.76 |
| Comp. Ex. g4 | Deposition + Heat-treatment | 500 | Lu 0.22 | 73.2 | 69.9 | 91.1 | 2.88 |
| Comp. Ex. x1 | Deposition + Heat-treatment | 120 | Al 0.22 | 61.5 | 68.3 | 94.5 | 2.89 |
| Comp. Ex. x2 | Deposition + Heat-treatment | 500 | Al 0.22 | 58.5 | 65.8 | 95.5 | 3.55 |
| Comp. Ex. x3 | Deposition + Heat-treatment | 120 | Al 0.067 | 64.5 | 67.3 | 92.5 | 5.25 |
| Comp. Ex. y1 | Deposition + Heat-treatment | 120 | Zn 0.22 | 69.1 | 61.5 | 90.0 | 6.35 |
| Comp. Ex. z1 | Deposition + Heat-treatment | 300 | Ce 0.22 | 71.2 | 67.8 | 89.5 | 3.12 |

As is apparent from Table 11 the above, in each of the non-aqueous electrolyte secondary batteries of Examples G1 to G4 which utilized the positive electrode active material having the particle of lutetium compound comprising lutetium hydroxide and lutetium oxyhydroxide dispersed and adhered on the surface of the positive electrode active material particle containing lithium cobaltate, after high-temperature sequence charging examination, the value of increment in thickness was low, and the percentage of capacity retention, the percentage of capacity recovery and the percentage of charging/discharging efficiency were improved. On the other hand, as to each of the non-aqueous electrolyte secondary batteries of Comparative Examples g1 to g4, after high-temperature sequence charging examination, the value of increment of thickness was higher, and the percentage of capacity retention, the percentage of capacity recovery and the percentage of high charging/discharging efficiency were more decreased as compared with each of the non-aqueous electrolyte secondary batteries of Examples G1 to G4.

Further, as compared with each of the non-aqueous electrolyte secondary batteries of Comparative Examples x1 to x3, y1 and z1, in each of the non-aqueous electrolyte secondary batteries of Examples G1 to G4, the same as the non-aqueous electrolyte secondary batteries of Examples A1 to A7, after high-temperature sequence charging examination, the value of increment in thickness was lower and the percentage of capacity retention, the percentage of capacity recovery and the percentage of charging/discharging efficiency were more improved.

Example H1

A positive electrode of Example H1 was prepared in the following manner. As a positive electrode active material particle not containing Co or Ni, lithium manganese oxide LiMn$_2$O$_4$ having spinel structure wherein each of Mg and Al formed solid solution in a concentration of 1 mol % was used. Except for the above, the same procedure as in Example A1 was used to prepare a positive electrode active material having a particle of erbium compound dispersed and adhered on the surface of positive electrode active material particle.

Here, in the above-mentioned positive electrode active material, a ratio of erbium element (Er) in erbium compound adhering on the surface of the positive electrode active material particle containing lithium cobaltate against the positive electrode active material particle was 0.22 mass %. Further, most of erbium hydroxide adhered on the surface of the positive electrode active material particle were changed to erbium oxyhydroxide.

A particle diameter of most of the particle of erbium compound which were adhered on the surface of the positive electrode active material particle was 100 nm or less. In addition, the particle of erbium compound was dispersed and adhered on the surface of the positive electrode active material particle.

Except for the use of the positive electrode active material having the particle of erbium compound dispersed and adhered on the surface of positive electrode active material particle comprising lithium manganese oxide having spinel structure, the same procedure as in Example A1 was used to fabricate a non-aqueous electrolyte secondary battery of Example H1.

Example H2

In Example H2, lithium manganese oxide LiMn$_2$O$_4$ having spinel structure wherein each of Mg and Al formed solid solution in the concentration of 1 mol % was used as a positive electrode active material particle the same as Example H1. Except for the above, the same procedure as in Example B1 was used to prepare a positive electrode active material having a particle of ytterbium compound dispersed and adhered on the surface of positive electrode active material particle.

Here, in the above-mentioned positive electrode active material of Example H2, a ratio of ytterbium element (Yb) in ytterbium compound adhering on the surface of the positive electrode active material particle against the positive electrode active material particle was 0.22 mass %. Most of ytterbium hydroxide adhered on the surface of the positive electrode active material particle were changed to ytterbium oxyhydroxide. Further, a particle diameter of most of the particle of ytterbium compound which were adhered on the surface of the positive electrode active material particle was 100 nm or less. In addition, the particle of ytterbium compound was dispersed and adhered on the surface of the positive electrode active material particle.

Except for the use of the positive electrode active material having the particle of ytterbium compound dispersed and adhered on the surface of positive electrode active material particle comprising lithium manganese oxide having spinel structure, the same procedure as in Example A1 was used to fabricate a non-aqueous electrolyte secondary battery of Example H2.

Example H3

In Example H3, lithium manganese oxide LiMn$_2$O$_4$ having spinel structure wherein each of Mg and Al formed solid solution in the concentration of 1 mol % was used as a positive electrode active material particle the same as Example H1. Except for the above, the same procedure as in Example C1 was used to prepare a positive electrode active material having a particle of terbium compound dispersed and adhered on the surface of positive electrode active material particle.

Here, in the above-mentioned positive electrode active material of Example H3, a ratio of terbium element (Tb) in terbium compound adhering on the surface of the positive electrode active material particle against the positive electrode active material particle was 0.22 mass %. Most of terbium hydroxide adhered on the surface of the positive electrode active material particle were changed to terbium oxyhydroxide. Further, a particle diameter of most of the particle of terbium compound which were adhered on the surface of the positive electrode active material particle was 100 nm or less. In addition, the particle of terbium compound was dispersed and adhered on the surface of the positive electrode active material particle.

Except for the use of the positive electrode active material having the particle of terbium compound dispersed and adhered on the surface of positive electrode active material particle comprising lithium manganese oxide having spinel structure, the same procedure as in Example A1 was used to fabricate a non-aqueous electrolyte secondary battery of Example H3.

Example H4

In Example H4, lithium manganese oxide LiMn$_2$O$_4$ having spinel structure wherein each of Mg and Al formed solid solution in the concentration of 1 mol % was used as a positive electrode active material particle the same as Example H1. Except for the above, the same procedure as in Example D1 was used to prepare a positive electrode active material having a particle of dysprosium compound dispersed and adhered on the surface of positive electrode active material particle.

Here, in the above-mentioned positive electrode active material of Example H4, a ratio of dysprosium element (Dy) in dysprosium compound adhering on the surface of the positive electrode active material particle against the positive electrode active material particle was 0.22 mass %. Most of dysprosium hydroxide adhered on the surface of the positive electrode active material particle were changed to dysprosium oxyhydroxide. Further, a particle diameter of most of the particle of dysprosium compound which were adhered on the surface of the positive electrode active material particle was 100 nm or less. In addition, the particle of dysprosium compound was dispersed and adhered on the surface of the positive electrode active material particle.

Except for the use of the positive electrode active material having the particle of dysprosium compound dispersed and adhered on the surface of positive electrode active material particle comprising lithium manganese oxide having spinel structure, the same procedure as in Example A1 was used to fabricate a non-aqueous electrolyte secondary battery of Example H4.

Example H5

In Example H5, lithium manganese oxide $LiMn_2O_4$ having spinel structure wherein each of Mg and Al formed solid solution in the concentration of 1 mol % was used as a positive electrode active material particle the same as Example H1. Except for the above, the same procedure as in Example E1 was used to prepare a positive electrode active material having a particle of holmium compound dispersed and adhered on the surface of positive electrode active material particle.

Here, in the above-mentioned positive electrode active material of Example H5, a ratio of holmium element (Ho) in holmium compound adhering on the surface of the positive electrode active material particle against the positive electrode active material particle was 0.22 mass %. Most of holmium hydroxide adhered on the surface of the positive electrode active material particle were changed to holmium oxyhydroxide. Further, a particle diameter of most of the particle of holmium compound which were adhered on the surface of the positive electrode active material particle was 100 nm or less. In addition, the particle of holmium compound was dispersed and adhered on the surface of the positive electrode active material particle.

Except for the use of the positive electrode active material having the particle of holmium compound dispersed and adhered on the surface of positive electrode active material particle comprising lithium manganese oxide having spinel structure, the same procedure as in Example A1 was used to fabricate a non-aqueous electrolyte secondary battery of Example H5.

Example H6

In Example H6, lithium manganese oxide $LiMn_2O_4$ having spinel structure wherein each of Mg and Al formed solid solution in the concentration of 1 mol % was used as a positive electrode active material particle the same as Example H1. Except for the above, the same procedure as in Example F1 was used to prepare a positive electrode active material having a particle of thulium compound dispersed and adhered on the surface of positive electrode active material particle.

Here, in the above-mentioned positive electrode active material of Example H6, a ratio of thulium element (Tm) in thulium compound adhering on the surface of the positive electrode active material particle against the positive electrode active material particle was 0.22 mass %. Most of thulium hydroxide adhered on the surface of the positive electrode active material particle were changed to thulium oxyhydroxide. Further, a particle diameter of most of the particle of thulium compound which were adhered on the surface of the positive electrode active material particle was 100 nm or less. In addition, the particle of thulium compound was dispersed and adhered on the surface of the positive electrode active material particle.

Except for the use of the positive electrode active material having the particle of thulium compound dispersed and adhered on the surface of positive electrode active material particle comprising lithium manganese oxide having spinel structure, the same procedure as in Example A1 was used to fabricate a non-aqueous electrolyte secondary battery of Example H6.

Example H7

In Example H7, lithium manganese oxide $LiMn_2O_4$ having spinel structure wherein each of Mg and Al formed solid solution in the concentration of 1 mol % was used as a positive electrode active material particle the same as Example H1. Except for the above, the same procedure as in Example G1 was used to prepare a positive electrode active material having a particle of lutetium compound dispersed and adhered on the surface of positive electrode active material particle.

Here, in the above-mentioned positive electrode active material of Example H7, a ratio of lutetium element (Lu) in lutetium compound adhering on the surface of the positive electrode active material particle against the positive electrode active material particle was 0.22 mass %. Most of lutetium hydroxide adhered on the surface of the positive electrode active material particle were changed to lutetium oxyhydroxide. Further, a particle diameter of most of the particle of lutetium compound which were adhered on the surface of the positive electrode active material particle was 100 nm or less. In addition, the particle of lutetium compound was dispersed and adhered on the surface of the positive electrode active material particle.

Except for the use of the positive electrode active material having the particle of lutetium compound dispersed and adhered on the surface of positive electrode active material particle comprising lithium manganese oxide having spinel structure, the same procedure as in Example A1 was used to fabricate a non-aqueous electrolyte secondary battery of Example H7.

Comparative Example h

In Comparative Example h, lithium manganese oxide $LiMn_2O_4$ having spinel structure wherein each of Mg and Al formed solid solution in the concentration of 1 mol % was used as a positive electrode active material particle the same as Example H1 and no compound was adhered on the surface of the positive electrode active material particle. Except for the above, the same procedure as in Example A1 was used to fabricate a non-aqueous electrolyte secondary battery of Comparative Example h.

Next, the initial charging/discharging under room temperature environment was conducted as follows. As the initial charging, each of the non-aqueous electrolyte secondary batteries of Examples H1 to H7 and Comparative Example h was charged at the constant current of 750 mA to 4.20 V and was further charged at the constant voltage of 4.20 V until the current became 37.5 mA. After 10 minutes pause, as the initial discharging, each of the batteries was discharged at the constant current of 750 mA to 2.75 V. Thus, initial discharge capacity Qo of each non-aqueous electrolyte secondary battery was measured.

After that, a high-temperature sequence charging examination was conducted as follows. Each of the non-aqueous electrolyte secondary batteries of Examples H1 to H7 and Comparative Example h after initial charging/discharging was retained in the thermostatic container of 60° C. for 1 hour. Then, each of the non-aqueous electrolyte secondary batteries was charged at the constant current of 750 mA until the voltage became 4.20 V, and further was charged so as to maintain the voltage of 4.20 V for 3 days in the thermostatic container of 60° C. Next, as to each of the non-aqueous electrolyte secondary batteries, the increment in thickness thereof after high-temperature sequence charging examination against before high-temperature sequence charging examination was measured. The results are shown in Table 12 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. After that, percentage (%) of capacity retention after high-temperature sequence charging examination was obtained according to the equation (4). The results are shown in Table 12 below.

Further, after 10 minutes pause, each of the non-aqueous electrolyte secondary batteries was charged at the constant current of 750 mA to 4.20 V and was further charged at the constant voltage of 4.20 V until the current became 37.5 mA under room temperature to measure charging capacity Qb. Then, 10 minutes pause was made. After that, each of the non-aqueous electrolyte secondary batteries was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown in Table 12 below.

As is apparent from Table 12 the above, even if the positive electrode active material particle of lithium manganese oxide having spinel structure which did not contain Co or Ni was used, after high-temperature sequence charging examination, the percentage of capacity retention, the percentage of capacity recovery and the percentage of charging/discharging efficiency were more improved in each of the non-aqueous electrolyte secondary batteries of Examples H1 to H7 utilizing the positive electrode active material having the particle of erbium compound, ytterbium compound, terbium compound, dysprosium compound, holmium compound, thulium compound or lutetium compound dispersed and adhered on the surface of the positive electrode active material particle, as compared with the non-aqueous electrolyte secondary battery of Comparative Example h utilizing the positive electrode active material wherein the particle of the above-recited compounds were not dispersed nor adhered on its surface.

However, as to the increment thickness after high-temperature sequence charging examination, the value of the non-aqueous electrolyte secondary batteries of Examples H1 to H4 and that of the non-aqueous electrolyte secondary battery of Comparative Example h were almost the same. The reason is supposed to be as follows. Lithium manganese oxide having spinel structure not containing Co nor Ni has lower catalytic property than the positive electrode active material such as lithium cobaltate, and therefore, a decomposition reaction of the non-aqueous electrolyte hardly occurs in high-temperature sequence charging examination. Accordingly, it is found that the effects of restriction of increment in the battery thickness after high-temperature sequence charging examination may be more effectively obtained in the case where the particle of erbium compound, ytterbium compound, terbium compound, dysprosium compound, holmium compound, thulium compound or lutetium compound were dispersed and adhered to the positive electrode active material particle containing Co and Ni.

Example I1

A positive electrode of Example I1 was prepared in the following manner. Lithium cobaltate $LiCoO_2$ wherein each

TABLE 12

Positive electrode active material: Lithium manganese oxide $LiMn_2O_4$ having spinel structure

| | Treatment of surface of positive electrode active material | | | Evaluation of characteristics after high-temperature sequence charging examination | | | |
|---|---|---|---|---|---|---|---|
| | Treatment method | Heat treatment temperature (° C.) | Element adhered and volume of adhesion (mass %) | | Percentage (%) of capacity retention | Percentage (%) of capacity recovery | Percentage (%) of charging/ discharging efficiency | Increment in thickness (mm) |
| Ex. H1 | Deposition + Heat-treatment | 300 | Er | 0.22 | 93.2 | 94.5 | 100.1 | 0.56 |
| Ex. H2 | Deposition + Heat-treatment | 300 | Yb | 0.22 | 93.1 | 94.8 | 100.1 | 0.56 |
| Ex. H3 | Deposition + Heat-treatment | 300 | Tb | 0.22 | 93.0 | 94.5 | 100.1 | 0.56 |
| Ex. H4 | Deposition + Heat-treatment | 300 | Dy | 0.22 | 93.2 | 94.4 | 100.1 | 0.54 |
| Ex. H5 | Deposition + Heat-treatment | 300 | Ho | 0.22 | 93.1 | 94.6 | 100.1 | 0.53 |
| Ex. H6 | Deposition + Heat-treatment | 300 | Tm | 0.22 | 93.3 | 94.2 | 100.1 | 0.56 |
| Ex. H7 | Deposition + Heat-treatment | 300 | Lu | 0.22 | 93.1 | 94.3 | 100.1 | 0.55 |
| Comp. Ex. h | — | — | — | — | 89.5 | 91.5 | 99.2 | 0.58 | of Mg and Al formed solid solution in a concentration of 0.5 mol % and Zr formed solid solution in a concentration of 0.1 mol % was used as positive electrode active material particle. Then, 1000 g of the positive electrode active material particle was poured into 3 liter of pure water and stirred, and an aqueous solution of neodymium nitrate dissolving 2.60 g of neodymium nitrate 6-hydrate in 200 ml of pure water was added thereto. After that, 10 mass % of an aqueous solution of sodium hydroxide was appropriately added so that the pH of the resultant solution was 9, and neodymium hydroxide was adhered on the surface of the positive electrode active material particle. Then, filtering suction was conducted to collect the treated object by filtration and the treated object was dried at 120° C. Thus was prepared the positive electrode active material particle having neodymium hydroxide adhered on the surface.

Next, the positive electrode active material particle having neodymium hydroxide adhered on the surface was heat-treated at 400° C. in air atmosphere for 5 hours. Thus was prepared the positive electrode active material having a particle of neodymium compound dispersed and adhered on the surface of the positive electrode active material particle.

Here, in the above-mentioned positive electrode active material, a ratio of neodymium element (Nd) in neodymium compound adhering on the surface of the positive electrode active material particle containing lithium cobaltate against the positive electrode active material particle was 0.086 mass %. Further, most of neodymium compound adhering on the surface of the positive electrode active material particle were neodymium oxyhydroxide which was changed from neodymium hydroxide.

Then, the positive electrode active material of Example I1 was observed by SEM. The results of the observation showed that a particle diameter of most of the particle of neodymium compound which were adhered on the surface of the positive electrode active material particle was 100 nm or less. In addition, the particle of neodymium compound was uniformly dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm$^3$.

Figure 2:
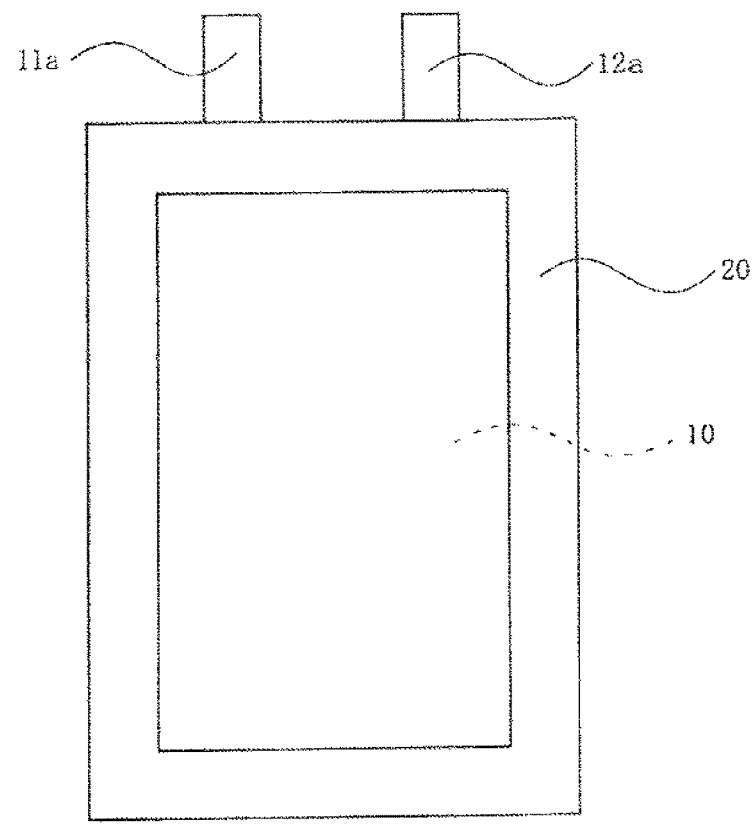
FIG. 2 is a schematic plain view illustrating a non-aqueous electrolyte secondary battery fabricated in Examples and Comparative Examples of the invention.

In Example I1, the same negative electrode and the same non-aqueous electrolyte of Example A1 was used as a negative electrode and a non-aqueous electrolyte. Then, as shown in FIGS. 1 (A) and 1(B) and FIG. 2, a flat type-non-aqueous electrolyte secondary battery having a design capacity of 780 mAh in a case of charging to 4.40 V was fabricated the same as Example A1.

Example I2

In Example I2, in preparation of the positive electrode of Example I1, the positive electrode active material particle having neodymium hydroxide adhered on the surface was heat-treated at 200° C. in air atmosphere for 5 hours. Except for the above, the same procedure as in Example I1 was used to fabricate a non-aqueous electrolyte secondary battery of Example I2.

Here, in the positive electrode active material of Example I2, most of neodymium hydroxide adhered on the surface of the positive electrode active material particle were not changed to neodymium oxyhydroxide and remained as neodymium hydroxide.

Example I3

In Example I3, in preparation of the positive electrode of Example I1, as the heat-treatment, the positive electrode active material particle having neodymium hydroxide adhered on the surface was only dried at 120° C. Except for the above, the same procedure as in Example I1 was used to fabricate a non-aqueous electrolyte secondary battery of Example I3.

Here, in the positive electrode active material of Example I3, neodymium hydroxide adhered on the surface of the positive electrode active material particle was not changed to neodymium oxyhydroxide.

Example I4

In Example I4, in preparation of the positive electrode of Example I1, the amount of neodymium nitrate 6-hydrate dissolved in 200 ml of pure water was changed to 5.47 g in adhering neodymium hydroxide on the surface of positive electrode active material particle. Except for the above, the same procedure as in Example I1 was used to fabricate a non-aqueous electrolyte secondary battery of Example I4.

Here, in Example I4, a ratio of neodymium element (Nb) in neodymium compound adhering on the surface of the positive electrode active material particle containing lithium cobaltate against the positive electrode active material particle was 0.18 mass %. Further, most of neodymium compound adhering on the surface of the positive electrode active material particle were neodymium oxyhydroxide which was changed from neodymium hydroxide.

Example I5

In Example I5, in preparation of the positive electrode of Example I1, the amount of neodymium nitrate 6-hydrate dissolved in 200 ml of pure water was changed to 9.12 g in adhering neodymium hydroxide on the surface of positive electrode active material particle. Except for the above, the same procedure as in Example I1 was used to fabricate a non-aqueous electrolyte secondary battery of Example I5.

Here, in Example I5, a ratio of neodymium element (Nd) in neodymium compound adhering on the surface of the positive electrode active material particle containing lithium cobaltate against the positive electrode active material particle was 0.30 mass %. Further, most of neodymium compound adhering on the surface of the positive electrode active material particle were neodymium oxyhydroxide which was changed from neodymium hydroxide.

Example I6

In Example I6, in preparation of the positive electrode of Example I1, the amount of neodymium nitrate 6-hydrate dissolved in 200 ml of pure water was changed to 10.7 g in adhering neodymium hydroxide on the surface of positive electrode active material particle. Except for the above, the same procedure as in Example I1 was used to fabricate a non-aqueous electrolyte secondary battery of Example I6.

Here, in Example I6, a ratio of neodymium element (Nd) in neodymium compound adhering on the surface of the positive electrode active material particle containing lithium cobaltate against the positive electrode active material particle was 0.35 mass %. Further, most of neodymium compound adhering on the surface of the positive electrode active material particle were neodymium oxyhydroxide which was changed from neodymium hydroxide.

Comparative Example i1

In Comparative Example i1, in preparation of the positive electrode of Example I1, neodymium compound was not adhered on the surface of the positive electrode active material particle containing lithium cobaltate. Except for the above, the same procedure as in Example I1 was used to fabricate a non-aqueous electrolyte secondary battery of Comparative Example i1.

Comparative Example i2

In Comparative Example i2, in preparation of the positive electrode of Example I1, neodymium oxide was mechanically adhered on the surface of the positive electrode active material particle containing lithium cobaltate as follows: A neodymium oxide reagent was pulverized until a particle diameter of a primary particle became 400 nm to prepare neodymium oxide. Then, 0.50 g of the foregoing neodymium oxide was mixed with 500 g of positive electrode active material particle containing lithium cobaltate by using the mixing machine (the tradename NOBILTA made by HOSOKAWA MICRON CORPORATION). Thus, the positive electrode active material having neodymium oxide mechanically adhered on the surface of the positive electrode active material particle containing lithium cobaltate was prepared. Except for the use of such a positive electrode active material prepared as above, the same procedure as in Example I1 was used to fabricate a non-aqueous electrolyte secondary battery of Comparative Example i2.

Here, in Comparative Example i2, a ratio of neodymium element (Nd) in neodymium oxide adhered on the surface of the positive electrode active material particle containing lithium cobaltate against the positive electrode active material particle was 0.086 mass %.

Then, the positive electrode active material of Comparative Example i2 was observed by SEM. The results of the observation showed that neodymium oxide was flocculated and adhered on the concave parts of the positive electrode active material particle and was not dispersed on the surface of the positive electrode active material particle.

Comparative Example i3

In Comparative Example i3, in preparation of the positive electrode active material of Comparative Example i2, the amount of neodymium oxide having the primary particle diameter of 400 nm was changed to 5.0 g. Except for the use of such a positive electrode active material prepared as above, the same procedure as in Example I1 was used to fabricate a non-aqueous electrolyte secondary battery of Comparative Example i3.

Here, in Comparative Example i3, a ratio of neodymium element (Nd) in neodymium compound adhering on the surface of the positive electrode active material particle containing lithium cobaltate against the positive electrode active material particle was 0.86 mass %.

Then, the positive electrode active material of Comparative Example i3 was observed by SEM. The results of the observation showed that neodymium oxide was flocculated and adhered on the concave parts of the positive electrode active material particle and was not dispersed on the surface of the positive electrode active material particle the same as the positive electrode active material of Comparative Example i2.

Comparative Example i4

In Comparative Example i4, in preparation of the positive electrode of Example I1, the positive electrode active material particle having neodymium hydroxide adhered on the surface was heat-treated at 600° C. in air atmosphere for 5 hours. Except for the above, the same procedure as in Example I1 was used to fabricate a non-aqueous electrolyte secondary battery of Comparative Example i4.

Here, in the positive electrode active material of Comparative Example i4 obtained by the heat-treatment, neodymium hydroxide adhered on the surface of the positive electrode active material particle was changed to neodymium oxide, and one part of neodymium was diffused inside of the positive electrode active material particle.

Comparative Example x11

In Comparative Example x11, in preparation of the positive electrode active material of Example I1, 1000 g of the positive electrode active material particle was poured into 3 liter of pure water and stirred, and an aqueous solution of aluminum nitrate dissolving 12.0 g of aluminum nitrate 9-hydrate in 200 ml of pure water was added thereto. After that, 10 mass % of an aqueous solution of sodium hydroxide was appropriately added so that the pH of the resultant solution was 9, and aluminum hydroxide was adhered on the surface of the positive electrode active material particle. Then, filtering suction was conducted to collect the treated object by filtration and the treated object was dried at 120° C. Thus was prepared the positive electrode active material particle having aluminum compound adhered on the surface. Except for the use of such a positive electrode active material prepared as above, the same procedure as in Example I1 was used to fabricate a non-aqueous electrolyte secondary battery of Comparative Example x11.

Here, in the above-mentioned positive electrode active material Comparative Example x11, a ratio of aluminum element (Al) in aluminum compound adhering on the surface of the positive electrode active material particle containing lithium cobaltate against the positive electrode active material particle was 0.086 mass %. Further, aluminum compound adhering on the surface of the positive electrode active material particle was aluminum hydroxide.

Comparative Example x12

In Comparative Example x12, the positive electrode active material of Comparative Example x11 was heat-treated at 400° C. in air atmosphere for 5 hours. Except for the use of such a positive electrode active material, the same procedure as in Example I1 was used to fabricate a non-aqueous electrolyte secondary battery of Comparative Example x12.

Here, in the above-mentioned positive electrode active material of Comparative Example x12, a ratio of aluminum element (Al) in aluminum compound adhering on the surface of the positive electrode active material particle containing lithium cobaltate against the positive electrode active material particle was 0.086 mass %. Further, aluminum compound adhering on the surface of the positive electrode active material particle was changed to aluminum oxide.

Comparative Example x13

In Comparative Example x13, in preparation of the positive electrode active material of Comparative Example x11, an aqueous solution of aluminum nitrate dissolving 28.0 g of aluminum nitrate 9-hydrate in pure water was added and the heat-treatment conducted for the positive electrode active material was only for drying at 120° C. Except for the above, the same procedure as in Comparative Example x11 was used to obtain a positive electrode active material of Comparative Example x13, and except for the use of such a positive electrode active material, the same procedure as in Example I1 was used to fabricate a non-aqueous electrolyte secondary battery of Comparative Example x13.

Here, in the above-mentioned positive electrode active material, a ratio of aluminum element (Al) in aluminum compound adhering on the surface of the positive electrode active material particle containing lithium cobaltate against the positive electrode active material particle was 0.20 mass %. Further, aluminum compound adhering on the surface of the positive electrode active material particle was aluminum hydroxide the same as in Comparative Example x11.

Comparative Example y11

In Comparative Example y11, in preparation of the positive electrode active material of Example I1, 1000 g of the positive electrode active material particle was poured into 3 liter of pure water and stirred, and an aqueous solution of zinc sulfate dissolving 7.56 g of zinc sulfate 7-hydrate in 200 ml of pure water was added thereto. After that, 10 mass % of an aqueous solution of sodium hydroxide was appropriately added so that the pH of the resultant solution was 9, and zinc hydroxide was adhered on the surface of the positive electrode active material particle. Then, filtering suction was conducted to collect the treated object by filtration and the treated object was dried at 120° C. Thus zinc compound was adhered on the surface of the positive electrode active material particle. Then, the positive electrode active material particle having zinc compound adhered on the surface was heat-treated at 400° C. in air atmosphere for 5 hours to obtain a positive electrode active material. Except for the use of such a positive electrode active material prepared as above, the same procedure as in Example I1 was used to fabricate a non-aqueous electrolyte secondary battery of Comparative Example y11.

Here, in the above-mentioned positive electrode active material of Comparative Example y11, a ratio of zinc element (Zn) in zinc compound adhering on the surface of the positive electrode active material particle against the positive electrode active material particle was 0.086 mass %. Further, zinc compound adhering on the surface of the positive electrode active material particle was changed to zinc oxide.

Comparative Example z11

In Comparative Example z11, in preparation of the positive electrode active material of Example I1, 1000 g of the positive electrode active material particle was poured into 3 liter of pure water and stirred, and an aqueous solution of cerium nitrate dissolving 2.67 g of cerium nitrate 6-hydrate in 200 ml of pure water was added thereto. After that, 10 mass % of an aqueous solution of sodium hydroxide was appropriately added so that the pH of the resultant solution was 9, and cerium hydroxide was adhered on the surface of the positive electrode active material particle. Then, filtering suction was conducted to collect the treated object by filtration and the treated object was dried at 120° C. Thus was prepared the positive electrode active material particle having cerium compound adhered on the surface. Except for the use of such a positive electrode active material prepared as above, the same procedure as in Example I1 was used to fabricate a non-aqueous electrolyte secondary battery of Comparative Example z11.

Here, in the above-mentioned positive electrode active material, a ratio of cerium element (Ce) in cerium compound adhering on the surface of the positive electrode active material particle against the positive electrode active material particle was 0.086 mass %.

Here, cerium hydroxide represented by the chemical formula, $CeO_2 \cdot 2H_2O$, was measured by thermogravimetric analysis at the heating rate of 5° C./min. As a result of measurement, $CeO_2 \cdot 2H_2O$ was decomposed to $CeO_2 \cdot 0.5H_2O$ at 110° C. or less and was not stable as cerium hydroxide, and decomposed to $CeO_2$ at 280° C. Therefore, it is supposed to be that cerium compound adhering on the surface of the positive electrode active material was not cerium hydroxide or cerium oxyhydroxide.

Next, each of the non-aqueous electrolyte secondary batteries of Examples I1 to I6 and Comparative Examples i1 to i4, x11 to x13, y11 and z11 was subjected to the initial charging/discharging the same as the non-aqueous electrolyte secondary battery of Example A1. Then, initial discharge capacity Qo of each non-aqueous electrolyte secondary battery was measured and initial charging/discharging efficiency of each non-aqueous electrolyte secondary battery was determined. The results were shown in Table 13 below.

After that, a high-temperature sequence charging examination was conducted as follows. Each of the non-aqueous electrolyte secondary batteries of Examples I1 to I6 and Comparative Examples i1 to i4, x11 to x13, y11 and z11 after initial charging/discharging was retained in the thermostatic container of 60° C. for 1 hour. After that, each of the non-aqueous electrolyte secondary batteries was charged at the constant current of 750 mA until the voltage became 4.40 V, and was charged at 4.40 V for 70 hours in the thermostatic container of 60° C. Next, as to each of the non-aqueous electrolyte secondary batteries, the increment in thickness thereof after high-temperature sequence charging examination against before high-temperature sequence charging examination was measured. The results are shown in Table 13 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. After 10 minutes pause, percentage (%) of capacity retention after high-temperature sequence charging examination was obtained according to the equation (4). The results are shown in Table 13 below.

Then, each of the non-aqueous electrolyte secondary batteries after 10 minutes pause was charged at the constant current of 750 mA to 4.40 V and was further charged at the constant voltage of 4.40 V until the current became 37.5 mA under room temperature to measure charging capacity Qb. After 10 minutes pause was made, each of the non-aqueous electrolyte secondary batteries after high-temperature sequence charging examination was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown in Table 13 below.

x13, y11 and z11, in each of the non-aqueous electrolyte secondary batteries of Examples I1 to I6 after high-temperature sequence charging examination, the value of increment of thickness was lower, and the percentage of capacity retention, the percentage of capacity recovery and the percentage of charging/discharging efficiency were more improved. The reason is supposed to be as follows. In each of the non-aqueous electrolyte secondary batteries of Comparative Examples x11 to x13, y11 and z11, although a contact between the non-aqueous electrolyte and the positive electrode active material particle was restricted by adhering

TABLE 13

| | Treatment of surface of positive electrode active material | | | Initial | Evaluation of characteristics after high-temperature sequence charging examination | | | |
|---|---|---|---|---|---|---|---|---|
| | Treatment method | Heat treatment temperature (° C.) | Element adhered and volume of adhesion (mass %) | charging/ discharging efficiency (%) | Percentage (%) of capacity retention | Percentage (%) of capacity recovery | Percentage (%) of charging/ discharging efficiency | Increment in thickness (mm) |
| Ex. I1 | Deposition + Heat-treatment | 400 | Nd 0.086 | 89.8 | 88.4 | 82.4 | 99.9 | 0.78 |
| Ex. I2 | Deposition + Heat-treatment | 200 | Nd 0.086 | 89.8 | 88.5 | 82.0 | 99.9 | 0.81 |
| Ex. I3 | Deposition + Heat-treatment | 120 | Nd 0.086 | 89.7 | 88.1 | 81.7 | 99.9 | 0.76 |
| Ex. I4 | Deposition + Heat-treatment | 400 | Nd 0.18 | 89.7 | 87.8 | 82.1 | 99.8 | 0.81 |
| Ex. I5 | Deposition + Heat-treatment | 400 | Nd 0.30 | 88.9 | 87.5 | 81.5 | 99.8 | 0.85 |
| Ex. I6 | Deposition + Heat-treatment | 400 | Nd 0.35 | 88.1 | 86.1 | 81.3 | 99.8 | 0.86 |
| Comp. Ex. i1 | — | — | — | 89.8 | 55.2 | 56.6 | 88.9 | 3.85 |
| Comp. Ex. i2 | Mechanical treatment | — | Nd 0.086 | 89.3 | 54.5 | 56.0 | 86.6 | 3.58 |
| Comp. Ex. i3 | Mechanical treatment | — | Nd 0.86 | 89.3 | 68.2 | 66.6 | 86.8 | 3.55 |
| Comp. Ex. i4 | Deposition + Heat-treatment | 600 | Nd 0.086 | 86.0 | 78.2 | 76.8 | 92.5 | 1.76 |
| Comp. Ex. x11 | Deposition + Heat-treatment | 120 | Al 0.086 | 88.3 | 84.3 | 74.8 | 98.5 | 2.66 |
| Comp. Ex. x12 | Deposition + Heat-treatment | 400 | Al 0.086 | 88.9 | 84.5 | 75.2 | 98.9 | 2.72 |
| Comp. Ex. x13 | Deposition + Heat-treatment | 120 | Al 0.20 | 86.1 | 85.3 | 76.6 | 98.9 | 1.98 |
| Comp. Ex. y11 | Deposition + Heat-treatment | 400 | Zn 0.086 | 88.9 | 81.0 | 71.7 | 90.3 | 3.44 |
| Comp. Ex. z11 | Deposition + Heat-treatment | 120 | Ce 0.086 | 87.0 | 75.2 | 64.3 | 90.3 | 2.01 |

As is apparent from Table 13 the above, in each of the non-aqueous electrolyte secondary batteries of Examples I1 to I6 which utilized the positive electrode active material having the particle of neodymium compound comprising neodymium hydroxide and neodymium oxyhydroxide dispersed and adhered on the surface of the positive electrode active material particle containing lithium cobaltate, after high-temperature sequence charging examination, the value of increment of thickness was low, and the percentage of capacity retention, the percentage of capacity recovery and the percentage of charging/discharging efficiency were improved. On the other hand, as to each of the non-aqueous electrolyte secondary batteries of Comparative Examples i1 to i4, after high-temperature sequence charging examination, the value of increment of thickness was higher, and the percentage of capacity retention, the percentage of capacity recovery and the percentage of high charging/discharging efficiency were more decreased as compared with each of the non-aqueous electrolyte secondary batteries of Examples I1 to I6.

Further, as compared with each of the non-aqueous electrolyte secondary batteries of Comparative Examples x11 to the particles of aluminum compound, zinc compound and cerium compound which do not contribute to charging/discharging on the surface of the positive electrode active material, a reaction and decomposition of the non-aqueous electrolyte on the surface of the positive electrode active material was not fully restricted by the transition metal having catalytic property contained in the positive electrode active material.

Further, in the non-aqueous electrolyte secondary battery of Example I6 wherein the ratio of neodymium element (Nd) in neodymium compound adhering on the surface of the positive electrode active material particle containing lithium cobaltate against the positive electrode active material particle was 0.35 mass %, after high-temperature sequence charging examination, the percentage of capacity retention, the percentage of capacity recovery and the percentage of charging/discharging efficiency were more decreased, and the value of increment of thickness was higher, as compared with each of the non-aqueous electrolyte secondary batteries of Examples I1 to I5 wherein the ratio of neodymium element (Nd) in neodymium compound was less than 0.35 mass %. Therefore, it is preferable that the ratio of neodymium element (Nd) in neodymium compound adhering on the surface of the positive electrode active material particle containing lithium cobaltate against the positive electrode active material particle be less than 0.35 mass %.

Further, in order to restrict lowering of percentage of initial charging/discharging efficiency, it is preferable that the ratio of neodymium element be less than 0.30 mass %. This is because charging/discharging reaction is hindered in the case where the amount of neodymium compound adhering on the surface of the positive electrode active material particle is excessive.

Example J1

A positive electrode of Example J1 was prepared in the following manner. Lithium cobaltate $LiCoO_2$ wherein each of Mg and Al formed solid solution in a concentration of 0.5 mol % and Zr formed solid solution in a concentration of 0.1 mol % was used as positive electrode active material particle. Then, 1000 g of the positive electrode active material particle was poured into 3 liter of pure water and stirred, and an aqueous solution of samarium nitrate dissolving 2.54 g of samarium nitrate 6-hydrate in 200 ml of pure water was added thereto. After that, 10 mass % of an aqueous solution of sodium hydroxide was appropriately added so that the pH of the resultant solution was 9, and samarium hydroxide was adhered on the surface of the positive electrode active material particle. Then, filtering suction was conducted to collect the treated object by filtration and the treated object was dried at 120° C. Thus was prepared the positive electrode active material particle having samarium hydroxide adhered on the surface.

Next, the foregoing positive electrode active material particle was heat-treated at 400° C. in air atmosphere for 5 hours. Thus was prepared the positive electrode active material having a particle of samarium compound uniformly dispersed and adhered on the surface of the positive electrode active material particle.

Here, in the above-mentioned positive electrode active material, a ratio of samarium element (Sm) in samarium compound adhering on the surface of the positive electrode active material particle containing lithium cobaltate against the positive electrode active material particle was 0.086 mass %. Further, samarium compound adhering on the surface of the positive electrode active material particle were samarium oxyhydroxide which was changed from samarium hydroxide.

Then, the positive electrode active material of Example J1 was observed by SEM. The results of the observation showed that a particle diameter of most of the particle of samarium compound which were adhered on the surface of the positive electrode active material particle was 100 nm or less. In addition, the particle of samarium compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm$^3$.

Except for the use of such a positive electrode, the same procedure as in Example I1 was used to fabricate a non-aqueous electrolyte secondary battery of Example J1 of flat type having a design capacity of 780 mAh in a case of charging to 4.40 V.

Example J2

In Example J2, in preparation of the positive electrode of Example J1, the positive electrode active material particle having samarium hydroxide adhered on the surface was heat-treated at 200° C. in air atmosphere for 5 hours. Except for the above, the same procedure as in Example J1 was used to fabricate a non-aqueous electrolyte secondary battery of Example J2.

Here, in the positive electrode active material of Example J2, most of samarium hydroxide adhered on the surface of the positive electrode active material particle were not changed to samarium oxyhydroxide and remained as samarium hydroxide.

Example J3

In Example J3, in preparation of the positive electrode of Example J1, as the heat-treatment, the positive electrode active material particle having samarium hydroxide adhered on the surface was only dried at 120° C. Except for the above, the same procedure as in Example J1 was used to fabricate a non-aqueous electrolyte secondary battery of Example J3.

Here, samarium hydroxide adhered on the surface of the positive electrode active material particle was not changed to samarium oxyhydroxide by drying at 120° C. as heat-treatment.

Example J4

In Example J4, in preparation of the positive electrode of Example J1, the amount of samarium nitrate 6-hydrate dissolved in 200 ml of pure water was changed to 5.35 g in adhering samarium hydroxide on the surface of positive electrode active material particle. Except for the above, the same procedure as in Example J1 was used to fabricate a non-aqueous electrolyte secondary battery of Example J4.

Here, in Example J4, a ratio of samarium element (Sm) in samarium compound adhering on the surface of the positive electrode active material particle containing lithium cobaltate against the positive electrode active material particle was 0.18 mass %. Further, most of samarium compound adhering on the surface of the positive electrode active material particle were samarium oxyhydroxide which was changed from samarium hydroxide.

Example J5

In Example J5, in preparation of the positive electrode of Example J1, the amount of samarium nitrate 6-hydrate dissolved in 200 ml of pure water was changed to 8.92 g in adhering samarium hydroxide on the surface of positive electrode active material particle. Except for the above, the same procedure as in Example J1 was used to fabricate a non-aqueous electrolyte secondary battery of Example J5.

Here, in Example J5, a ratio of samarium element (Sm) in samarium compound adhering on the surface of the positive electrode active material particle containing lithium cobaltate against the positive electrode active material particle was 0.30 mass %. Further, most of samarium compound adhering on the surface of the positive electrode active material particle were samarium oxyhydroxide which was changed from samarium hydroxide.

Example J6

In Example J6, in preparation of the positive electrode of Example J1, the amount of samarium nitrate 6-hydrate dissolved in 200 ml of pure water was changed to 10.2 g in adhering samarium hydroxide on the surface of positive electrode active material particle. Except for the above, the same procedure as in Example J1 was used to fabricate a non-aqueous electrolyte secondary battery of Example J6.

Here, in Example J6, a ratio of samarium element (Sm) in samarium compound adhering on the surface of the positive electrode active material particle containing lithium cobaltate against the positive electrode active material particle was 0.35 mass %. Further, most of samarium compound adhering on the surface of the positive electrode active material particle were samarium oxyhydroxide which was changed from samarium hydroxide.

Comparative Example j1

In Comparative Example j1, in preparation of the positive electrode of Example J1, samarium compound was not adhered on the surface of the positive electrode active material particle containing lithium cobaltate. Except for the above, the same procedure as in Example J1 was used to fabricate a non-aqueous electrolyte secondary battery of Comparative Example j1.

Comparative Example j2

In Comparative Example j2, in preparation of the positive electrode of Example J1, samarium oxide was mechanically adhered on the surface of the positive electrode active material particle containing lithium cobaltate as follows: A samarium oxide reagent was pulverized until a particle diameter of a primary particle became 400 nm to prepare samarium oxide. Then, 0.50 g of the foregoing samarium oxide was mixed with 500 g of positive electrode active material particle containing lithium cobaltate by using the mixing machine (the tradename NOBILTA made by HOSOKAWA MICRON CORPORATION). Thus, the positive electrode active material having samarium oxide mechanically adhered on the surface of the positive electrode active material particle containing lithium cobaltate was prepared. Except for the use of such a positive electrode active material prepared as above, the same procedure as in Example J1 was used to fabricate a non-aqueous electrolyte secondary battery of Comparative Example j2.

Here, in Comparative Example j2, a ratio of samarium element (Sm) in samarium oxide adhered on the surface of the positive electrode active material particle containing lithium cobaltate against the positive electrode active material particle was 0.086 mass %.

Then, the positive electrode active material of Comparative Example j2 was observed by SEM. The results of the observation showed that samarium oxide was flocculated and adhered on the concave parts of the positive electrode active material particle and was not adequately dispersed on the surface of the positive electrode active material particle.

Comparative Example j3

In Comparative Example j3, in preparation of the positive electrode active material of Comparative Example j2, the amount of samarium oxide having the primary particle diameter of 400 nm was changed to 5.0 g. Except for the use of such a positive electrode active material prepared as above, the same procedure as in Example J1 was used to fabricate a non-aqueous electrolyte secondary battery of Comparative Example j3.

Here, in Comparative Example j3, a ratio of samarium element (Sm) in samarium compound adhering on the surface of the positive electrode active material particle containing lithium cobaltate against the positive electrode active material particle was 0.86 mass %.

Then, the positive electrode active material of Comparative Example j3 was observed by SEM. The results of the observation showed that samarium oxide was flocculated and adhered on the concave parts of the positive electrode active material particle and was not dispersed on the surface of the positive electrode active material particle the same as the positive electrode active material of Comparative Example j2.

Comparative Example j4

In Comparative Example j4, in preparation of the positive electrode of Example J1, the positive electrode active material particle having samarium hydroxide adhered on the surface was heat-treated at 600° C. in air atmosphere for 5 hours. Except for the above, the same procedure as in Example J1 was used to fabricate a non-aqueous electrolyte secondary battery of Comparative Example j4.

Here, in the positive electrode active material of Comparative Example j4, samarium hydroxide adhered on the surface of the positive electrode active material particle was changed to samarium oxide, and one part of samarium was diffused inside of the positive electrode active material particle.

Next, each of the non-aqueous electrolyte secondary batteries of Examples J1 to J6 and Comparative Examples j1 to j4 was subjected to the initial charging/discharging the same as the non-aqueous electrolyte secondary battery of Example I1. Then, initial discharge capacity Qo of each non-aqueous electrolyte secondary battery was measured and initial charging/discharging efficiency of each non-aqueous electrolyte secondary battery was determined. The results are shown together with the results of non-aqueous electrolyte secondary batteries of Comparative Examples x11 to x13, y11 and z11 in Table 14 below.

After the initial charging/discharging, the same as the non-aqueous electrolyte secondary battery of Examples I1, each of the non-aqueous electrolyte secondary batteries of Examples J1 to J6 and Comparative Examples j1 to j4 was subjected to the high-temperature sequence charging examination. Next, as to each of the non-aqueous electrolyte secondary batteries, the increment in thickness thereof after high-temperature sequence charging examination against before high-temperature sequence charging examination was measured. The results are shown together with the results of non-aqueous electrolyte secondary batteries of Comparative Examples x11 to x13, y11 and z11 in Table 14 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. Then, 10 minutes pause was made. After that, percentage (%) of capacity retention after high-temperature sequence charging examination was obtained according to the equation (4). The results are shown together with the results of non-aqueous electrolyte secondary batteries of Comparative Examples x11 to x13, y11 and z11 in Table 14 below.

After 10 minutes pause, each of the non-aqueous electrolyte secondary batteries was charged at the constant current of 750 mA to 4.40 V and was further charged at the constant voltage of 4.40 V until the current became 37.5 mA under room temperature to measure charging capacity Qb. Then, 10 minutes pause was made. After that, each of the non-aqueous electrolyte secondary batteries after high-temperature sequence charging examination was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown together with the results of non-aqueous electrolyte secondary batteries of Comparative Examples x11 to x13, y11 and z11 in Table 14 below.

having the particle of samarium compound comprising samarium hydroxide and samarium oxyhydroxide dispersed and adhered on the surface of the positive electrode active material particle containing lithium cobaltate, after high-temperature sequence charging examination, the value of increment of thickness was low, and the percentage of capacity retention, the percentage of capacity recovery and the percentage of charging/discharging efficiency after high-temperature sequence charging examination were improved. On the other hand, as to each of the non-aqueous electrolyte secondary batteries of Comparative Examples j1 to j4 after high-temperature sequence charging examination, the value of increment of thickness was higher, and the percentage of capacity retention, the percentage of capacity recovery and the percentage of high charging/discharging efficiency were more decreased as compared with each of the non-aqueous electrolyte secondary batteries of Examples J1 to J6.

Further, the same as each of the non-aqueous electrolyte secondary batteries of Examples I1 to I6, as compared with each of the non-aqueous electrolyte secondary batteries of Comparative Examples x11 to x13, y11 and z11, in each of the non-aqueous electrolyte secondary batteries of Examples J1 to J6 after high-temperature sequence charging examination, the value of increment of thickness was higher, and the percentage of capacity retention, the percentage of capacity recovery and the percentage of charging/discharging efficiency were more improved.

Further, in the non-aqueous electrolyte secondary battery of Example J6 wherein the ratio of samarium element (Sm)

TABLE 14

| | Treatment of surface of positive electrode active material | | | Initial charging/ discharging efficiency (%) | Evaluation of characteristics after high-temperature sequence charging examination | | | |
|---|---|---|---|---|---|---|---|---|
| | Treatment method | Heat treatment temperature (° C.) | Element adhered and volume of adhesion (mass %) | | | Percentage (%) of capacity retention | Percentage (%) of capacity recovery | Percentage (%) of charging/ discharging efficiency | Increment in thickness (mm) |
| Ex. J1 | Deposition + Heat-treatment | 400 | Sm | 0.086 | 89.8 | 88.3 | 82.2 | 99.9 | 0.80 |
| Ex. J2 | Deposition + Heat-treatment | 200 | Sm | 0.086 | 89.3 | 88.5 | 82.1 | 99.9 | 0.84 |
| Ex. J3 | Deposition + Heat-treatment | 120 | Sm | 0.086 | 89.4 | 88.1 | 81.5 | 99.9 | 0.82 |
| Ex. J4 | Deposition + Heat-treatment | 400 | Sm | 0.18 | 89.7 | 87.8 | 82.1 | 99.8 | 0.81 |
| Ex. J5 | Deposition + Heat-treatment | 400 | Sm | 0.30 | 88.5 | 87.1 | 81.5 | 99.8 | 0.88 |
| Ex. J6 | Deposition + Heat-treatment | 400 | Sm | 0.35 | 88.1 | 86.1 | 81.3 | 99.8 | 0.89 |
| Comp. Ex. j1 | — | — | — | — | 89.5 | 56.2 | 56.5 | 88.9 | 3.25 |
| Comp. Ex. j2 | Mechanical treatment | — | Sm | 0.086 | 89.4 | 52.5 | 55.9 | 86.6 | 3.28 |
| Comp. Ex. j3 | Mechanical treatment | — | Sm | 0.86 | 89.2 | 67.2 | 66.5 | 86.8 | 3.25 |
| Comp. Ex. j4 | Deposition + Heat-treatment | 600 | Sm | 0.086 | 86.1 | 78.2 | 76.8 | 92.5 | 1.88 |
| Comp. Ex. x11 | Deposition + Heat-treatment | 120 | Al | 0.086 | 88.3 | 84.3 | 74.8 | 98.5 | 2.66 |
| Comp. Ex. x12 | Deposition + Heat-treatment | 400 | Al | 0.086 | 88.9 | 84.5 | 75.2 | 98.9 | 2.72 |
| Comp. Ex. x13 | Deposition + Heat-treatment | 120 | Al | 0.20 | 86.1 | 85.3 | 76.6 | 98.9 | 1.98 |
| Comp. Ex. y11 | Deposition + Heat-treatment | 400 | Zn | 0.086 | 88.9 | 81.0 | 71.7 | 90.3 | 3.44 |
| Comp. Ex. z11 | Deposition + Heat-treatment | 120 | Ce | 0.086 | 87.0 | 75.2 | 64.3 | 90.3 | 2.01 |

As is apparent from Table 14 the above, in each of the non-aqueous electrolyte secondary batteries of Examples J1 to J6 which utilized the positive electrode active material in samarium compound adhering on the surface of the positive electrode active material particle containing lithium cobaltate against the positive electrode active material particle was 0.35 mass % after high-temperature sequence charging examination, the percentage of capacity retention, the percentage of capacity recovery and the percentage of charging/discharging efficiency were more decreased, and the value of increment of thickness was higher, as compared with each of the non-aqueous electrolyte secondary batteries of Examples J1 to J5 wherein the ratio of samarium element (Sm) in samarium compound was less than 0.35 mass %. Therefore, it is preferable that the ratio of samarium element (Sm) in samarium compound adhering on the surface of the positive electrode active material particle containing lithium cobaltate against the positive electrode active material particle be less than 0.35 mass %.

Further, in order to restrict decrease of percentage of initial charging/discharging efficiency, it is preferable that the ratio of samarium element be less than 0.30 mass %. This is because charging/discharging reaction is hindered in the case where the amount of samarium compound adhering on the surface of the positive electrode active material particle is excessive.

Example K1

A positive electrode of Example K1 was prepared in the following manner. Lithium cobaltate $LiCoO_2$ wherein each of Mg and Al formed solid solution in a concentration of 0.5 mol % and Zr formed solid solution in a concentration of 0.1 mol % was used as positive electrode active material particle. Then, 1000 g of the positive electrode active material particle was poured into 3 liter of pure water and stirred, and an aqueous solution of praseodymium nitrate dissolving 2.66 g of praseodymium nitrate 6-hydrate in 200 ml of pure water was added thereto. After that, 10 mass % of an aqueous solution of sodium hydroxide was appropriately added so that the pH of the resultant solution was 9, and praseodymium hydroxide was adhered on the surface of the positive electrode active material particle.

Then, filtering suction was conducted to collect the treated object by filtration. After being rinsed, the treated object was dried at 120° C. Thus was prepared the positive electrode active material particle having praseodymium compound comprising praseodymium hydroxide adhered on the surface. Here, praseodymium hydroxide adhered on the surface of the positive electrode active material particle was not changed to praseodymium oxide by drying at 120° C. as heat-treatment.

In the above-mentioned positive electrode active material, a ratio of praseodymium element (Pr) in praseodymium compound adhering on the surface of the positive electrode active material particle containing lithium cobaltate against the positive electrode active material particle was 0.086 mass %.

Then, the positive electrode active material of Example K1 was observed by SEM. The results of the observation showed that a particle diameter of most of the particle of praseodymium compound which were adhered on the surface of the positive electrode active material particle was 100 nm or less. In addition, the particle of praseodymium compound was uniformly dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm$^3$.

Except for the use of such a positive electrode, the same procedure as in Example I1 was used to fabricate a non-aqueous electrolyte secondary battery of Example K1 of flat type having a design capacity of 780 mAh in a case of charging to 4.40 V.

Example K2

In Example K2, in preparation of the positive electrode of Example K1, the amount of praseodymium nitrate 6-hydrate dissolved in 200 ml of pure water was changed to 5.62 g in adhering praseodymium hydroxide on the surface of positive electrode active material particle. Except for the above, the same procedure as in Example K1 was used to fabricate a non-aqueous electrolyte secondary battery of Example K2.

Here, in Example K2, a ratio of praseodymium element (Pr) in praseodymium compound adhering on the surface of the positive electrode active material particle containing lithium cobaltate against the positive electrode active material particle was 0.18 mass %.

Example K3

In Example K3, in preparation of the positive electrode of Example K1, the amount of praseodymium nitrate 6-hydrate dissolved in 200 ml of pure water was changed to 9.20 g in adhering praseodymium hydroxide on the surface of positive electrode active material particle. Except for the above, the same procedure as in Example K1 was used to fabricate a non-aqueous electrolyte secondary battery of Example K3.

Here, in Example K3, a ratio of praseodymium element (Pr) in praseodymium compound adhering on the surface of the positive electrode active material particle containing lithium cobaltate against the positive electrode active material particle was 0.30 mass %.

Example K4

In Example K4, in preparation of the positive electrode of Example K1, the amount of praseodymium nitrate 6-hydrate dissolved in 200 ml of pure water was changed to 10.9 g in adhering praseodymium hydroxide on the surface of positive electrode active material particle. Except for the above, the same procedure as in Example K1 was used to fabricate a non-aqueous electrolyte secondary battery of Example K4.

Here, in Example K4, a ratio of praseodymium element (Pr) in praseodymium compound adhering on the surface of the positive electrode active material particle containing lithium cobaltate against the positive electrode active material particle was 0.35 mass %.

Example K5

In Example K5, in preparation of the positive electrode of Example K1, the positive electrode active material particle having praseodymium hydroxide adhered on the surface was heat-treated at 250° C. for 5 hours after drying at 120° C.

Except for the above, the same procedure as in Example K1 was used to fabricate a non-aqueous electrolyte secondary battery of Example K5.

Here, as in Example 5, even in the case where the positive electrode active material particle having praseodymium hydroxide adhered on the surface was heat-treated at 250° C. after drying at 120° C., praseodymium hydroxide was not changed to praseodymium oxide and remained as praseodymium hydroxide. In Example K5, a ratio of praseodymium element (Pr) in praseodymium compound comprising praseodymium hydroxide adhered on the surface of the positive electrode active material particle containing lithium cobaltate against the positive electrode active material particle was 0.086 mass %.

Comparative Example k1

In Comparative Example k1, in preparation of the positive electrode of Example K1, praseodymium compound was not adhered on the surface of the positive electrode active material particle containing lithium cobaltate. Except for the above, the same procedure as in Example K1 was used to fabricate a non-aqueous electrolyte secondary battery of Comparative Example k1.

Comparative Example k2

In Comparative Example k2, in preparation of the positive electrode of Example K1, praseodymium oxide was mechanically adhered on the surface of the positive electrode active material particle containing lithium cobaltate as follows: A praseodymium oxide reagent was pulverized until a particle diameter of a primary particle became 400 nm to prepare praseodymium oxide. Then, 0.52 g of the foregoing praseodymium oxide was mixed with 500 g of positive electrode active material particle containing lithium cobaltate by using the mixing machine (the tradename NOBILTA made by HOSOKAWA MICRON CORPORATION). Thus, the positive electrode active material having praseodymium oxide mechanically adhered on the surface of the positive electrode active material particle containing lithium cobaltate was prepared. Except for the use of such a positive electrode active material prepared as above, the same procedure as in Example K1 was used to fabricate a non-aqueous electrolyte secondary battery of Comparative Example k2.

Here, in Comparative Example k2, a ratio of praseodymium element in praseodymium oxide adhered on the surface of the positive electrode active material particle containing lithium cobaltate against the positive electrode active material particle was 0.086 mass %.

Then, the positive electrode active material of Comparative Example k2 was observed by SEM. The results of the observation showed that praseodymium oxide was flocculated and adhered on the concave parts of the positive electrode active material particle and was not adequately dispersed on the surface of the positive electrode active material particle.

Comparative Example k3

In Comparative Example k3, in preparation of the positive electrode active material of Comparative Example k2, the amount of praseodymium oxide having the primary particle diameter of 400 nm was changed to 5.20 g. Except for the use of such a positive electrode active material prepared as above, the same procedure as in Example K1 was used to fabricate a non-aqueous electrolyte secondary battery of Comparative Example k3.

Here, in Comparative Example k3, a ratio of praseodymium element in praseodymium compound adhering on the surface of the positive electrode active material particle containing lithium cobaltate against the positive electrode active material particle was 0.86 mass %.

Then, the positive electrode active material of Comparative Example k3 was observed by SEM. The results of the observation showed that praseodymium oxide was flocculated and adhered on the concave parts of the positive electrode active material particle and was not adequately dispersed on the surface of the positive electrode active material particle the same as the positive electrode active material of Comparative Example k2.

Comparative Example k4

In Comparative Example k4, in preparation of the positive electrode of Example K1, the positive electrode active material particle having praseodymium hydroxide adhered on the surface was heat-treated at 600° C. for 5 hours after drying at 120° C. Except for the above, the same procedure as in Example K1 was used to fabricate a non-aqueous electrolyte secondary battery of Comparative Example k4.

Here, as in the positive electrode active material of Comparative Example k4, in the case where the positive electrode active material particle having praseodymium hydroxide adhered on the surface was heat-treated at 600° C. after drying at 120° C., praseodymium hydroxide was changed to praseodymium oxide and one part of praseodymium was diffused inside of the positive electrode active material particle. A ratio of praseodymium element (Pr) in praseodymium compound comprising praseodymium oxide adhered on the surface of the positive electrode active material particle containing lithium cobaltate against the positive electrode active material particle was 0.086 mass %.

Next, each of the non-aqueous electrolyte secondary batteries of Examples K1 to K5 and Comparative Examples k1 to k4 was subjected to the initial charging/discharging the same as the non-aqueous electrolyte secondary battery of Example I1. Then, initial discharge capacity Qo of each non-aqueous electrolyte secondary battery was measured and initial charging/discharging efficiency of each non-aqueous electrolyte secondary battery was determined. The results are shown together with the results of non-aqueous electrolyte secondary batteries of Comparative Examples x11 to x13, y11 and z11 in Table 15 below.

After the initial charging/discharging, the same as the non-aqueous electrolyte secondary battery of Examples I1, each of the non-aqueous electrolyte secondary batteries of Examples K1 to K5 and Comparative Examples k1 to k4 was subjected to the high-temperature sequence charging examination. Next, as to each of the non-aqueous electrolyte secondary batteries, the increment in thickness thereof after high-temperature sequence charging examination against before high-temperature sequence charging examination was measured. The results are shown together with the results of non-aqueous electrolyte secondary batteries of Comparative Examples x11 to x13, y11 and z11 in Table 15 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. Then, 10 minutes pause was made. After that, percentage (%) of capacity retention after high-temperature sequence charging examination was obtained according to the equation (4). The results are shown together with the results of non-aqueous electrolyte secondary batteries of Comparative Examples x11 to x13, y11 and z11 in Table 15 below.

After 10 minutes pause, each of the non-aqueous electrolyte secondary batteries was charged at the constant current of 750 mA to 4.40 V and was further charged at the constant voltage of 4.40 V until the current became 37.5 mA under room temperature to measure charging capacity Qb. Then, 10 minutes pause was made. After that, each of the non-aqueous electrolyte secondary batteries was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown together with the results of non-aqueous electrolyte secondary batteries of Comparative Examples x11 to x13, y11 and z11 in Table 15 below.

charging/discharging efficiency were improved. On the other hand, as to each of the non-aqueous electrolyte secondary batteries of Comparative Examples k1 to k4 after high-temperature sequence charging examination, the value of increment of thickness was higher, and the percentage of capacity retention, the percentage of capacity recovery and the percentage of high charging/discharging efficiency were more decreased as compared with each of the non-aqueous electrolyte secondary batteries of Examples K1 to K5.

Further, the same as each of the non-aqueous electrolyte secondary batteries of Examples I1 to I6, as compared with each of the non-aqueous electrolyte secondary batteries of Comparative Examples x11 to x13, y11 and z11, in each of the non-aqueous electrolyte secondary batteries of Examples K1 to K5 after high-temperature sequence charging examination, the value of increment of thickness was lower, and the percentage of capacity retention, the percentage of capacity recovery and the percentage of charging/discharging efficiency were more improved.

Further, in the non-aqueous electrolyte secondary battery of Example K4 wherein the ratio of praseodymium element in praseodymium compound adhering on the surface of the positive electrode active material particle containing lithium cobaltate against the positive electrode active material par-

TABLE 15

| | Treatment of surface of positive electrode active material | | | Initial | Evaluation of characteristics after high-temperature sequence charging examination | | | |
|---|---|---|---|---|---|---|---|---|
| | Treatment method | Heat treatment temperature (° C.) | Element adhered and volume of adhesion (mass %) | | charging/ discharging efficiency (%) | Percentage (%) of capacity retention | Percentage (%) of capacity recovery | Percentage (%) of charging/ discharging efficiency | Increment in thickness (mm) |
| Ex. K1 | Deposition + Heat-treatment | 120 | Pr | 0.086 | 89.5 | 88.5 | 82.6 | 100 | 0.83 |
| Ex. K2 | Deposition + Heat-treatment | 120 | Pr | 0.18 | 89.2 | 88.3 | 82.4 | 99.9 | 0.85 |
| Ex. K3 | Deposition + Heat-treatment | 120 | Pr | 0.30 | 88.6 | 87.2 | 81.3 | 99.8 | 0.85 |
| Ex. K4 | Deposition + Heat-treatment | 120 | Pr | 0.35 | 87.9 | 86.3 | 81.1 | 99.8 | 0.91 |
| Ex. K5 | Deposition + Heat-treatment | 250 | Pr | 0.086 | 89.5 | 88.3 | 82.1 | 99.5 | 0.84 |
| Comp. Ex. k1 | — | — | — | — | 89.5 | 56.2 | 56.5 | 88.9 | 3.25 |
| Comp. Ex. k2 | Mechanical treatment | — | Pr | 0.086 | 88.4 | 54.5 | 54.3 | 86.3 | 3.52 |
| Comp. Ex. k3 | Mechanical treatment | — | Pr | 0.86 | 86.2 | 63.5 | 65.6 | 85.2 | 3.49 |
| Comp. Ex. k4 | Deposition + Heat-treatment | 600 | Pr | 0.086 | 86.1 | 77.7 | 75.9 | 92.5 | 1.99 |
| Comp. Ex. x11 | Deposition + Heat-treatment | 120 | Al | 0.086 | 88.3 | 84.3 | 74.8 | 98.5 | 2.66 |
| Comp. Ex. x12 | Deposition + Heat-treatment | 400 | Al | 0.086 | 88.9 | 84.5 | 75.2 | 98.9 | 2.72 |
| Comp. Ex. x13 | Deposition + Heat-treatment | 120 | Al | 0.20 | 86.1 | 85.3 | 76.6 | 98.9 | 1.98 |
| Comp. Ex. y11 | Deposition + Heat-treatment | 400 | Zn | 0.086 | 88.9 | 81.0 | 71.7 | 90.3 | 3.44 |
| Comp. Ex. z11 | Deposition + Heat-treatment | 120 | Ce | 0.086 | 87.0 | 75.2 | 64.3 | 90.3 | 2.01 |

As is apparent from Table 15 the above, in each of the non-aqueous electrolyte secondary batteries of Examples K1 to K5 which utilized the positive electrode active material having the particle of praseodymium compound comprising praseodymium hydroxide dispersed and adhered on the surface of the positive electrode active material particle containing lithium cobaltate, after high-temperature sequence charging examination, the value of increment of thickness was low, and the percentage of capacity retention, the percentage of capacity recovery and the percentage of ticle was 0.35 mass %, after high-temperature sequence charging examination, the percentage of capacity retention, and the percentage of capacity recovery were more decreased, and the value of increment of thickness was higher, as compared with each of the non-aqueous electrolyte secondary batteries of Examples K1 to K3 and K5 wherein the ratio of praseodymium element in praseodymium compound was less than 0.35 mass %. Accordingly, it is preferable that the ratio of praseodymium element in praseodymium compound adhering on the surface of the positive electrode active material particle containing lithium cobaltate against the positive electrode active material particle be less than 0.35 mass %.

Further, in order to restrict decrease of percentage of initial charging/discharging efficiency, it is more preferable that the ratio of praseodymium element be less than 0.30 mass %. This is because charging/discharging reaction is hindered in the case where the amount of praseodymium compound adhering on the surface of the positive electrode active material particle is excessive.

Example M1

A positive electrode of Example M1 was prepared in the following manner. Lithium cobaltate $LiCoO_2$ wherein each of Mg and Al formed solid solution in a concentration of 0.5 mol % and Zr formed solid solution in a concentration of 0.1 mol % was used as positive electrode active material particle. Then, 1000 g of the positive electrode active material particle was poured into 3 liter of pure water and stirred, and an aqueous solution of europium nitrate dissolving 2.53 g of europium nitrate 6-hydrate in 200 ml of pure water was added thereto. After that, 10 mass % of an aqueous solution of sodium hydroxide was appropriately added so that the pH of the resultant solution was 9, and europium hydroxide was adhered on the surface of the positive electrode active material particle. Then, filtering suction was conducted on the positive electrode active material particle to collect the treated object by filtration, and the treated object was dried at 120° C. Thus was prepared the positive electrode active material particle having europium hydroxide adhered on the surface.

Next, the foregoing positive electrode active material particle was heat-treated at 400° C. in air atmosphere for 5 hours to prepare a positive electrode active material having a particle of europium compound adhered on the surface.

In the above-mentioned positive electrode active material, a ratio of europium element (Eu) in europium compound adhering on the surface of the positive electrode active material particle containing lithium cobaltate against the positive electrode active material particle was 0.086 mass %. Further, most of europium compound adhering on the surface of the positive electrode active material particle were europium oxyhydroxide which was changed from europium hydroxide.

Then, the positive electrode active material of Example M1 was observed by SEM. The results of the observation showed that a particle diameter of most of the particle of europium compound which were adhered on the surface of the positive electrode active material particle was 100 nm or less. In addition, the particle of europium compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm$^3$.

Except for the use of such a positive electrode, the same procedure as in Example I1 was used to fabricate a non-aqueous electrolyte secondary battery of Example M1 of flat type having a design capacity of 780 mAh in a case of charging to 4.40 V.

Example M2

In Example M2, in preparation of the positive electrode of Example M1, the positive electrode active material particle having europium hydroxide adhered on the surface was heat-treated at 200° C. in air atmosphere for 5 hours. Except for the above, the same procedure as in Example M1 was used to fabricate a non-aqueous electrolyte secondary battery of Example M2.

Here, in the positive electrode active material of Example M2, most of europium hydroxide adhered on the surface of the positive electrode active material particle were not changed to europium oxyhydroxide and remained as europium hydroxide.

Example M3

In Example M3, in preparation of the positive electrode of Example M1, as the heat-treatment, the positive electrode active material particle having europium hydroxide adhered on the surface was only dried at 120° C. Except for the above, the same procedure as in Example M1 was used to fabricate a non-aqueous electrolyte secondary battery of Example M3.

Here, europium hydroxide adhered on the surface of the positive electrode active material particle was not changed to europium oxyhydroxide by drying 120° C. as heat-treatment.

Example M4

In Example M4, in preparation of the positive electrode of Example M1, the amount of europium nitrate 6-hydrate dissolved in 200 ml of pure water was changed to 5.30 g in adhering europium hydroxide on the surface of positive electrode active material particle. Except for the above, the same procedure as in Example M1 was used to fabricate a non-aqueous electrolyte secondary battery of Example M4.

Here, in Example M4, a ratio of europium element (Eu) in europium compound adhering on the surface of the positive electrode active material particle containing lithium cobaltate against the positive electrode active material particle was 0.18 mass %. Further, most of europium compound adhering on the surface of the positive electrode active material particle were europium oxyhydroxide which was changed from europium hydroxide.

Example M5

In Example M5, in preparation of the positive electrode of Example M1, the amount of europium nitrate 6-hydrate dissolved in 200 ml of pure water was changed to 8.87 g in adhering europium hydroxide on the surface of positive electrode active material particle. Except for the above, the same procedure as in Example M1 was used to fabricate a non-aqueous electrolyte secondary battery of Example M5.

Here, in Example M5, a ratio of europium element (Eu) in europium compound adhering on the surface of the positive electrode active material particle containing lithium cobaltate against the positive electrode active material particle was 0.30 mass %. Further, most of europium compound adhering on the surface of the positive electrode active material particle were europium oxyhydroxide which was changed from europium hydroxide.

Example M6

In Example M6, in preparation of the positive electrode of Example M1, the amount of europium nitrate 6-hydrate dissolved in 200 ml of pure water was changed to 10.3 g in adhering europium hydroxide on the surface of positive electrode active material particle. Except for the above, the same procedure as in Example M1 was used to fabricate a non-aqueous electrolyte secondary battery of Example M6.

Here, in Example M6, a ratio of europium element (Eu) in europium compound adhering on the surface of the positive electrode active material particle containing lithium cobaltate against the positive electrode active material particle was 0.35 mass %. Further, most of europium compound adhering on the surface of the positive electrode active material particle were europium oxyhydroxide which was changed from europium hydroxide.

Comparative Example m1

In Comparative Example m1, in preparation of the positive electrode of Example M1, europium compound was not adhered on the surface of the positive electrode active material particle containing lithium cobaltate. Except for the above, the same procedure as in Example M1 was used to fabricate a non-aqueous electrolyte secondary battery of Comparative Example m1.

Comparative Example m2

In Comparative Example m2, in preparation of the positive electrode of Example M1, europium oxide was mechanically adhered on the surface of the positive electrode active material particle containing lithium cobaltate as follows: An europium oxide reagent was pulverized until a particle diameter of a primary particle became 400 nm to prepare europium oxide. Then, 0.50 g of the foregoing europium oxide was mixed with 500 g of positive electrode active material particle containing lithium cobaltate by using the mixing machine (the tradename NOBILTA made by HOSOKAWA MICRON CORPORATION). Thus, the positive electrode active material having europium oxide mechanically adhered on the surface of the positive electrode active material particle containing lithium cobaltate was prepared. Except for the use of such a positive electrode active material prepared as above, the same procedure as in Example M1 was used to fabricate a non-aqueous electrolyte secondary battery of Comparative Example m2.

Here, in Comparative Example m2, a ratio of europium element (Eu) in europium oxide adhered on the surface of the positive electrode active material particle containing lithium cobaltate against the positive electrode active material particle was 0.086 mass %.

Then, the positive electrode active material of Comparative Example m2 was observed by SEM. The results of the observation showed that europium oxide was flocculated and adhered on the concave parts of the positive electrode active material particle and was not adequately dispersed on the surface of the positive electrode active material particle.

Comparative Example m3

In Comparative Example m3, in preparation of the positive electrode active material of Comparative Example m2, the amount of europium oxide having the primary particle diameter of 400 nm was changed to 5.0 g. Except for the use of such a positive electrode active material prepared as above, the same procedure as in Example M1 was used to fabricate a non-aqueous electrolyte secondary battery of Comparative Example m3.

Here, in Comparative Example m3, a ratio of europium element (Eu) in europium compound adhering on the surface of the positive electrode active material particle containing lithium cobaltate against the positive electrode active material particle was 0.86 mass %.

Then, the positive electrode active material of Comparative Example m3 was observed by SEM. The results of the observation showed that europium oxide was flocculated and adhered on the concave parts of the positive electrode active material particle and was not dispersed on the surface of the positive electrode active material particle the same as the positive electrode active material of Comparative Example m2.

Comparative Example m4

In Comparative Example m4, in preparation of the positive electrode of Example M1, the positive electrode active material particle having europium hydroxide adhered on the surface was heat-treated at 600° C. in air atmosphere for 5 hours. Except for the above, the same procedure as in Example M1 was used to fabricate a non-aqueous electrolyte secondary battery of Comparative Example m4.

Here, in the positive electrode active material of Comparative Example m4, europium hydroxide adhered on the surface of the positive electrode active material particle was changed to europium oxide, and one part of europium was diffused inside of the positive electrode active material particle.

Next, each of the non-aqueous electrolyte secondary batteries of Examples M1 to M6 and Comparative Examples m1 to m4 was subjected to the initial charging/discharging the same as the non-aqueous electrolyte secondary battery of Example I1. Then, initial discharge capacity Qo of each non-aqueous electrolyte secondary battery was measured and initial charging/discharging efficiency of each non-aqueous electrolyte secondary battery was determined. The results are shown together with the results of non-aqueous electrolyte secondary batteries of Comparative Examples x11 to x13, y11 and z11 in Table 16 below.

After the initial charging/discharging, the same as the non-aqueous electrolyte secondary battery of Examples I1, each of the non-aqueous electrolyte secondary batteries of Examples M1 to M6 and Comparative Examples m1 to m4 was subjected to the high-temperature sequence charging examination. Next, as to each of the non-aqueous electrolyte secondary batteries, the increment in thickness thereof after high-temperature sequence charging examination against before high-temperature sequence charging examination was measured. The results are shown together with the results of non-aqueous electrolyte secondary batteries of Comparative Examples x11 to x13, y11 and z11 in Table 16 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. Then, 10 minutes pause was made. After that, percentage (%) of capacity retention after high-temperature sequence charging examination was obtained according to the equation (4). The results are shown together with the results of non-aqueous electrolyte secondary batteries of Comparative Examples x11 to x13, y11 and z11 in Table 16 below.

After 10 minutes pause, each of the non-aqueous electrolyte secondary batteries was charged at the constant current of 750 mA to 4.40 V and was further charged at the constant voltage of 4.40 V until the current became 37.5 mA under room temperature to measure charging capacity Qb. Then, 10 minutes pause was made. After that, each of the non-aqueous electrolyte secondary batteries was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown together with the results of non-aqueous electrolyte secondary batteries of Comparative Examples x11 to x13, y11 and z11 in Table 16 below.

electrolyte secondary batteries of Comparative Examples m1 to m4, after high-temperature sequence charging examination, the value of increment of thickness was higher, and the percentage of capacity retention, the percentage of capacity recovery and the percentage of high charging/discharging efficiency were more decreased as compared with each of the non-aqueous electrolyte secondary batteries of Examples M1 to M6.

Further, the same as each of the non-aqueous electrolyte secondary batteries of Examples I1 to I6, as compared with each of the non-aqueous electrolyte secondary batteries of Comparative Examples x11 to x13, y11 and z11, in each of the non-aqueous electrolyte secondary batteries of Examples M1 to M6, after high-temperature sequence charging examination, the value of increment of thickness was lower, and the percentage of capacity retention, the percentage of capacity recovery and the percentage of charging/discharging efficiency were more improved.

Further, in the non-aqueous electrolyte secondary battery of Example M6 wherein the ratio of europium element in europium compound adhering on the surface of the positive

TABLE 16

| | Treatment of surface of positive electrode active material | | | Initial | Evaluation of characteristics after high-temperature sequence charging examination | | | |
|---|---|---|---|---|---|---|---|---|
| | Treatment method | Heat treatment temperature (° C.) | Element adhered and volume of adhesion (mass %) | | charging/ discharging efficiency (%) | Percentage (%) of capacity retention | Percentage (%) of capacity recovery | Percentage (%) of charging/ discharging efficiency | Increment in thickness (mm) |
| Ex. M1 | Deposition + Heat-treatment | 400 | Eu | 0.086 | 89.1 | 88.0 | 81.9 | 100.2 | 0.78 |
| Ex. M2 | Deposition + Heat-treatment | 200 | Eu | 0.086 | 89.0 | 88.1 | 82.0 | 100.2 | 0.77 |
| Ex. M3 | Deposition + Heat-treatment | 120 | Eu | 0.086 | 89.0 | 88.0 | 81.9 | 100.1 | 0.77 |
| Ex. M4 | Deposition + Heat-treatment | 400 | Eu | 0.18 | 89.0 | 87.5 | 82.0 | 99.9 | 0.81 |
| Ex. M5 | Deposition + Heat-treatment | 400 | Eu | 0.30 | 88.5 | 87.3 | 81.8 | 99.8 | 0.83 |
| Ex. M6 | Deposition + Heat-treatment | 400 | Eu | 0.35 | 87.8 | 86.8 | 81.0 | 99.6 | 0.85 |
| Comp. Ex. m1 | — | — | — | — | 89.5 | 56.2 | 56.5 | 88.9 | 3.25 |
| Comp. Ex. m2 | Mechanical treatment | — | Eu | 0.086 | 88.4 | 54.5 | 54.3 | 86.3 | 3.52 |
| Comp. Ex. m3 | Mechanical treatment | — | Eu | 0.86 | 87.1 | 63.5 | 65.6 | 85.2 | 3.49 |
| Comp. Ex. m4 | Deposition + Heat-treatment | 600 | Eu | 0.086 | 85.9 | 76.8 | 76.2 | 93.2 | 1.92 |
| Comp. Ex. x11 | Deposition + Heat-treatment | 120 | Al | 0.086 | 88.3 | 84.3 | 74.8 | 98.5 | 2.66 |
| Comp. Ex. x12 | Deposition + Heat-treatment | 400 | Al | 0.086 | 88.9 | 84.5 | 75.2 | 98.9 | 2.72 |
| Comp. Ex. x13 | Deposition + Heat-treatment | 120 | Al | 0.20 | 86.1 | 85.3 | 76.6 | 98.9 | 1.98 |
| Comp. Ex. y11 | Deposition + Heat-treatment | 400 | Zn | 0.086 | 88.9 | 81.0 | 71.7 | 90.3 | 3.44 |
| Comp. Ex. z11 | Deposition + Heat-treatment | 120 | Ce | 0.086 | 87.0 | 75.2 | 64.3 | 90.3 | 2.01 |

As is apparent from Table 16 the above, in each of the non-aqueous electrolyte secondary batteries of Examples M1 to M6 which utilized the positive electrode active material having the particle of europium compound comprising europium hydroxide and europium oxyhydroxide dispersed and adhered on the surface of the positive electrode active material particle containing lithium cobaltate, after high-temperature sequence charging examination, the value of increment of thickness was low, and the percentage of capacity retention, the percentage of capacity recovery and the percentage of charging/discharging efficiency were improved. On the other hand, as to each of the non-aqueous electrode active material particle containing lithium cobaltate against the positive electrode active material particle was 0.35 mass %, the percentage of capacity retention, after high-temperature sequence charging examination, the percentage of capacity recovery and the percentage of charging/discharging efficiency were more decreased, and the value of increment of thickness was higher, as compared with each of the non-aqueous electrolyte secondary batteries of Examples M1 to M5 wherein the ratio of europium element in europium compound was less than 0.35 mass %. Therefore, it is preferable that the ratio of europium element in europium compound adhering on the surface of the positive electrode active material particle containing lithium cobaltate against the positive electrode active material particle be less than 0.35 mass %.

Further, in order to restrict decrease of percentage of initial charging/discharging efficiency, it is preferable that the ratio of europium element be less than 0.30 mass %. This is because charging/discharging reaction is hindered in the case where the amount of europium compound adhering on the surface of the positive electrode active material particle is excessive.

Example N1

A positive electrode of Example N1 was prepared in the following manner. Lithium cobaltate $LiCoO_2$ wherein each of Mg and Al formed solid solution in a concentration of 0.5 mol % and Zr formed solid solution in a concentration of 0.1 mol % was used as positive electrode active material particle. Then, 1000 g of the positive electrode active material particle was poured into 3 liter of pure water and stirred, and an aqueous solution of gadolinium nitrate dissolving 2.38 g of gadolinium nitrate 5-hydrate in 200 ml of pure water was added thereto. After that, 10 mass % of an aqueous solution of sodium hydroxide was appropriately added so that the pH of the resultant solution was 9, and gadolinium hydroxide was adhered on the surface of the positive electrode active material particle. Then, filtering suction was conducted on the positive electrode active material particle to collect the treated object by filtration, and the treated object was dried at 120° C. Thus was prepared the positive electrode active material particle having gadolinium hydroxide adhered on the surface.

Next, the foregoing positive electrode active material particle was heat-treated at 400° C. in air atmosphere for 5 hours to prepare a positive electrode active material having a particle of gadolinium compound adhered on the surface.

In the above-mentioned positive electrode active material, a ratio of gadolinium element (Gd) in gadolinium compound adhering on the surface of the positive electrode active material particle containing lithium cobaltate against the positive electrode active material particle was 0.086 mass %. Further, most of gadolinium compound adhering on the surface of the positive electrode active material particle were gadolinium oxyhydroxide which was changed from gadolinium hydroxide.

Then, the positive electrode active material of Example N1 was observed by SEM. The results of the observation showed that a particle diameter of most of the particle of gadolinium compound which were adhered on the surface of the positive electrode active material particle was 100 nm or less. In addition, the particle of gadolinium compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm³.

Except for the use of such a positive electrode, the same procedure as in Example I1 was used to fabricate a non-aqueous electrolyte secondary battery of Example N1 of flat type having a design capacity of 780 mAh in a case of charging to 4.40 V.

Example N2

In Example N2, in preparation of the positive electrode of Example N1, the positive electrode active material particle having gadolinium hydroxide adhered on the surface was heat-treated at 200° C. in air atmosphere for 5 hours. Except for the above, the same procedure as in Example N1 was used to fabricate a non-aqueous electrolyte secondary battery of Example N2.

Here, in the positive electrode active material of Example N2, most of gadolinium hydroxide adhered on the surface of the positive electrode active material particle were not changed to gadolinium oxyhydroxide and remained as gadolinium hydroxide.

Example N3

In Example N3, in preparation of the positive electrode of Example N1, as the heat-treatment, the positive electrode active material particle having gadolinium hydroxide adhered on the surface was only dried at 120° C. Except for the above, the same procedure as in Example N1 was used to fabricate a non-aqueous electrolyte secondary battery of Example N3.

Here, gadolinium hydroxide adhered on the surface of the positive electrode active material particle was not changed to gadolinium oxyhydroxide by drying at 120° C. as heat-treatment.

Example N4

In Example N4, in preparation of the positive electrode of Example N1, the amount of gadolinium nitrate 5-hydrate dissolved in 200 ml of pure water was changed to 4.97 g in adhering gadolinium hydroxide on the surface of positive electrode active material particle. Except for the above, the same procedure as in Example N1 was used to fabricate a non-aqueous electrolyte secondary battery of Example N4.

Here, in Example N4, a ratio of gadolinium element (Gd) in gadolinium compound adhering on the surface of the positive electrode active material particle containing lithium cobaltate against the positive electrode active material particle was 0.18 mass %. Further, most of gadolinium compound adhering on the surface of the positive electrode active material particle were gadolinium oxyhydroxide which was changed from gadolinium hydroxide.

Example N5

In Example N5, in preparation of the positive electrode of Example N1, the amount of gadolinium nitrate 5-hydrate dissolved in 200 ml of pure water was changed to 8.25 g in adhering gadolinium hydroxide on the surface of positive electrode active material particle. Except for the above, the same procedure as in Example N1 was used to fabricate a non-aqueous electrolyte secondary battery of Example N5.

Here, in Example N5, a ratio of gadolinium element (Gd) in gadolinium compound adhering on the surface of the positive electrode active material particle containing lithium cobaltate against the positive electrode active material particle was 0.30 mass %. Further, most of gadolinium compound adhering on the surface of the positive electrode active material particle were gadolinium oxyhydroxide which was changed from gadolinium hydroxide.

Example N6

In Example N6, in preparation of the positive electrode of Example N1, the amount of gadolinium nitrate 5-hydrate dissolved in 200 ml of pure water was changed to 9.63 g in adhering gadolinium hydroxide on the surface of positive electrode active material particle. Except for the above, the same procedure as in Example N1 was used to fabricate a non-aqueous electrolyte secondary battery of Example N6.

Here, in Example N6, a ratio of gadolinium element (Gd) in gadolinium compound adhering on the surface of the positive electrode active material particle containing lithium cobaltate against the positive electrode active material particle was 0.35 mass %. Further, most of gadolinium compound adhering on the surface of the positive electrode active material particle were gadolinium oxyhydroxide which was changed from gadolinium hydroxide.

Comparative Example n1

In Comparative Example n1, in preparation of the positive electrode of Example N1, gadolinium compound was not adhered on the surface of the positive electrode active material particle containing lithium cobaltate. Except for the above, the same procedure as in Example N1 was used to fabricate a non-aqueous electrolyte secondary battery of Comparative Example n1.

Comparative Example n2

In Comparative Example n2, in preparation of the positive electrode of Example N1, gadolinium oxide was mechanically adhered on the surface of the positive electrode active material particle containing lithium cobaltate as follows: A gadolinium oxide reagent was pulverized until a particle diameter of a primary particle became 400 nm to prepare gadolinium oxide. Then, 0.50 g of the foregoing gadolinium oxide was mixed with 500 g of positive electrode active material particle containing lithium cobaltate by using the mixing machine (the tradename NOBILTA made by HOSOKAWA MICRON CORPORATION). Thus, the positive electrode active material having gadolinium oxide mechanically adhered on the surface of the positive electrode active material particle containing lithium cobaltate was prepared. Except for the use of such a positive electrode active material prepared as above, the same procedure as in Example N1 was used to fabricate a non-aqueous electrolyte secondary battery of Comparative Example n2.

Here, in Comparative Example n2, a ratio of gadolinium element (Gd) in gadolinium oxide adhered on the surface of the positive electrode active material particle containing lithium cobaltate against the positive electrode active material particle was 0.086 mass %.

Then, the positive electrode active material of Comparative Example n2 was observed by SEM. The results of the observation showed that gadolinium oxide was flocculated and adhered on the concave parts of the positive electrode active material particle and was not adequately dispersed on the surface of the positive electrode active material particle.

Comparative Example n3

In Comparative Example n3, in preparation of the positive electrode active material of Comparative Example n2, the amount of gadolinium oxide having the primary particle diameter of 400 nm was changed to 5.0 g. Except for the use of such a positive electrode active material prepared as above, the same procedure as in Example N1 was used to fabricate a non-aqueous electrolyte secondary battery of Comparative Example n3.

Here, in Comparative Example n3, a ratio of gadolinium element (Gd) in gadolinium compound adhering on the surface of the positive electrode active material particle containing lithium cobaltate against the positive electrode active material particle was 0.86 mass %.

Then, the positive electrode active material of Comparative Example n3 was observed by SEM. The results of the observation showed that gadolinium oxide was flocculated and adhered on the concave parts of the positive electrode active material particle and was not dispersed on the surface of the positive electrode active material particle the same as the positive electrode active material of Comparative Example n2.

Comparative Example n4

In Comparative Example n4, in preparation of the positive electrode of Example N1, the positive electrode active material particle having gadolinium hydroxide adhered on the surface was heat-treated at 600° C. in air atmosphere for 5 hours. Except for the above, the same procedure as in Example N1 was used to fabricate a non-aqueous electrolyte secondary battery of Comparative Example n4.

Here, in the positive electrode active material of Comparative Example n4, gadolinium hydroxide adhered on the surface of the positive electrode active material particle was changed to gadolinium oxide, and one part of gadolinium was diffused inside of the positive electrode active material particle.

Next, each of the non-aqueous electrolyte secondary batteries of Examples N1 to N6 and Comparative Examples n1 to n4 was subjected to the initial charging/discharging the same as the non-aqueous electrolyte secondary battery of Example I1. Then, initial discharge capacity Qo of each non-aqueous electrolyte secondary battery was measured and initial charging/discharging efficiency of each non-aqueous electrolyte secondary battery was determined. The results are shown together with the results of non-aqueous electrolyte secondary batteries of Comparative Examples x11 to x13, y11 and z11 in Table 17 below.

After that, the same as the non-aqueous electrolyte secondary battery of Examples I1, each of the non-aqueous electrolyte secondary batteries of Examples N1 to N6 and Comparative Examples n1 to n4 was subjected to the high-temperature sequence charging examination. Next, as to each of the non-aqueous electrolyte secondary batteries, the increment in thickness thereof after high-temperature sequence charging examination against before high-temperature sequence charging examination was measured. The results are shown together with the results of non-aqueous electrolyte secondary batteries of Comparative Examples x11 to x13, y11 and z11 in Table 17 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. Then, 10 minutes pause was made. After that, percentage (%) of capacity retention after high-temperature sequence charging examination was obtained according to the equation (4). The results are shown together with the results of non-aqueous electrolyte secondary batteries of Comparative Examples x11 to x13, y11 and z11 in Table 17 below.

After 10 minutes pause, each of the non-aqueous electrolyte secondary batteries was charged at the constant current of 750 mA to 4.40 V and was further charged at the constant voltage of 4.40 V until the current became 37.5 mA under room temperature to measure charging capacity Qb. Then, 10 minutes pause was made. After that, each of the non-aqueous electrolyte secondary batteries was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown together with the results of non-aqueous electrolyte secondary batteries of Comparative Examples x11 to x13, y11 and z11 in Table 17 below.

to n4 after high-temperature sequence charging examination, the value of increment of thickness was higher, and the percentage of capacity retention, the percentage of capacity recovery and the percentage of high charging/discharging efficiency were more decreased as compared with each of the non-aqueous electrolyte secondary batteries of Examples N1 to N6.

Further, the same as each of the non-aqueous electrolyte secondary batteries of Examples I1 to I6, as compared with each of the non-aqueous electrolyte secondary batteries of Comparative Examples x11 to x13, y11 and z11, in each of the non-aqueous electrolyte secondary batteries of Examples N1 to N6, after high-temperature sequence charging examination, the value of increment of thickness was low, and the percentage of capacity retention, the percentage of capacity recovery and the percentage of charging/discharging efficiency were more improved.

Further, in the non-aqueous electrolyte secondary battery of Example N6 wherein the ratio of gadolinium element in gadolinium compound adhering on the surface of the posi-

TABLE 17

| | Treatment of surface of positive electrode active material | | | Initial | Evaluation of characteristics after high-temperature sequence charging examination | | | |
|---|---|---|---|---|---|---|---|---|
| | Treatment method | Heat treatment temperature (° C.) | Element adhered and volume of adhesion (mass %) | charging/ discharging efficiency (%) | Percentage (%) of capacity retention | Percentage (%) of capacity recovery | Percentage (%) of charging/ discharging efficiency | Increment in thickness (mm) |
| Ex. N1 | Deposition + Heat-treatment | 400 | Gd 0.086 | 89.5 | 88.1 | 81.9 | 99.9 | 0.85 |
| Ex. N2 | Deposition + Heat-treatment | 200 | Gd 0.086 | 89.6 | 88.2 | 81.8 | 99.9 | 0.89 |
| Ex. N3 | Deposition + Heat-treatment | 120 | Gd 0.086 | 89.5 | 88.1 | 81.8 | 99.9 | 0.88 |
| Ex. N4 | Deposition + Heat-treatment | 400 | Gd 0.18 | 89.4 | 87.9 | 81.5 | 99.8 | 0.88 |
| Ex. N5 | Deposition + Heat-treatment | 400 | Gd 0.30 | 89.2 | 87.9 | 81.3 | 99.8 | 0.91 |
| Ex. N6 | Deposition + Heat-treatment | 400 | Gd 0.35 | 88.1 | 87.0 | 81.1 | 99.7 | 0.95 |
| Comp. Ex. n1 | — | — | — | — | 89.5 | 56.2 | 56.5 | 88.9 | 3.25 |
| Comp. Ex. n2 | Mechanical treatment | — | Gd 0.086 | 89.3 | 58.3 | 56.2 | 86.2 | 3.33 |
| Comp. Ex. n3 | Mechanical treatment | — | Gd 0.86 | 88.5 | 57.2 | 58.2 | 87.3 | 3.45 |
| Comp. Ex. n4 | Deposition + Heat-treatment | 600 | Gd 0.086 | 87.5 | 77.5 | 76.8 | 91.8 | 2.25 |
| Comp. Ex. x11 | Deposition + Heat-treatment | 120 | Al 0.086 | 88.3 | 84.3 | 74.8 | 98.5 | 2.66 |
| Comp. Ex. x12 | Deposition + Heat-treatment | 400 | Al 0.086 | 88.9 | 84.5 | 75.2 | 98.9 | 2.72 |
| Comp. Ex. x13 | Deposition + Heat-treatment | 120 | Al 0.20 | 86.1 | 85.3 | 76.6 | 98.9 | 1.98 |
| Comp. Ex. y11 | Deposition + Heat-treatment | 400 | Zn 0.086 | 88.9 | 81.0 | 71.7 | 90.3 | 3.44 |
| Comp. Ex. z11 | Deposition + Heat-treatment | 120 | Ce 0.086 | 87.0 | 75.2 | 64.3 | 90.3 | 2.01 |

As is apparent from Table 17 the above, in each of the non-aqueous electrolyte secondary batteries of Examples N1 to N6 which utilized the positive electrode active material having the particle of gadolinium compound comprising gadolinium hydroxide and gadolinium oxyhydroxide dispersed and adhered on the surface of the positive electrode active material particle containing lithium cobaltate, after high-temperature sequence charging examination, the value of increment of thickness was low, and the percentage of capacity retention, the percentage of capacity recovery and the percentage of charging/discharging efficiency were improved. On the other hand, as to each of the non-aqueous electrolyte secondary batteries of Comparative Examples n1 tive electrode active material particle containing lithium cobaltate against the positive electrode active material particle was 0.35 mass %, after high-temperature sequence charging examination, the percentage of capacity retention, the percentage of capacity recovery and the percentage of charging/discharging efficiency were decreased, and the value of increment of thickness was higher, as compared with each of the non-aqueous electrolyte secondary batteries of Examples N1 to N5 wherein the ratio of gadolinium element in gadolinium compound was less than 0.35 mass %. Therefore, it is preferable that the ratio of gadolinium element in gadolinium compound adhering on the surface of the positive electrode active material particle containing lithium cobaltate against the positive electrode active material particle be less than 0.35 mass %.

Further, in order to restrict decrease of percentage of initial charging/discharging efficiency, it is preferable that the ratio of gadolinium element be less than 0.30 mass %. This is because charging/discharging reaction is hindered in the case where the amount of gadolinium compound adhering on the surface of the positive electrode active material particle is excessive.

Comparative Example i5

In preparation of a positive electrode of Comparative Example i5, as a positive electrode active material particle not containing Co or Ni, lithium manganese oxide $LiMn_2O_4$ having spinel structure wherein each of Mg and Al formed solid solution in a concentration of 0.5 mol % was used.

Then, 1000 g of the positive electrode active material particle was poured into 3 liter of pure water and stirred, and an aqueous solution of neodymium nitrate dissolving 2.60 g of neodymium nitrate 6-hydrate in 200 ml of pure water was added thereto. After that, 10 mass % of an aqueous solution of sodium hydroxide was appropriately added so that the pH of the resultant solution was 9, and neodymium hydroxide was adhered on the surface of the positive electrode active material particle. Then, filtering suction was conducted to collect the treated object by filtration and the treated object was dried at 120° C. Thus was prepared the positive electrode active material particle having neodymium hydroxide adhered on the surface.

Here, in the above-mentioned positive electrode active material, a ratio of neodymium element (Nd) in neodymium compound adhering on the surface of the positive electrode active material particle containing lithium manganese oxide having spinel structure against the positive electrode active material particle was 0.086 mass %. Further, a particle diameter of most of the particle of neodymium compound which were adhered on the surface of the positive electrode active material particle was 100 nm or less. In addition, the particle of neodymium compound was uniformly dispersed and adhered on the surface of the positive electrode active material particle.

Except for the use of the foregoing positive electrode active material having the particle of neodymium compound uniformly dispersed and adhered on the surface of the positive electrode active material containing lithium manganese oxide having spinel structure, the same procedure as in Example I1 was used to fabricate a non-aqueous electrolyte secondary battery of Comparative Example i5.

Comparative Example j5

A positive electrode of Comparative Example j5 was prepared in the following manner. Lithium manganese oxide $LiMn_2O_4$ having spinel structure was used as positive electrode active material particle the same as Comparative Example i5. Then, 1000 g of the foregoing positive electrode active material particle was poured into 3 liter of pure water and stirred, and an aqueous solution of samarium nitrate dissolving 2.54 g of samarium nitrate 6-hydrate in 200 ml of pure water was added thereto. After that, 10 mass % of an aqueous solution of sodium hydroxide was appropriately added so that the pH of the resultant solution was 9, and samarium hydroxide was adhered on the surface of the positive electrode active material particle. Then, filtering suction was conducted on the positive electrode active material particle to collect the treated object by filtration, and the treated object was heat-treated for drying at 120° C. Thus was prepared the positive electrode active material particle having samarium hydroxide adhered on the surface.

In the above-mentioned positive electrode active material, a ratio of samarium element (Sm) in samarium compound adhering on the surface of the positive electrode active material particle containing lithium manganese oxide having spinel structure against the positive electrode active material particle was 0.086 mass %. Further, a particle diameter of most of the particle of samarium compound which were adhered on the surface of the positive electrode active material particle was 100 nm or less. In addition, the particle of samarium compound was uniformly dispersed and adhered on the surface of the positive electrode active material particle.

Except for the use of the foregoing positive electrode active material having the particle of samarium compound uniformly dispersed and adhered on the surface of the positive electrode active material containing lithium manganese oxide having spinel structure, the same procedure as in Example I1 was used to fabricate a non-aqueous electrolyte secondary battery of Comparative Example j5.

Comparative Example k5

A positive electrode of Comparative Example k5 was prepared in the following manner. Lithium manganese oxide $LiMn_2O_4$ having spinel structure was used as positive electrode active material particle the same as Comparative Example i5. Then, 1000 g of the foregoing positive electrode active material particle was poured into 3 liter of pure water and stirred, and an aqueous solution of praseodymium nitrate dissolving 2.66 g of praseodymium nitrate 6-hydrate in 200 ml of pure water was added thereto. After that, 10 mass % of an aqueous solution of sodium hydroxide was appropriately added so that the pH of the resultant solution was 9, and praseodymium hydroxide was adhered on the surface of the positive electrode active material particle.

Then, filtering suction was conducted on the positive electrode active material particle to collect the treated object by filtration, and the treated object was heat-treated for drying at 120° C. Thus was prepared the positive electrode active material particle having praseodymium hydroxide adhered on the surface.

In the above-mentioned positive electrode active material, a ratio of praseodymium element (Pr) in praseodymium compound adhering on the surface of the positive electrode active material particle containing lithium manganese oxide having spinel structure against the positive electrode active material particle was 0.086 mass %. Further, a particle diameter of most of the particle of praseodymium compound which were adhered on the surface of the positive electrode active material particle was 100 nm or less. In addition, the particle of praseodymium compound was uniformly dispersed and adhered on the surface of the positive electrode active material particle.

Except for the use of the foregoing positive electrode active material having the particle of praseodymium compound uniformly dispersed and adhered on the surface of the positive electrode active material containing lithium manganese oxide having spinel structure, the same procedure as in Example I1 was used to fabricate a non-aqueous electrolyte secondary battery of Comparative Example k5.

Comparative Example m5

A positive electrode of Comparative Example m5 was prepared in the following manner. Lithium manganese oxide LiMn$_2$O$_4$ having spinel structure was used as positive electrode active material particle the same as Comparative Example i5. Then, 1000 g of the foregoing positive electrode active material particle was poured into 3 liter of pure water and stirred, and an aqueous solution of europium nitrate dissolving 2.53 g of europium nitrate 6-hydrate in 200 ml of pure water was added thereto. After that, 10 mass % of an aqueous solution of sodium hydroxide was appropriately added so that the pH of the resultant solution was 9, and europium hydroxide was adhered on the surface of the positive electrode active material particle. Then, filtering suction was conducted on the positive electrode active material particle to collect the treated object by filtration, and the treated object was heat-treated for drying at 120° C. Thus was prepared the positive electrode active material particle having europium hydroxide adhered on the surface.

In the above-mentioned positive electrode active material, a ratio of europium element (Eu) in europium compound adhering on the surface of the positive electrode active material particle containing lithium manganese oxide having spinel structure against the positive electrode active material particle was 0.086 mass %. Further, a particle diameter of most of the particle of europium compound which were adhered on the surface of the positive electrode active material particle was 100 nm or less. In addition, the particle of europium compound was uniformly dispersed and adhered on the surface of the positive electrode active material particle.

Except for the use of the foregoing positive electrode active material having the particle of europium compound uniformly dispersed and adhered on the surface of the positive electrode active material containing lithium manganese oxide having spinel structure, the same procedure as in Example I1 was used to fabricate a non-aqueous electrolyte secondary battery of Comparative Example m5.

Comparative Example n5

A positive electrode of Comparative Example n5 was prepared in the following manner. Lithium manganese oxide LiMn$_2$O$_4$ having spinel structure was used as positive electrode active material particle the same as Comparative Example i5. Then, 1000 g of the foregoing positive electrode active material particle was poured into 3 liter of pure water and stirred, and an aqueous solution of gadolinium nitrate dissolving 2.38 g of gadolinium nitrate 5-hydrate in 200 ml of pure water was added thereto. After that, 10 mass % of an aqueous solution of sodium hydroxide was appropriately added so that the pH of the resultant solution was 9, and gadolinium hydroxide was adhered on the surface of the positive electrode active material particle.

Then, filtering suction was conducted on the positive electrode active material particle to collect the treated object by filtration, and the treated object was heat-treated for drying at 120° C. Thus was prepared the positive electrode active material particle having gadolinium hydroxide adhered on the surface.

In the above-mentioned positive electrode active material, a ratio of gadolinium element (Gd) in gadolinium compound adhering on the surface of the positive electrode active material particle containing lithium manganese oxide having spinel structure against the positive electrode active material particle was 0.086 mass %. Further, a particle diameter of most of the particle of gadolinium compound which were adhered on the surface of the positive electrode active material particle was 100 nm or less. In addition, the particle of gadolinium compound was uniformly dispersed and adhered on the surface of the positive electrode active material particle.

Except for the use of the foregoing positive electrode active material having the particle of gadolinium compound uniformly dispersed and adhered on the surface of the positive electrode active material containing lithium manganese oxide having spinel structure, the same procedure as in Example I1 was used to fabricate a non-aqueous electrolyte secondary battery of Comparative Example n5.

Comparative Example i6

In Comparative Example i6, any of neodymium compound, samarium compound, and praseodymium compound was not adhered on the surface of the positive electrode active material particle containing lithium manganese oxide having spinel structure. Except for the above, the same procedure as in Comparative example was used to fabricate a non-aqueous electrolyte secondary battery of Comparative Example i6.

Next, the initial charging/discharging under room temperature environment was conducted as follows. As the initial charging, each of the non-aqueous electrolyte secondary batteries of Comparative Examples i5, j5, k5, m5, n5 and i6 was charged at the constant current of 750 mA to 4.20 V and was further charged at the constant voltage of 4.20 V until the current became 37.5 mA. After 10 minutes pause, as the initial discharging, each of the batteries was discharged at the constant current of 750 mA to 2.75 V. Then, initial discharge capacity Qo of each non-aqueous electrolyte secondary battery was measured and initial charging/discharging efficiency of each non-aqueous electrolyte secondary battery was determined. The results were shown in Table 18 below.

After that, a high-temperature sequence charging examination was conducted as follows. Each of the non-aqueous electrolyte secondary batteries of Comparative Examples i5, j5, k5, m5, n5 and i6 after initial charging/discharging was retained in the thermostatic container of 60° C. for 1 hour. Then, each of the non-aqueous electrolyte secondary batteries was charged at the constant current of 750 mA until the voltage became 4.20 V, and further was charged so as to maintain the voltage of 4.20 V for 3 days in the thermostatic container of 60° C. Next, as to each of the non-aqueous electrolyte secondary batteries, the increment in thickness thereof after high-temperature sequence charging examination against before high-temperature sequence charging examination was measured. The results are shown in Table 18 below. Here, in the case where lithium manganese oxide having spinel structure is used as the positive electrode active material and that a carbon negative electrode is used as the negative electrode, if the non-aqueous electrolyte secondary battery is charged to more than 4.20 V, only the battery voltage is rapidly increased. Therefore, the high-temperature sequence charging examination was conducted at 4.20 V.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. After 10 minutes pause, percentage (%) of capacity retention after high-temperature sequence charging examination was obtained according to the equation (4). The results are shown in Table 18 below.

Then, each of the non-aqueous electrolyte secondary batteries after 10 minutes pause was charged at the constant current of 750 mA to 4.20 V and was further charged at the constant voltage of 4.20 V until the current became 37.5 mA under room temperature to measure charging capacity Qb. After 10 minutes pause was made, each of the non-aqueous electrolyte secondary batteries after high-temperature sequence charging examination was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown in Table 18 below.

of lanthanum nitrate 6-hydrate in 200 ml of pure water was added thereto. After that, 10 mass % of an aqueous solution of sodium hydroxide was appropriately added so that the pH of the resultant solution was 9, and lanthanum hydroxide was adhered on the surface of the positive electrode active material particle. Then, filtering suction was conducted to collect the treated object by filtration and the treated object was dried at 120° C. Thus was prepared the positive electrode active material particle having lanthanum hydroxide adhered on the surface.

Next, the positive electrode active material particle having lanthanum hydroxide adhered on the surface was heat-treated at 200° C. in air atmosphere for 5 hours. Thus was prepared the positive electrode active material having a

TABLE 18

Positive electrode active material: Lithium manganese oxide LiMn$_2$O$_4$ having spinel structure

| | Treatment of surface of positive electrode active material | | | Initial | Evaluation of characteristics after high-temperature sequence charging examination | | | |
|---|---|---|---|---|---|---|---|---|
| | Treatment method | Heat treatment temperature (° C.) | Element adhered and volume of adhesion (mass %) | charging/ discharging efficiency (%) | Percentage (%) of capacity retention | Percentage (%) of capacity recovery | Percentage (%) of charging/ discharging efficiency | Increment in thickness (mm) |
| Comp. Ex. i5 | Deposition + Heat-treatment | 120 | Nd 0.086 | 92.3 | 76.8 | 76.2 | 100.0 | 0.94 |
| Comp. Ex. j5 | Deposition + Heat-treatment | 120 | Sm 0.086 | 92.0 | 77.0 | 76.5 | 100.3 | 0.96 |
| Comp. Ex. k5 | Deposition + Heat-treatment | 120 | Pr 0.086 | 92.1 | 76.5 | 75.9 | 100.2 | 0.95 |
| Comp. Ex. m5 | Deposition + Heat-treatment | 120 | Eu 0.086 | 92.0 | 77.8 | 76.3 | 100.5 | 0.93 |
| Comp. Ex. n5 | Deposition + Heat-treatment | 120 | Gd 0.086 | 92.1 | 76.8 | 76.2 | 100.2 | 0.95 |
| Comp. Ex. i6 | — | — | — | 93.1 | 78.3 | 77.8 | 100.3 | 0.90 |

As is shown in Table 18 the above, among the non-aqueous electrolyte secondary batteries of Comparative Examples i5, j5, k5, m5, n5 and i6 using lithium manganese oxide having spinel structure not containing Co nor Ni as the positive electrode active material particle, after high-temperature sequence charging examination, the initial charging/discharging efficiency, the increment of thickness and the percentage of capacity retention, the percentage of capacity recovery and the percentage of charging/discharging efficiency of were almost the same. Namely, effects by dispersing and adhering the particles of neodymium hydroxide, samarium hydroxide, praseodymium hydroxide, europium hydroxide and gadolinium hydroxide on the surface of the positive electrode active material were not obtained.

The reason is supposed to be as follows. A positive electrode active material of lithium manganese oxide having spinel structure not containing Co or Ni has a low catalytic property, and therefore, a decomposition reaction of the non-aqueous electrolyte hardly occurs even in the case of high-temperature sequence charging.

Example O1

A positive electrode of Example O1 was prepared in the following manner. Lithium cobaltate wherein each of Mg and Al formed solid solution in a concentration of 0.5 mol % was used as positive electrode active material particle. Then, 1000 g of the positive electrode active material particle was poured into 3 liter of pure water and stirred, and an aqueous solution of lanthanum nitrate dissolving 2.63 g particle of lanthanum compound dispersed and adhered on the surface of the positive electrode active material particle.

Here, in the above-mentioned positive electrode active material, a ratio of lanthanum element (La) in lanthanum compound adhering on the surface of the positive electrode active material particle containing lithium cobaltate against the positive electrode active material particle was 0.084 mass %. Further, lanthanum compound adhering on the surface of the positive electrode active material particle was remained as lanthanum hydroxide.

Then, the positive electrode active material of Example O1 was observed by SEM. The results of the observation showed that a particle diameter of most of the particle of lanthanum compound which were adhered on the surface of the positive electrode active material particle was 100 nm or less. In addition, the particle of lanthanum compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm³.

In Example O1, the same negative electrode and the same non-aqueous electrolyte of Example A1 was used as a negative electrode and a non-aqueous electrolyte. Then, as shown in FIGS. 1 (A) and (B) and FIG. 2, a flat type-non-aqueous electrolyte secondary battery having a design capacity of 780 mAh in a case of charging to 4.40 V was fabricated the same as Example A1.

Example O2

In Example O2, in preparation of the positive electrode of Example O1, the positive electrode active material particle having lanthanum hydroxide adhered on the surface was heat-treated at 400° C. in air atmosphere for 5 hours. Except for the above, the same procedure as in Example O1 was used to fabricate a non-aqueous electrolyte secondary battery of Example O2.

Here, in the positive electrode active material of Example O2, most of lanthanum hydroxide adhered on the surface of the positive electrode active material particle were changed to lanthanum oxyhydroxide.

Example O3

In Example O3, in preparation of the positive electrode of Example O1, the amount of lanthanum nitrate 6-hydrate dissolved in 200 ml of pure water was changed to 5.21 g in adhering lanthanum hydroxide on the surface of positive electrode active material particle. Except for the above, the same procedure as in Example O1 was used to fabricate a non-aqueous electrolyte secondary battery of Example O3.

Here, in Example O3, a ratio of lanthanum element (La) in lanthanum compound adhering on the surface of the positive electrode active material particle containing lithium cobaltate against the positive electrode active material particle was 0.17 mass %.

Example O4

In Example O4, in preparation of the positive electrode of Example O1, the amount of lanthanum nitrate 6-hydrate dissolved in 200 ml of pure water was changed to 8.66 g in adhering lanthanum hydroxide on the surface of positive electrode active material particle. Except for the above, the same procedure as in Example O1 was used to fabricate a non-aqueous electrolyte secondary battery of Example O4.

Here, in Example O4, a ratio of lanthanum element (La) in lanthanum compound adhering on the surface of the positive electrode active material particle containing lithium cobaltate against the positive electrode active material particle was 0.28 mass %.

Example O5

In Example O5, in preparation of the positive electrode of Example O1, the amount of lanthanum nitrate 6-hydrate dissolved in 200 ml of pure water was changed to 10.89 g in adhering lanthanum hydroxide on the surface of positive electrode active material particle. Except for the above, the same procedure as in Example O1 was used to fabricate a non-aqueous electrolyte secondary battery of Example O5.

Here, in Example O5, a ratio of lanthanum element (La) in lanthanum compound adhering on the surface of the positive electrode active material particle containing lithium cobaltate against the positive electrode active material particle was 0.35 mass %.

Comparative Example o1

In Comparative Example o1, in preparation of the positive electrode of Example O1, lanthanum compound was not adhered on the surface of the positive electrode active material particle containing lithium cobaltate. Except for the above, the same procedure as in Example O1 was used to fabricate a non-aqueous electrolyte secondary battery of Comparative Example o1.

Comparative Example o2

In Comparative Example o2, in preparation of the positive electrode of Example O1, lanthanum oxide was mechanically adhered on the surface of the positive electrode active material particle containing lithium cobaltate as follows: A lanthanum oxide reagent was pulverized until a particle diameter of a primary particle became 300 nm to prepare lanthanum oxide. Then, 0.50 g of the foregoing lanthanum oxide was mixed with 500 g of positive electrode active material particle containing lithium cobaltate by using the mixing machine (the tradename NOBILTA made by HOSOKAWA MICRON CORPORATION). Thus, the positive electrode active material having lanthanum oxide mechanically adhered on the surface of the positive electrode active material particle containing lithium cobaltate was prepared. Except for the use of such a positive electrode active material prepared as above, the same procedure as in Example O1 was used to fabricate a non-aqueous electrolyte secondary battery of Comparative Example o2.

Here, in Comparative Example o2, a ratio of lanthanum element (La) in lanthanum oxide adhered on the surface of the positive electrode active material particle containing lithium cobaltate against the positive electrode active material particle was 0.084 mass %.

Then, the positive electrode active material of Comparative Example o2 was observed by SEM. The results of the observation showed that lanthanum oxide was flocculated and adhered on the concave parts of the positive electrode active material particle and was not adequately dispersed on the surface of the positive electrode active material particle.

Comparative Example o3

In Comparative Example o3, in preparation of the positive electrode active material of Comparative Example o2, the amount of lanthanum oxide having the primary particle diameter of 300 nm was changed to 4.95 g. Except for the use of such a positive electrode active material prepared as above, the same procedure as in Example O1 was used to fabricate a non-aqueous electrolyte secondary battery of Comparative Example o3.

Here, in Comparative Example o3, a ratio of lanthanum element (La) in lanthanum compound adhering on the surface of the positive electrode active material particle containing lithium cobaltate against the positive electrode active material particle was 0.84 mass %.

Then, the positive electrode active material of Comparative Example o3 was observed by SEM. The results of the observation showed that lanthanum oxide was flocculated and adhered on the concave parts of the positive electrode active material particle and was not dispersed on the surface of the positive electrode active material particle the same as the positive electrode active material of Comparative Example o2.

Comparative Example o4

In Comparative Example o4, in preparation of the positive electrode of Example O1, the positive electrode active material particle having lanthanum hydroxide adhered on the surface was heat-treated at 600° C. in air atmosphere for 5 hours. Except for the above, the same procedure as in Example O1 was used to fabricate a non-aqueous electrolyte secondary battery of Comparative Example o4.

Here, in the positive electrode active material of Comparative Example o4, lanthanum hydroxide adhered on the surface of the positive electrode active material particle was changed to lanthanum oxide, and one part of lanthanum was diffused inside of the positive electrode active material particle.

Comparative Example x21

In Comparative Example x21, in preparation of the positive electrode active material of Example O1, 1000 g of the positive electrode active material particle was poured into 3 liter of pure water and stirred, and an aqueous solution of aluminum nitrate dissolving 11.7 g of aluminum nitrate 9-hydrate in 200 ml of pure water was added thereto. After that, 10 mass % of the aqueous solution of sodium hydroxide was appropriately added so that the pH of the resultant solution was 9, and aluminum hydroxide was adhered on the surface of the positive electrode active material particle. Then, filtering suction was conducted to collect the treated object by filtration and the treated object was dried at 120° C. Thus was prepared the positive electrode active material particle having aluminum compound adhered on the surface. Except for the use of such a positive electrode active material, the same procedure as in Example O1 was used to fabricate a non-aqueous electrolyte secondary battery of Comparative Example x21.

Here, in the positive electrode active material of Comparative Example x21, a ratio of aluminum element (Al) in aluminum compound adhering on the surface of the positive electrode active material particle against the positive electrode active material particle was 0.084 mass %. Further, aluminum compound adhering on the surface of the positive electrode active material particle was aluminum hydroxide.

Comparative Example x22

In Comparative Example x22, the positive electrode active material obtained in Comparative Example x21 was heat-treated at 400° C. in air atmosphere for 5 hours. Thus, the positive electrode active material of Comparative Example x22 was obtained. Except for the use of such a positive electrode active material, the same procedure as in Example O1 was used to fabricate a non-aqueous electrolyte secondary battery of Comparative Example x22.

Here, in the positive electrode active material of Comparative Example x22, a ratio of aluminum element (Al) in aluminum compound adhering on the surface of the positive electrode active material particle against the positive electrode active material particle was 0.084 mass %. Further, aluminum compound adhering on the surface of the positive electrode active material particle was changed to aluminum oxide.

Comparative Example x23

In Comparative Example x23, in preparation of the positive electrode active material of Comparative Example x21, an aqueous solution of aluminum nitrate dissolving 28.0 g of aluminum nitrate 9-hydrate in 200 ml of pure water was added. Except for the above, the same procedure as in Comparative Example x21 was used to prepare the positive electrode active material of Comparative Example x23. Further, except for the use of such a positive electrode active material, the same procedure as in Example O1 was used to fabricate a non-aqueous electrolyte secondary battery of Comparative Example x23.

Here, in the positive electrode active material of Comparative Example x23, a ratio of aluminum element (Al) in aluminum compound adhering on the surface of the positive electrode active material particle against the positive electrode active material particle was 0.20 mass %. Further, aluminum compound adhering on the surface of the positive electrode active material particle was aluminum hydroxide the same as Comparative Example x21.

Comparative Example y21

In Comparative Example y21, in preparation of the positive electrode active material of Example O1, 1000 g of the positive electrode active material particle was poured into 3 liter of pure water and stirred, and an aqueous solution of zinc sulfate dissolving 7.38 g of zinc sulfate 7-hydrate in 200 ml of pure water was added thereto. After that, 10 mass % of the aqueous solution of sodium hydroxide was appropriately added so that the pH of the resultant solution was 9, and zinc hydroxide was adhered on the surface of the positive electrode active material particle. Then, filtering suction was conducted to collect the treated object by filtration and the treated object was dried at 120° C. to adhere zinc compound on the surface of the positive electrode active material particle. Further, the positive electrode active material particle having zinc compound adhered on the surface was heat-treated at 400° C. in air atmosphere for 5 hours to prepare a positive electrode active material. Except for the use of such a positive electrode active material, the same procedure as in Example O1 was used to fabricate a non-aqueous electrolyte secondary battery of Comparative Example y21.

Here, in the positive electrode active material of Comparative Example y21, a ratio of zinc element (Zn) in zinc compound adhering on the surface of the positive electrode active material particle against the positive electrode active material particle was 0.084 mass %. Further, zinc compound adhering on the surface of the positive electrode active material particle was changed to zinc oxide.

Comparative Example z21

In Comparative Example z21, in preparation of the positive electrode active material of Example O1, 1000 g of the positive electrode active material particle was poured into 3 liter of pure water and stirred, and an aqueous solution of cerium nitrate dissolving 2.61 g of cerium nitrate 6-hydrate in 200 ml of pure water was added thereto. After that, 10 mass % of the aqueous solution of sodium hydroxide was appropriately added so that the pH of the resultant solution was 9, and cerium hydroxide was adhered on the surface of the positive electrode active material particle. Then, filtering suction was conducted to collect the treated object by filtration and the treated object was heat-treated at 200° C.

in air atmosphere for 5 hours after being dried at 120° C. to prepare a positive electrode active material having cerium compound dispersed and adhered on the surface of the positive electrode active material particle. Except for the use of such a positive electrode active material, the same procedure as in Example O1 was used to fabricate a non-aqueous electrolyte secondary battery of Comparative Example z21.

Here, in the positive electrode active material of Comparative Example z21, a ratio of cerium element (Ce) in cerium compound adhering on the surface of the positive electrode active material particle against the positive electrode active material particle was 0.084 mass %.

Cerium hydroxide represented by a chemical formula, $CeO_2 \cdot 2H_2O$, was measured by thermogravimetric analysis at a heating rate of 5° C./min. As a result of measurement, $CeO_2 \cdot 2H_2O$ was decomposed to $CeO_2 \cdot 0.5H_2O$ at 110° C. or less and was not stable as cerium hydroxide, and decomposed to $CeO_2$ at 280° C. Therefore, it is supposed to be that cerium compound adhering on the surface of the positive electrode active material was neither cerium hydroxide nor cerium oxyhydroxide.

Next, each of the non-aqueous electrolyte secondary batteries of Examples O1 to O5 and Comparative Examples o1 to o4, x21 to x23, y21 and z21 was subjected to the initial charging/discharging the same as the non-aqueous electrolyte secondary battery of Example A1. Then, initial discharge capacity Qo of each non-aqueous electrolyte secondary battery was measured and initial charging/discharging efficiency of each non-aqueous electrolyte secondary battery was determined. The results are shown in Table 19 below.

After that, a high-temperature sequence charging examination was conducted as follows. Each of the non-aqueous electrolyte secondary batteries of Examples O1 to O5 and Comparative Examples o1 to o4, x21 to x23, y21 and z21 after initial charging/discharging was retained in the thermostatic container of 60° C. and charged at the constant current of 750 mA until the voltage became 4.40 V, and was further charged so as to maintain the voltage of 4.40 V for 3 days. Next, as to each of the non-aqueous electrolyte secondary batteries, the increment in thickness thereof after high-temperature sequence charging examination against before high-temperature sequence charging examination was measured. The results are shown in Table 19 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. After 10 minutes pause, percentage (%) of capacity retention after high-temperature sequence charging examination was obtained according to the equation (4). The results are shown in Table 19 below.

Then, each of the non-aqueous electrolyte secondary batteries after 10 minutes pause was charged at the constant current of 750 mA to 4.40 V and was further charged at the constant voltage of 4.40 V until the current became 37.5 mA under room temperature to measure charging capacity Qb. After 10 minutes pause was made, each of the non-aqueous electrolyte secondary batteries after high-temperature sequence charging examination was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown in Table 19 below.

TABLE 19

| | Treatment of surface of positive electrode active material | | | Initial charging/ discharging efficiency (%) | Evaluation of characteristics after high-temperature sequence charging examination | | | |
|---|---|---|---|---|---|---|---|---|
| | Treatment method | Heat treatment temperature (° C.) | Element adhered and volume of adhesion (mass %) | | Percentage (%) of capacity retention | Percentage (%) of capacity recovery | Percentage (%) of charging/ discharging efficiency | Increment in thickness (mm) |
| Ex. O1 | Deposition + Heat-treatment | 200 | La 0.084 | 89.2 | 85.8 | 79.8 | 99.9 | 0.85 |
| Ex. O2 | Deposition + Heat-treatment | 400 | La 0.084 | 89.1 | 85.5 | 78.9 | 99.9 | 0.88 |
| Ex. O3 | Deposition + Heat-treatment | 200 | La 0.17 | 89.2 | 85.5 | 79.5 | 99.5 | 0.85 |
| Ex. O4 | Deposition + Heat-treatment | 200 | La 0.28 | 88.9 | 85.3 | 79.2 | 99.8 | 0.89 |
| Ex. O5 | Deposition + Heat-treatment | 200 | La 0.35 | 88.2 | 84.5 | 76.5 | 98.5 | 0.98 |
| Comp. Ex. o1 | — | — | — | 89.2 | 55.5 | 56.5 | 86.9 | 7.02 |
| Comp. Ex. o2 | Mechanical treatment | — | La 0.084 | 89.0 | 51.5 | 55.9 | 85.6 | 7.55 |
| Comp. Ex. o3 | Mechanical treatment | — | La 0.84 | 89.0 | 67.3 | 66.5 | 87.8 | 7.11 |
| Comp. Ex. o4 | Deposition + Heat-treatment | 600 | La 0.084 | 86.8 | 78.9 | 76.8 | 93.5 | 2.78 |
| Comp. Ex. x21 | Deposition + Heat-treatment | 120 | Al 0.084 | 89.2 | 82.2 | 72.1 | 95.3 | 3.32 |
| Comp. Ex. x22 | Deposition + Heat-treatment | 400 | Al 0.084 | 88.8 | 83.2 | 72.5 | 96.5 | 3.73 |
| Comp. Ex. x23 | Deposition + Heat-treatment | 120 | Al 0.20 | 86.5 | 84.8 | 73.1 | 97.7 | 2.92 |
| Comp. Ex. y21 | Deposition + Heat-treatment | 400 | Zn 0.084 | 88.8 | 81.1 | 71.9 | 90.0 | 4.06 |
| Comp. Ex. z21 | Deposition + Heat-treatment | 200 | Ce 0.084 | 88.8 | 80.1 | 72.5 | 90.2 | 2.68 |

The result showed that the percentage of initial charging/discharging efficiency of non-aqueous electrolyte secondary battery of Comparative Example o4 was more decreased, as compared with that of each non-aqueous electrolyte secondary battery of Examples O1 to O5 and Comparative Examples o1 to o3. The reason is thought to be as follows. In the non-aqueous electrolyte secondary battery of Comparative Example o4, lanthanum hydroxide which was adhered on the surface of the positive electrode active material particle was changed to lanthanum oxide and one part of lanthanum was diffused inside of the positive electrode active material particle.

As is apparent from Table 19 the above, in each of the non-aqueous electrolyte secondary batteries of Examples O1 to O5 which utilized the positive electrode active material having the particle of lanthanum compound comprising lanthanum hydroxide and lanthanum oxyhydroxide dispersed and adhered on the surface of the positive electrode active material particle containing lithium cobaltate, after high-temperature sequence charging examination, the value of increment of thickness was lower, and the percentage of capacity retention, the percentage of capacity recovery and the percentage of charging/discharging efficiency were more improved, as compared with each of the non-aqueous electrolyte secondary batteries of Comparative Examples o1 to o3.

In comparison among each of the non-aqueous electrolyte secondary batteries of Examples O1 to O5 and the non-aqueous electrolyte secondary battery of Comparative Examples o4, the percentage of capacity recovery after high-temperature sequence charging examination of Example O5 and that of Comparative Example o4 were almost the same; however, in Examples O1 to O4 after high-temperature sequence charging examination, the percentage of capacity retention, the percentage of capacity recovery and the percentage of charging/discharging efficiency were much more improved and the increment of thickness was greatly reduced as compared with Comparative Examples o4.

Further, in the non-aqueous electrolyte secondary battery of Example O5 wherein the ratio of lanthanum element in lanthanum compound adhering on the surface of the positive electrode active material particle containing lithium cobaltate against the positive electrode active material particle was 0.35 mass %, after high-temperature sequence charging examination, the percentage of capacity retention, the percentage of capacity recovery and the percentage of charging/discharging efficiency were more decreased, and the value of increment of thickness was higher, as compared with each of the non-aqueous electrolyte secondary batteries of Examples O1 to O4 wherein the ratio of lanthanum element in lanthanum compound was less than 0.35 mass %. Therefore, it is preferable that the ratio of lanthanum element in lanthanum compound adhering on the surface of the positive electrode active material particle containing lithium cobaltate against the positive electrode active material particle be less than 0.35 mass % Further, it is more preferable that the ratio of lanthanum element be less than 0.30 mass %. This is because charging/discharging reaction is hindered in the case where the amount of lanthanum compound adhering on the surface of the positive electrode active material particle is excessive.

Further, as compared with each of the non-aqueous electrolyte secondary batteries of Comparative Examples x21 to x23, y21 and z21, in each of the non-aqueous electrolyte secondary batteries of Examples O1 to O5 after high-temperature sequence charging examination, the value of increment of thickness was lower, and the percentage of capacity retention, the percentage of capacity recovery and the percentage of charging/discharging efficiency were more improved. The reason is thought to be as follows. Although the particle of aluminum compound, zinc compound or cerium compound which does not contribute to charging/discharging was adhered on the surface of the positive electrode active material particle, the decomposition reaction of the non-aqueous electrolyte by the transition metal having catalytic property contained in the positive electrode active material was not fully restricted.

Example P1

A positive electrode of Example P1 was prepared in the following manner. Lithium cobaltate wherein each of Mg and Al formed solid solution in a concentration of 0.5 mol % was used as positive electrode active material particle. Then, 1000 g of the positive electrode active material particle was poured into 3 liter of pure water and stirred, and an aqueous solution of yttrium nitrate dissolving 3.04 g of yttrium nitrate 5-hydrate in 200 ml of pure water was added thereto. After that, 10 mass % of an aqueous solution of sodium hydroxide was appropriately added so that the pH of the resultant solution was 9, and yttrium hydroxide was adhered on the surface of the positive electrode active material particle. Then, filtering suction was conducted to collect the treated object by filtration and the treated object was dried at 120° C. Thus was prepared the positive electrode active material particle having yttrium hydroxide adhered on the surface.

Next, the foregoing positive electrode active material particle was heat-treated at 200° C. in air atmosphere for 5 hours. Thus was prepared the positive electrode active material having a particle of yttrium compound dispersed and adhered on the surface of the positive electrode active material particle.

Here, in the above-mentioned positive electrode active material, a ratio of yttrium element (Y) in yttrium compound adhering on the surface of the positive electrode active material particle containing lithium cobaltate against the positive electrode active material particle was 0.084 mass %. Further, yttrium compound adhering on the surface of the positive electrode active material particle was not changed to yttrium oxyhydroxide and remained as yttrium hydroxide.

Then, the positive electrode active material of Example P1 was observed by SEM. The results of the observation showed that a particle diameter of most of the particle of yttrium compound which were adhered on the surface of the positive electrode active material particle was 100 nm or less. In addition, the particle of yttrium compound was dispersed and adhered on the surface of the positive electrode active material particle.

Next, the foregoing positive electrode active material was mixed and stirred with acetylene black as a conductive agent, and N-methyl-2-pyrrolidone solution dissolving polyvinylidene fluoride as a binder agent using the mixing and stirring device (the tradename COMBI MIX made by TOKUSHU KIKA KOGYO KK). Thus, positive electrode mixture slurry was prepared. The mass ratio of the positive electrode active material particle, the conductive agent and the binder agent was 95:2.5:2.5. Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.60 g/cm³.

Except for the use of the above-described positive electrode, the same procedure as in Example O1 was used to fabricate a flat type non-aqueous electrolyte secondary battery of Example P1 having a design capacity of 780 mAh in a case of charging to 4.40 V.

Example P2

In Example P2, in preparation of the positive electrode of Example P1, the positive electrode active material particle having yttrium hydroxide adhered on the surface was heat-treated at 400° C. in air atmosphere for 5 hours. Except for the above, the same procedure as in Example P1 was used to fabricate a non-aqueous electrolyte secondary battery of Example P2.

Here, in the positive electrode active material of Example P2, most of yttrium hydroxide adhered on the surface of the positive electrode active material particle were changed to yttrium oxyhydroxide.

Example P3

In Example P3, in preparation of the positive electrode of Example P1, the amount of yttrium nitrate 5-hydrate dissolved in 200 ml of pure water was changed to 6.98 g in adhering yttrium hydroxide on the surface of positive electrode active material particle. Except for the above, the same procedure as in Example P1 was used to fabricate a non-aqueous electrolyte secondary battery of Example P3.

Here, in Example P3, a ratio of yttrium element (Y) in yttrium compound adhering on the surface of the positive electrode active material particle containing lithium cobaltate against the positive electrode active material particle was 0.17 mass %.

Example P4

In Example P4, in preparation of the positive electrode of Example P1, the amount of yttrium nitrate 5-hydrate dissolved in 200 ml of pure water was changed to 11.5 g in adhering yttrium hydroxide on the surface of positive electrode active material particle. Except for the above, the same procedure as in Example P1 was used to fabricate a non-aqueous electrolyte secondary battery of Example P4.

Here, in Example P4, a ratio of yttrium element (Y) in yttrium compound adhering on the surface of the positive electrode active material particle containing lithium cobaltate against the positive electrode active material particle was 0.28 mass %.

Example P5

In Example P5, in preparation of the positive electrode of Example P1, the amount of yttrium nitrate 5-hydrate dissolved in 200 ml of pure water was changed to 12.0 g in adhering yttrium hydroxide on the surface of positive electrode active material particle. Except for the above, the same procedure as in Example P1 was used to fabricate a non-aqueous electrolyte secondary battery of Example P5.

Here, in Example P5, a ratio of yttrium element (Y) in yttrium compound adhering on the surface of the positive electrode active material particle containing lithium cobaltate against the positive electrode active material particle was 0.35 mass %.

Comparative Example p1

In Comparative Example p1, in preparation of the positive electrode of Example P1, yttrium compound was not adhered on the surface of the positive electrode active material particle containing lithium cobaltate. Except for the above, the same procedure as in Example P1 was used to fabricate a non-aqueous electrolyte secondary battery of Comparative Example p1.

Comparative Example p2

In Comparative Example p2, in preparation of the positive electrode of Example P1, yttrium oxide was mechanically adhered on the surface of the positive electrode active material particle containing lithium cobaltate as follows: A yttrium oxide reagent was pulverized until a particle diameter of a primary particle became 300 nm to prepare yttrium oxide. Then, 0.54 g of the foregoing yttrium oxide was mixed with 500 g of positive electrode active material particle containing lithium cobaltate by using the mixing machine (the tradename NOBILTA made by HOSOKAWA MICRON CORPORATION). Thus, the positive electrode active material having yttrium oxide mechanically adhered on the surface of the positive electrode active material particle containing lithium cobaltate was prepared. Except for the use of such a positive electrode active material prepared as above, the same procedure as in Example P1 was used to fabricate a non-aqueous electrolyte secondary battery of Comparative Example p2.

Here, in Comparative Example p2, a ratio of yttrium element (Y) in yttrium oxide adhered on the surface of the positive electrode active material particle containing lithium cobaltate against the positive electrode active material particle was 0.084 mass %.

Then, the positive electrode active material of Comparative Example p2 was observed by SEM. The results of the observation showed that yttrium oxide was flocculated and adhered on the concave parts of the positive electrode active material particle and was not adequately dispersed on the surface of the positive electrode active material particle.

Comparative Example p3

In Comparative Example p3, in preparation of the positive electrode active material of Comparative Example p2, the amount of yttrium oxide having the primary particle diameter of 300 nm was changed to 5.4 g. Except for the use of such a positive electrode active material prepared as above, the same procedure as in Example P1 was used to fabricate a non-aqueous electrolyte secondary battery of Comparative Example p3.

Here, in Comparative Example p3, a ratio of yttrium element (Y) in yttrium compound adhering on the surface of the positive electrode active material particle containing lithium cobaltate against the positive electrode active material particle was 0.84 mass %.

Then, the positive electrode active material of Comparative Example p3 was observed by SEM. The results of the observation showed that yttrium oxide was flocculated and adhered on the concave parts of the positive electrode active material particle and was not dispersed on the surface of the positive electrode active material particle the same as the positive electrode active material of Comparative Example p2.

Comparative Example p4

In Comparative Example p4, in preparation of the positive electrode of Example P1, the positive electrode active material particle having yttrium hydroxide adhered on the surface was heat-treated at 600° C. in air atmosphere for 5 hours. Except for the above, the same procedure as in Example P1 was used to fabricate a non-aqueous electrolyte secondary battery of Comparative Example p4.

Here, in the positive electrode active material of Comparative Example p4, yttrium hydroxide adhered on the surface of the positive electrode active material particle was changed to yttrium oxide, and one part of yttrium was diffused inside of the positive electrode active material particle.

Next, each of the non-aqueous electrolyte secondary batteries of Examples P1 to P5 and Comparative Examples p1 to p4 was subjected to the initial charging/discharging as the same as the non-aqueous electrolyte secondary battery of Example O1. Then, initial discharge capacity Qo of each non-aqueous electrolyte secondary battery was measured and initial charging/discharging efficiency of each non-aqueous electrolyte secondary battery was determined. The results are shown together with the results of non-aqueous electrolyte secondary batteries of Comparative Examples x21 to x23, y21 and z21 in Table 20 below.

After that, the same as the non-aqueous electrolyte secondary battery of Examples O1, each of the non-aqueous electrolyte secondary batteries of Examples P1 to P5 and Comparative Examples p1 to p4 was subjected to the high-temperature sequence charging examination. Next, as to each of the non-aqueous electrolyte secondary batteries, the increment in thickness thereof after high-temperature sequence charging examination against before high-temperature sequence charging examination was measured. The results are shown together with the results of non-aqueous electrolyte secondary batteries of Comparative Examples x21 to x23, y21 and z21 in Table 20 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination. Then, 10 minutes pause was made. After that, percentage (%) of capacity retention after high-temperature sequence charging examination was obtained according to the equation (4). The results are shown together with the results of non-aqueous electrolyte secondary batteries of Comparative Examples x21 to x23, y21 and z21 in Table 20 below.

After 10 minutes pause, each of the non-aqueous electrolyte secondary batteries was charged at the constant current of 750 mA to 4.40 V and was further charged at the constant voltage of 4.40 V until the current became 37.5 mA under room temperature to measure charging capacity Qb. Then, 10 minutes pause was made. After that, each of the non-aqueous electrolyte secondary batteries after high-temperature sequence charging examination was discharged at the constant current of 750 mA until the voltage became 2.75 V in order to measure discharge capacity Q4. Next, percentage (%) of capacity recovery after high-temperature sequence charging examination and percentage (%) of charging/discharging efficiency after high-temperature sequence charging examination were obtained according to the equations (5) and (6). The results are shown together with the results of non-aqueous electrolyte secondary batteries of Comparative Examples x21 to x23, y21 and z21 in Table 20 below.

TABLE 20

| | Treatment of surface of positive electrode active material | | | Initial | Evaluation of characteristics after high-temperature sequence charging examination | | | |
|---|---|---|---|---|---|---|---|---|
| | Treatment method | Heat treatment temperature (° C.) | Element adhered and volume of adhesion (mass %) | | charging/ discharging efficiency (%) | Percentage (%) of capacity retention | Percentage (%) of capacity recovery | Percentage (%) of charging/ discharging efficiency | Increment in thickness (mm) |
| Ex. P1 | Deposition + Heat-treatment | 200 | Y | 0.084 | 89.1 | 85.7 | 79.9 | 100 | 0.92 |
| Ex. P2 | Deposition + Heat-treatment | 400 | Y | 0.084 | 88.2 | 83.4 | 78.8 | 99.3 | 1.24 |
| Ex. P3 | Deposition + Heat-treatment | 200 | Y | 0.17 | 89.2 | 85.3 | 79.3 | 99.1 | 0.93 |
| Ex. P4 | Deposition + Heat-treatment | 200 | Y | 0.28 | 88.7 | 85.1 | 79.1 | 99.8 | 0.91 |
| Ex. P5 | Deposition + Heat-treatment | 200 | Y | 0.35 | 88.2 | 84.4 | 76.4 | 98.9 | 1.01 |
| Comp. Ex. p1 | — | — | — | — | 89.2 | 55.5 | 56.5 | 86.9 | 7.02 |
| Comp. Ex. p2 | Mechanical treatment | — | Y | 0.084 | 88.8 | 50.8 | 55.9 | 85.6 | 7.00 |
| Comp. Ex. p3 | Mechanical treatment | — | Y | 0.84 | 88.2 | 62.3 | 66.5 | 87.8 | 7.11 |
| Comp. Ex. p4 | Deposition + Heat-treatment | 600 | Y | 0.084 | 85.8 | 78.5 | 76.8 | 93.5 | 2.55 |
| Comp. Ex. x21 | Deposition + Heat-treatment | 120 | Al | 0.084 | 89.2 | 82.2 | 72.1 | 95.3 | 3.32 |
| Comp. Ex. x22 | Deposition + Heat-treatment | 400 | Al | 0.084 | 88.8 | 83.2 | 72.5 | 96.5 | 3.73 |
| Comp. Ex. x23 | Deposition + Heat-treatment | 120 | Al | 0.20 | 86.5 | 84.8 | 73.1 | 97.7 | 2.92 |
| Comp. Ex. y21 | Deposition + Heat-treatment | 400 | Zn | 0.084 | 88.8 | 81.1 | 71.9 | 90.0 | 4.06 |
| Comp. Ex. z21 | Deposition + Heat-treatment | 200 | Ce | 0.084 | 88.8 | 80.1 | 72.5 | 90.2 | 2.68 |

The result showed that the percentage of initial charging/discharging efficiency of non-aqueous electrolyte secondary battery of Comparative Example p4 was more decreased, as compared with that of each non-aqueous electrolyte secondary battery of Examples P1 to P5 and Comparative Examples p1 to p3. The reason is thought to be as follows. In the non-aqueous electrolyte secondary battery of Comparative Example p4, yttrium hydroxide which was adhered on the surface of the positive electrode active material particle was changed to yttrium oxide and one part of yttrium was diffused inside of the positive electrode active material particle.

As is apparent from Table 20 the above, in each of the non-aqueous electrolyte secondary batteries of Examples P1 to P5 which utilized the positive electrode active material having the particle of yttrium compound comprising yttrium hydroxide and yttrium oxyhydroxide dispersed and adhered on the surface of the positive electrode active material particle containing lithium cobaltate, after high-temperature sequence charging examination, the value of increment of thickness was lower, and the percentage of capacity retention, the percentage of capacity recovery and the percentage of charging/discharging efficiency were more improved, as compared with each of the non-aqueous electrolyte secondary batteries of Comparative Examples p1 to p3.

In comparison among each of the non-aqueous electrolyte secondary batteries of Examples P1 to P5 and the non-aqueous electrolyte secondary battery of Comparative Examples p4, the percentage of capacity recovery after high-temperature sequence charging examination of Example P5 and that of Comparative Example p4 were almost the same; however, in Examples P1 to P4, after high-temperature sequence charging examination, the percentage of capacity retention, the percentage of capacity recovery and the percentage of charging/discharging efficiency were much more improved and the increment of thickness was greatly reduced as compared with Comparative Examples p4.

Further, in the non-aqueous electrolyte secondary battery of Example P5 wherein the ratio of yttrium element in yttrium compound adhering on the surface of the positive electrode active material particle containing lithium cobaltate against the positive electrode active material particle was 0.35 mass %, after high-temperature sequence charging examination, the percentage of capacity retention, the percentage of capacity recovery and the percentage of charging/discharging efficiency were more decreased, and the value of increment of thickness was higher, as compared with each of the non-aqueous electrolyte secondary batteries of Examples P1 to P4 wherein the ratio of yttrium element in yttrium compound was less than 0.35 mass %.

Therefore, it is preferable that the ratio of yttrium element in yttrium compound adhering on the surface of the positive electrode active material particle containing lithium cobaltate against the positive electrode active material particle be less than 0.35 mass %. Further, it is more preferable that the ratio of yttrium element be less than 0.30 mass %. This is because charging/discharging reaction is hindered in the case where the amount of yttrium compound adhering on the surface of the positive electrode active material particle is excessive.

Further, the same as each non-aqueous electrolyte secondary battery of Examples O1 to O5, in each of the non-aqueous electrolyte secondary batteries of Examples P1 to P5 after high-temperature sequence charging examination, the value of increment of thickness was lower, and percentage of capacity retention, the percentage of capacity recovery and the percentage of charging/discharging efficiency were more improved as compared with each of the non-aqueous electrolyte secondary batteries of Comparative Examples x21 to x23, y21 and z21.

Comparative Example o5

In preparation of a positive electrode of Comparative Example o5, as a positive electrode active material particle not containing Co or Ni, lithium manganese oxide $LiMn_2O_4$ having spinel structure wherein each of Mg and Al formed solid solution in a concentration of 0.5 mol % was used.

Then, 1000 g of the positive electrode active material particle was poured into 3 liter of pure water and stirred, and an aqueous solution of lanthanum nitrate dissolving 2.63 g of lanthanum nitrate 6-hydrate in 200 ml of pure water was added thereto. After that, 10 mass % of an aqueous solution of sodium hydroxide was appropriately added so that the pH of the resultant solution was 9, and lanthanum hydroxide was adhered on the surface of the positive electrode active material particle. Then, filtering suction was conducted to collect the treated object by filtration and the treated object was dried at 120° C. Thus was prepared the positive electrode active material particle having lanthanum hydroxide adhered on the surface. Next, the positive electrode active material particle having lanthanum hydroxide adhered on the surface was heat-treated at 200° C. in air atmosphere for 5 hours. Thus was prepared the positive electrode active material having a particle of lanthanum compound comprising lanthanum hydroxide dispersed and adhered on the surface of the positive electrode active material particle.

Here, in the above-mentioned positive electrode active material, a ratio of lanthanum element (La) in lanthanum compound adhering on the surface of the positive electrode active material particle containing lithium manganese oxide having spinel structure against the positive electrode active material particle was 0.084 mass %.

Then, the positive electrode active material of Comparative Example o5 was observed by SEM. The results of the observation showed that a particle diameter of most of the particle of lanthanum compound which were adhered on the surface of the positive electrode active material particle was 100 nm or less. In addition, the particle of lanthanum compound was uniformly dispersed and adhered on the surface of the positive electrode active material particle.

Except for the use of the foregoing positive electrode active material having the particle of lanthanum compound with uniformly dispersed and adhered on the surface of the positive electrode active material containing lithium manganese oxide having spinel structure, the same procedure as in Example O1 was used to fabricate a non-aqueous electrolyte secondary battery of Comparative Example o5.

Comparative Example p5

A positive electrode of Comparative Example p5 was prepared in the following manner. Lithium manganese oxide $LiMn_2O_4$ having spinel structure was used as positive electrode active material particle the same as Comparative Example o5.

Then, 1000 g of the foregoing positive electrode active material particle was poured into 3 liter of pure water and stirred, and an aqueous solution of yttrium nitrate dissolving 3.04 g of yttrium nitrate 5-hydrate in 200 ml of pure water was added thereto. After that, 10 mass % of an aqueous solution of sodium hydroxide was appropriately added so that the pH of the resultant solution was 9, and yttrium hydroxide was adhered on the surface of the positive electrode active material particle. Then, filtering suction was conducted on the positive electrode active material particle to collect the treated object by filtration, and the treated object was heat-treated for drying at 120° C. Thus was prepared the positive electrode active material particle having yttrium hydroxide adhered on the surface. Next, the positive electrode active material particle having yttrium hydroxide adhered on the surface was heat-treated at 200° C. in air atmosphere for 5 hours. Thus was prepared the positive electrode active material having a particle of yttrium compound dispersed and adhered on the surface of the positive electrode active material particle.

In the above-mentioned positive electrode active material, a ratio of yttrium element (Y) in yttrium compound adhering on the surface of the positive electrode active material particle containing lithium manganese oxide having spinel structure against the positive electrode active material particle was 0.084 mass %. Further, yttrium compound adhering on the surface of the positive electrode active material particle was remained as yttrium hydroxide.

Then, the positive electrode active material of Comparative Example p5 was observed by SEM. The results of the observation showed that a particle diameter of most of the particle of yttrium compound which were adhered on the surface of the positive electrode active material particle was 100 nm or less. In addition, the particle of yttrium compound was uniformly dispersed and adhered on the surface of the positive electrode active material particle.

Except for the use of the foregoing positive electrode active material having the particle of yttrium compound uniformly dispersed and adhered on the surface of the positive electrode active material containing lithium manganese oxide having spinel structure, the same procedure as in Example A1 was used to fabricate a non-aqueous electrolyte secondary battery of Comparative Example p5.

Comparative Example o6

In Comparative Example o6, neither lanthanum compound nor yttrium compound was adhered on the surface of the positive electrode active material particle containing lithium manganese oxide having spinel structure. Except for the above, the same procedure as in Comparative example o5 was used to fabricate a non-aqueous electrolyte secondary battery of Comparative Example o6.

Next, the initial charging/discharging under room temperature environment was conducted as follows. As the initial charging, each of the non-aqueous electrolyte secondary batteries of Comparative Examples o5, p5, and o6 was charged at the constant current of 750 mA to 4.20 V and was further charged at the constant voltage of 4.20 V until the current became 37.5 mA. After 10 minutes pause, as the initial discharging, each of the batteries was discharged at the constant current of 750 mA to 2.75 V. Then, initial discharge capacity Qo of each non-aqueous electrolyte secondary battery was measured and initial charging/discharging efficiency of each non-aqueous electrolyte secondary battery was determined. The results were shown in Table 21 below. Here, in the case where lithium manganese oxide having spinel structure is used as the positive electrode active material and that the carbon negative electrode is used as the negative electrode, if the non-aqueous electrolyte secondary battery is charged to more than 4.20 V, only the battery voltage is rapidly increased. Therefore, the initial charging/discharging was conducted at 4.20 V.

After that, a high-temperature sequence charging examination was conducted as follows. Each of the non-aqueous electrolyte secondary batteries after initial charging/discharging was retained in the thermostatic container of 60° C. for 1 hour. Then, each of the non-aqueous electrolyte secondary batteries was charged at the constant current of 750 mA until the voltage became 4.20 V, and further was charged so as to maintain the voltage of 4.20 V for 250 hours in the thermostatic container of 60° C. Next, as to each of the non-aqueous electrolyte secondary batteries, the increment in thickness thereof after high-temperature sequence charging examination against before high-temperature sequence charging examination was measured. The results are shown in Table 21 below.

Next, each of the non-aqueous electrolyte secondary batteries after high-temperature sequence charging examination was discharged at the constant current of 750 mA until the voltage became 2.75 V under room temperature environment in order to measure discharge capacity Q3 after high-temperature sequence charging examination.

After 10 minutes pause, each of the non-aqueous electrolyte secondary batteries was charged at the constant current of 750 mA to 4.20 V and was further charged at the constant voltage of 4.20 V until the current became 37.5 mA under room temperature. After 10 minutes pause was made, each of the non-aqueous electrolyte secondary batteries was discharged at the constant current of 750 mA until the voltage became 2.75 V in order to measure charge capacity Qa and discharge capacity Q4. Then, percentage (%) of capacity retention after high-temperature sequence charging examination was obtained according to the equation (4). Further, percentage (%) of capacity recovery after high-temperature sequence charging examination and percentage (%) of charging/discharging efficiency after high-temperature sequence charging examination were obtained according to the equations (5) and (6). The results are shown in Table 21 below.

TABLE 21

Positive electrode active material: Lithium manganese oxide $LiMn_2O_4$ having spinel structure

| | Treatment of surface of positive electrode active material | | | Initial | Evaluation of characteristics after high-temperature sequence charging examination | | | |
|---|---|---|---|---|---|---|---|---|
| | Treatment method | Heat treatment temperature (° C.) | Element adhered and volume of adhesion (mass %) | charging/ discharging efficiency (%) | Percentage (%) of capacity retention | Percentage (%) of capacity recovery | Percentage (%) of charging/ discharging efficiency | Increment in thickness (mm) |
| Comp. Ex. o5 | Deposition + Heat-treatment | 200 | La 0.084 | 91.4 | 76.8 | 75.3 | 100.0 | 1.01 |

TABLE 21-continued

Positive electrode active material: Lithium manganese oxide LiMn$_2$O$_4$ having spinel structure

| | Treatment of surface of positive electrode active material | | | Initial charging/ discharging efficiency (%) | Evaluation of characteristics after high-temperature sequence charging examination | | | |
|---|---|---|---|---|---|---|---|---|
| | Treatment method | Heat treatment temperature (° C.) | Element adhered and volume of adhesion (mass %) | | Percentage (%) of capacity retention | Percentage (%) of capacity recovery | Percentage (%) of charging/ discharging efficiency | Increment in thickness (mm) |
| Comp. Ex. p5 | Deposition + Heat-treatment | 200 | Y    0.084 | 92.3 | 74.5 | 75.5 | 100.1 | 1.02 |
| Comp. Ex. o6 | — | — | —   — | 92.8 | 75.3 | 75.8 | 100.1 | 1.00 |

As is shown in Table 21 the above, among each of the non-aqueous electrolyte secondary batteries of Comparative Examples o5, p5, and o6 using lithium manganese oxide having spinel structure which did not contain Co or Ni as the positive electrode active material particle, the initial charging/discharging efficiency, the increment of thickness after high-temperature sequence charging examination, the percentage of capacity retention, the percentage of capacity recovery and the percentage of charging/discharging efficiency after high-temperature sequence charging examination were almost the same. Namely, effects by adhering and dispersing the particles of lanthanum compound comprising lanthanum hydroxide and yttrium compound comprising yttrium hydroxide on the surface of the positive electrode active material was not obtained. The reason is supposed to be that a positive electrode active material of lithium manganese oxide having spinel structure which does not contain Co or Ni has a lower catalytic property than lithium cobaltate, so that the decomposition reaction of the non-aqueous electrolyte hardly occurs even in the case of high-temperature sequence charging.

EXPLANATION OF REFERENCE NUMERALS 10 flat electrode
11 positive electrode
11a positive electrode current collector tub
12 negative electrode
12a negative electrode current collector tub
13 separator
20 battery case

What is claimed:

1. A positive electrode active material for non-aqueous electrolyte secondary battery,
wherein particles of at least one compound selected from neodymium hydroxide, neodymium oxyhydroxide, samarium hydroxide, samarium oxyhydroxide, lanthanum hydroxide, lanthanum oxyhydroxide, yttrium hydroxide, and yttrium oxyhydroxide are uniformly dispersed and adhered on an entire surface of a positive electrode active material particle containing at least one element selected from nickel and cobalt,
wherein the positive electrode active material is prepared by adding a solution of salt selected from neodymium salt, samarium salt, lanthanum salt and yttrium salt to a solution dispersing the positive electrode active material particle and depositing a hydroxide selected from neodymium hydroxide, samarium hydroxide, lanthanum hydroxide and yttrium hydroxide on the surface of the positive electrode active material particle; and
heat-treating the positive electrode active material particle depositing the hydroxide on the surface,
wherein a pH of the solution dispersing the positive electrode active material particle is 6 to 10.

2. The positive electrode active material for non-aqueous electrolyte secondary battery as claimed in claim 1,
wherein a particle of neodymium compound selected from at least one of neodymium hydroxide and neodymium oxyhydroxide is dispersed and adhered on the surface of a positive electrode active material particle, and
an amount of neodymium element in the neodymium compound adhering on the surface of positive electrode active material particle is 0.35 mass % or less against the positive electrode active material particle.

3. The positive electrode active material for non-aqueous electrolyte secondary battery as claimed in claim 1,
wherein a particle of samarium compound selected from at least one of samarium hydroxide and samarium oxyhydroxide is dispersed and adhered on the surface of a positive electrode active material particle, and
an amount of samarium element in the samarium compound adhering on the surface of positive electrode active material particle is 0.35 mass % or less against the positive electrode active material particle.

4. The positive electrode active material for non-aqueous electrolyte secondary battery as claimed in claim 1,
wherein a particle of lanthanum compound selected from at least one of lanthanum hydroxide and lanthanum oxyhydroxide is dispersed and adhered on the surface of a positive electrode active material particle, and
an amount of lanthanum element in the lanthanum compound adhering on the surface of positive electrode active material particle is 0.35 mass % or less against the positive electrode active material particle.

5. The positive electrode active material for non-aqueous electrolyte secondary battery as claimed in claim 1,
wherein a particle of yttrium compound selected from at least one of yttrium hydroxide and yttrium oxyhydroxide is dispersed and adhered on the surface of a positive electrode active material particle, and
an amount of yttrium element in the yttrium compound adhering on the surface of positive electrode active material particle is 0.35 mass % or less against the positive electrode active material particle.

6. A positive electrode for non-aqueous electrolyte secondary battery, comprising the positive electrode active material for non-aqueous electrolyte secondary battery of claim 1.

7. A non-aqueous electrolyte secondary battery comprising,
the positive electrode of claim 6, a negative electrode and a non-aqueous electrolyte.

8. The positive electrode active material for non-aqueous electrolyte secondary battery as claimed in claim 1,
wherein the particles of the at least one compound are selected from samarium hydroxide and samarium oxyhydroxide, and the solution of salt is samarium salt.

9. The positive electrode active material for non-aqueous electrolyte secondary battery as claimed in claim 1,
wherein the particles of the at least one compound are selected from neodymium hydroxide and neodymium oxyhydroxide, and the solution of salt is neodymium salt.

10. The positive electrode active material for non-aqueous electrolyte secondary battery as claimed in claim 1,
wherein the particles of the at least one compound are selected from lanthanum hydroxide and lanthanum oxyhydroxide; and the solution of salt is lanthanum salt.

11. The positive electrode active material for non-aqueous electrolyte secondary battery as claimed in claim 1,
wherein the particles of the at least one compound are selected from yttrium hydroxide, and yttrium oxyhydroxide; and the solution of salt is yttrium salt.

12. The positive electrode active material for non-aqueous electrolyte secondary battery as claimed in claim 1,
wherein the pH of the solution dispersing the positive electrode active material particle is 6 to 9.

13. The positive electrode active material for non-aqueous electrolyte secondary battery as claimed in claim 8,
wherein the pH of the solution dispersing the positive electrode active material particle is 6 to 9.

14. The positive electrode active material for non-aqueous electrolyte secondary battery as claimed in claim 9,
wherein the pH of the solution dispersing the positive electrode active material particle is 6 to 9.

15. The positive electrode active material for non-aqueous electrolyte secondary battery as claimed in claim 10,
wherein the pH of the solution dispersing the positive electrode active material particle is 6 to 9.

16. The positive electrode active material for non-aqueous electrolyte secondary battery as claimed in claim 11,
wherein the pH of the solution dispersing the positive electrode active material particle is 6 to 9.

\* \* \* \* \*